(12) United States Patent
Bennett et al.

(10) Patent No.: US 10,918,083 B2
(45) Date of Patent: *Feb. 16, 2021

(54) FLUID OUTPUTTING HAND DEVICE

(71) Applicants: Jethro Bennett, Liverpool (GB); Andrew Brown, Mile House (CA)

(72) Inventors: Jethro Bennett, Liverpool (GB); Andrew Brown, Mile House (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/384,709

(22) Filed: Apr. 15, 2019

(65) Prior Publication Data

US 2019/0239478 A1 Aug. 8, 2019

Related U.S. Application Data

(63) Continuation-in-part of application No. 13/891,232, filed on May 10, 2013, now Pat. No. 10,258,021.

(30) Foreign Application Priority Data

May 15, 2012 (GB) .................................. 1208456.2
Jun. 12, 2012 (GB) .................................. 1210381.8
Apr. 14, 2019 (GB) .................................. 1905275.2

(51) Int. Cl.
*A01K 13/00* (2006.01)

(52) U.S. Cl.
CPC .................................. *A01K 13/001* (2013.01)

(58) Field of Classification Search
CPC ......... A01K 13/001; A46B 5/04; A46B 11/06; A41D 19/0079; A47L 13/18

USPC ....... 119/603, 665, 650, 652, 600, 604, 632, 119/671, 677; 401/7; 15/34
See application file for complete search history.

(56) References Cited

U.S. PATENT DOCUMENTS

| | | | | |
|---|---|---|---|---|
| 1,530,327 A * | 3/1925 | Redlick | .................... | A47L 1/08 401/7 |
| 1,533,732 A * | 4/1925 | Frost | ...................... | A47L 13/18 239/529 |
| 3,701,604 A * | 10/1972 | Holroyd | ............. | A41D 19/0079 401/7 |
| 5,169,251 A * | 12/1992 | Davis | ................. | A41D 19/0079 401/7 |
| 5,649,502 A * | 7/1997 | Frank | ................... | A01K 13/001 119/665 |
| 5,676,092 A * | 10/1997 | Ortolivo | .............. | A01K 13/001 119/650 |
| 5,722,349 A * | 3/1998 | Wolgamuth | ......... | A01K 13/001 119/632 |
| 5,867,829 A * | 2/1999 | Hegoas | ................ | A01K 13/003 119/605 |
| 6,109,214 A * | 8/2000 | Rampersad | .............. | A46B 5/04 119/600 |

(Continued)

*Primary Examiner* — Yvonne R Abbott-Lewis

(57) ABSTRACT

A fluid outputting hand device 11 comprises: a front portion 13, for going in front of a user's hand; and a fluid output point, for outputting fluid; wherein the hand device 11 is configured for: pressure-activated outputting, so that fluid can be outputted onto a target, by applying pressure to the target; and selectable distance outputting of fluid, so that fluid can be outputted at a target, from a distance. Preferably the fluid outputting hand device comprises a thumb selecting arrangement, so that distance outputting can be selected by a thumb of a user.

24 Claims, 25 Drawing Sheets

(56) References Cited

U.S. PATENT DOCUMENTS

| | | | | |
|---|---|---|---|---|
| 6,257,785 | B1* | 7/2001 | Otten | A45D 40/26 401/261 |
| 6,718,913 | B1* | 4/2004 | Stupar | A01K 13/002 119/602 |
| 6,948,451 | B2* | 9/2005 | Bond | A01K 13/001 101/289 |
| 6,968,808 | B2* | 11/2005 | Claire | A01K 13/001 119/652 |
| 7,347,166 | B2* | 3/2008 | Roman-Barcelo | A01K 13/002 119/677 |
| 7,421,978 | B2* | 9/2008 | Price | A01K 13/001 119/604 |
| 8,286,592 | B2* | 10/2012 | Moinester | A01K 13/001 119/603 |
| 8,555,819 | B1* | 10/2013 | McFarland | A01K 13/001 119/603 |
| 8,794,189 | B1* | 8/2014 | Dahlquist | A46B 5/04 119/650 |
| 9,167,948 | B2* | 10/2015 | Tucker | A47L 13/23 |
| 9,326,484 | B2* | 5/2016 | Allen | A01K 13/001 |
| 10,334,929 | B2* | 7/2019 | Lightsey | A45D 19/02 |
| 2006/0174842 | A1* | 8/2006 | Bond | A01K 13/001 119/664 |
| 2012/0189371 | A1* | 7/2012 | Morelli | A47L 1/08 401/7 |
| 2013/0269136 | A1* | 10/2013 | Boulton | A41D 19/01594 15/227 |
| 2016/0073611 | A1* | 3/2016 | Hightower | A01K 13/003 119/603 |

\* cited by examiner

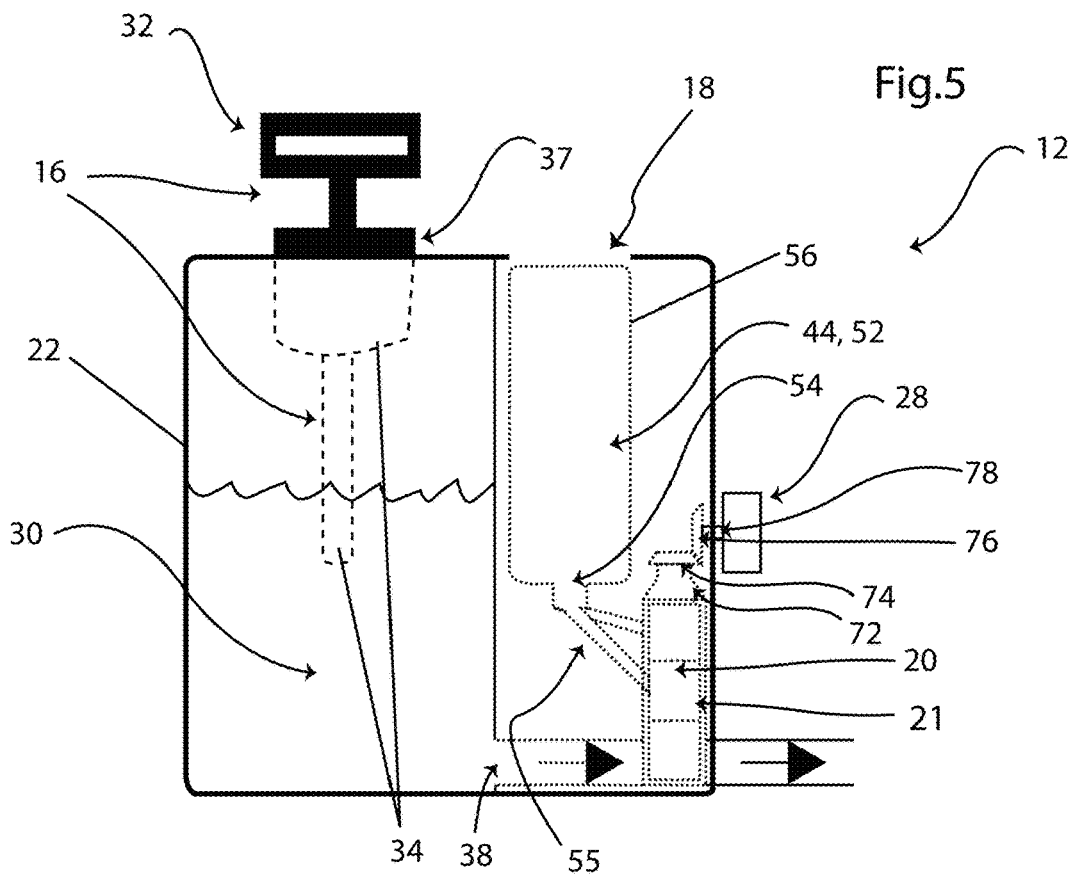
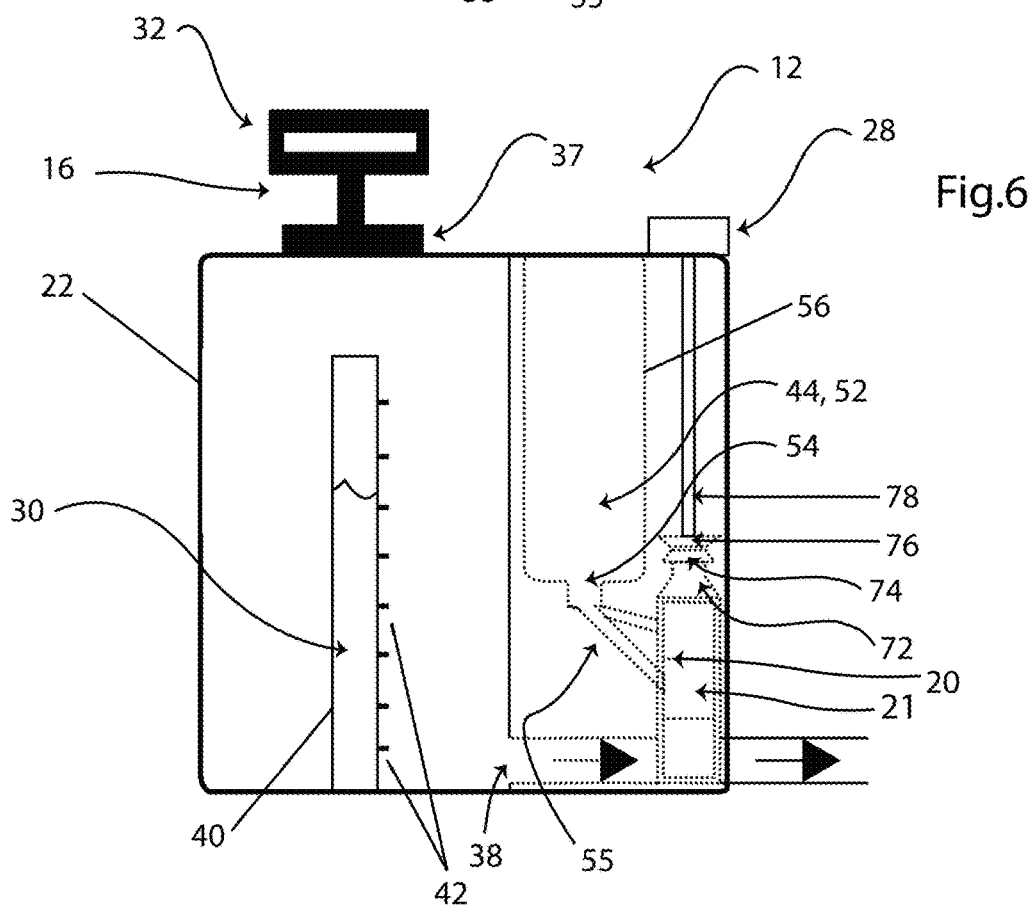

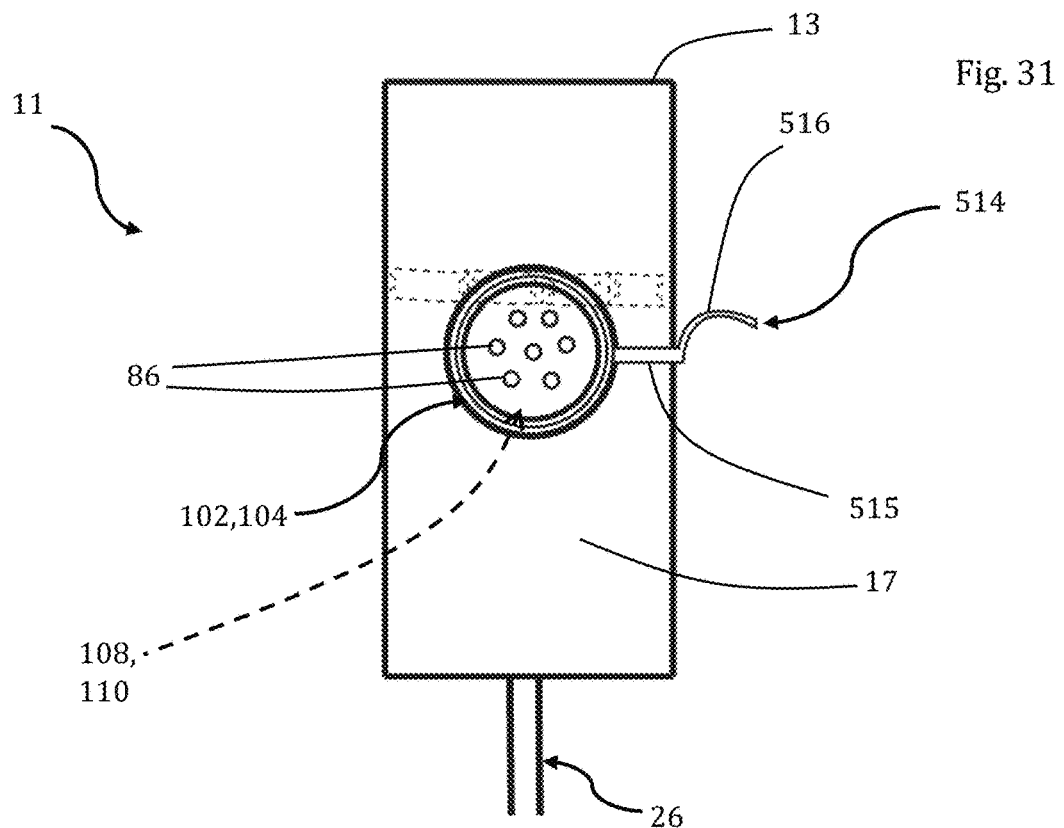
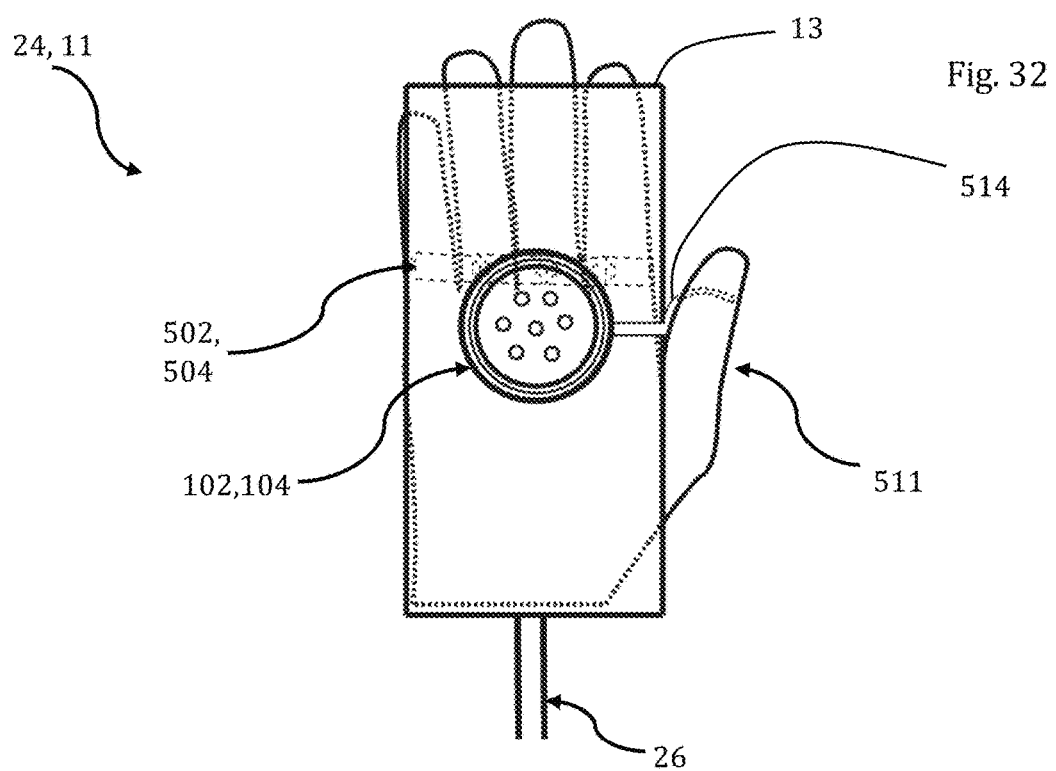

FLUID OUTPUTTING HAND DEVICE

CROSS REFERENCE TO RELATED APPLICATION

The present application is a continuation-in-part application of application U.S. Ser. No. 13/891,232 filed on May 10, 2013 (10 May 2013), the benefit of priority of which is claimed for the present application. U.S. Ser. No. 13/891,232 in turn claims benefit of priority to British patent application GB1210381.8, filed Jun. 12, 2012 (6 Jun. 2012), which in turn claims priority to application GB1208456.2, filed May 15, 2012 (15 May 2012), the priority of both of which is also claimed for the present application. This application claims benefit of priority to British patent application GB1905275.2, filed Apr. 14, 2019 (14 Apr. 2019). The disclosures of U.S. Ser. No. 13/891,232 and GB1905275.2 are herein incorporated by reference, in their entirety.

The present invention relates partially to a pet cleaning apparatus. It also relates more generally to a fluid outputting hand device which may, or may not, be used for cleaning of a pet.

Terms/Definitions

'Arrangement':

The term arrangement is a technical term which means a feature, or combination of features, (usually with a given purpose). For example, a 'measuring arrangement' is a feature or features, to facilitate measuring. A 'holding arrangement' is a feature or features, to facilitate holding.

'Feature':

The term 'feature' is a broad term that includes within its scope any feature under the Sun. A feature may, for example, be an element, body, member, or may even be an aperture (eg opening/hole/gap or the such like). Thus the term 'holding feature' includes within its scope, for example, any element, body, member, or even aperture, to facilitate holding. A 'feature' may also be a 'part' of a broader feature; for example, if a part of an invention is disclosed/claimed as comprising a 'padding feature', this does not limit the padding feature to being a separate feature that is added to the invention (eg a sponge element, adhered to the invention); the invention, for example, may have a part made of sponge, or have an inner sponge (or soft) layer—in such a case, if that part of the invention is clearly of a material/nature that provides padding, then this falls within a scope of what is defined in the present application as a 'padding feature'.

'Substantially':

It is known, to those with skill in the art of patenting, that the word 'substantially' can, in some instances, be used to broaden a term. It should be stated that, in the present application, use of the word 'substantially' with a term, to define a (characterizing) feature(s), gets all the benefit (ie the benefit of any broadening) afforded by use of the word 'substantially', and also includes within its scope the feature(s) being that term exactly, (without broadening). For example, if two features are described/defined in the present application as being 'substantially parallel', then that includes, within its scope, the features being 'close' to parallel (in so far as the word 'substantially' is deemed to broaden the term 'parallel'), and also includes within its scope the features being 'exactly' parallel).

'Attached' And 'Connected':

If a feature (or two features) are defined in a claim as being attached, that would include within its scope the feature (or two features) being permanently attached, (of course), and would also include within its scope the feature (or two features) being removably attachable, (because, if removably attachable, the feature (or two features) can be attached, and therefore, when attached, would be within a scope of being 'attached'). Furthermore, the feature (or two features) being defined in a claim as being 'attached' would also include within its scope the feature that is defined as being 'attached' being formed as one part with a portion or a whole of the other feature it is defined as being 'attached' to. For example, if a table leg is defined in a claim as being 'attached' to a table top, that would include within its scope the table leg being formed as one part with a whole of the table top (eg if the table leg and table top were formed as one piece of plastic, for example) and would also include within its scope the table leg being formed as one part with a portion (rather than a whole) of the table top (eg if the table top was formed of more than one part, and the table leg was formed as one part with a part of the table top, but not a whole of it).

It should be noted, some (few) patent offices require structural connection/relationship terms (in claims), to define structural connection/relationship between features of the claim. With this in mind, (and if it should be required, although it often is not), the term 'connected', if used in a claim, is a broad term, which includes within its scope direct connection, and also includes within its scope indirect connection. ('Direct' connection would be where two features, for example, are directly connected to each other (eg an arm is 'directly' connected to a shoulder). 'Indirect' connection would be where two features, for example, are connected, but via intermediate feature(s) (eg a person's foot is 'connected' to their head, but 'indirectly', (via their leg, abdomen, torso, etc, which are 'intermediate features')). Where the term 'connected' is used in a claim, it includes within its scope 'direct' connection, and also includes within its scope 'indirect' connection. The term may be used in a claim, (and is deemed supported), whether 'direct' and/or 'indirect' connection embodiment(s) is (/are) disclosed in the present application, and, as stated, includes within its scope 'direct' connection, and also includes within its scope 'indirect' connection. Furthermore, if a feature(s) is (/are) defined as being 'connected', that would include within its scope the (or any—ie more than one of the said) feature(s) being removably attachable, if, when attached, the feature(s) is (/are) in a state of being 'connected', (directly or indirectly). Thus if a first feature is defined as being 'connected' to a second feature, it would include within its scope the first feature and/or the second feature being removably attachable, if, when attached, the first feature is connected to the second feature, (directly or indirectly). Furthermore, of course, (and similarly to the word 'attached'), if a feature (or two features) are defined in a claim as being 'connected' it would also include within its scope the feature that is defined as being 'connected' being formed as one part with a portion or a whole of the other feature it is defined as being 'connected' to.

'The Or Each' And 'The Or Any':

The term 'the or each' (either in disclosure and/or a claim) can refer back to a single feature/thing, and/or can refer back to a plurality of features/things. When the term is read as referring back to a plurality of features/things, it should be taken as meaning, and including within its scope, 'at least one, or more, or all (ie each)' of the said features/things. Thus, to give an example, if a square is referred to/disclosed that has four corners, if the term 'the or each corner' is used, it includes within its scope 'one of the corners, (or two, or three, or all of the corners)'.

When any one feature/thing is afforded any feature(s)/definition in the present application, it is taken as read that, where a plurality of the said feature/thing is provided, 'the or each' said feature/thing may be provided/claimed comprising the said feature(s)/definition (ie at least one, or more or all). Similarly, wherever a plurality of the said feature/thing are afforded any feature(s)/definition, it is taken as read that 'the or each' said feature/thing may be provided/claimed comprising the feature(s)/definition (ie at least one, or more, or all of the plurality), and/or that even just one said feature/thing may be provided/claimed comprising the feature(s)/definition in an embodiment/claim wherein an invention is defined as comprising 'a' (eg singular) said feature/thing.

(The term 'the or any' may be used, (again including within its scope, 'at least one, or more, or all (ie each)'), instead of the term 'the or each').

'User Means':

It will be well known that, in certain patenting territories, (for example, the United States), use of the term 'means' or 'means for', if used in a (granted) patent claim, can be seen as a limiting term, limited to only giving the applicant/proprietor of the patent protection of means that are disclosed in the granted patent, or 'equivalent' means. This is not the case with the term 'user means' as it is used in the present application. The term 'user means' is a very broad term that is used in the field of product design/user-interface, and defines any means under the sun, provided for a user, for whatever action/result the user means is provided for. For example—a 'user means' to turn on a television could be provided by way of an ON/OFF button on the television. But it could also be provided by a button on a remote control which turns on the television when pressed. Both of these would fall (in the technical field of product design/user-interface) under the scope of the term 'user means' to turn on the television. Similarly, with certain inventions/products, a 'user means' may be provided to 'initiate' an action, for example. Thus, in the present application, a claim that defines an invention which comprises a 'user means' for [a particular action/result] is not subject to any 'means for' limitations that certain patent office territories (such as the United States) may appropriate to the term 'means for', but should be read as (and given protection for, if granted) any means under the sun, provided for a user, for [that particular action/result defined]. 'User means' is a technical term in the field of product design/user-interface.

Reference To Multiple Similar Elements In Plural

In the present application, there may be provided/numbered features wherein the same primary number is used, with a suffix. For example, a first side of the/an invention may be numbered 600', and a second side of the/an invention numbered 600". In any such case (or where any other suffix is used, such as 'L' and 'R' to denote 'left' and 'right', or 'a' and 'b', for example), when such features are referred to together (ie 'the sides'), the plural may be numbered/referred to with the primary number (without the suffix). Thus the first side 600' and second side 600" may, for example, be referred to simply as 'the sides 600'. Furthermore, if a side is referred to (not specifying which one of the sides), the primary number (ie 600, for example) may be used, without any suffix.

BACKGROUND

Pet owners have a difficult time cleaning their dogs.

No method has currently been designed, or been satisfactorily designed, for cleaning a dog intuitively and effectively. Therefore most of the approximately 400 million owned dogs in the world are cleaned by two methods not designed for such a use; cleaning outside with a hose, and cleaning inside with an instrument such as a shower head which was intended for human use.

Both of these methods have significant problems both for the owner, and for the dog.

If a hose is used to clean a dog, it may be considered demeaning to a pet. Much water is lost and many hoses do not output warm water, which is preferable for cleaning of a dog. There is no shampoo and/or mixing system. A huge amount of water may be lost and wasted as the aiming method is indiscriminate and the pet may attempt to escape.

Similarly, a huge amount of fluid output may be wasted when using a showerhead. Again, any addition, such as a shampoo, must be applied separately thus halting the cleaning.

The most significant problem that characterises both of these methods is that two hands must be used to perform the cleaning and to perform two separate, and often conflicting, tasks. One hand must hold, pet, and clean the dog, whilst the other hand is permanently occupied holding and aiming the fluid outputting instrument, which may be a shower head or a hose.

This can cause extremely bad results;

It is in the nature of a dog to shake its coat if the coat becomes saturated with water.

This causes huge problems during the cleaning process; with one hand already taken up holding the outputting instrument, it is extremely difficult to stop the dog from shaking its coat, the dog thus spraying, possibly dirty, water all over the user, and, in the case of a dog being cleaned inside a house, spraying, possibly dirty fluid, about a house.

Worse still, because each hand is performing conflicting tasks, if a user acts instinctively to try to stop the dog from shaking its wet coat, this may result in control being lost of the spraying instrument, which can have even worse results, such as significant amounts of water being sprayed about unintended locations, about a house and personal objects, or even at the user themselves. This is a problem known to all dog owners.

The problem is multiplied in a situation where a pet attempts an escape. Again, this may lead to an instinctive attempt by a user to hold the dog, which may lead to a significant loss of control of the fluid outputting instrument, with the aforementioned results.

Because these methods are not designed for cleaning of a dog, a dog often attempts an escape. Pet owners know this, and become more concerned, which makes the pet more concerned, thus making an attempted escape even more likely.

Neither method is portable as it relies on a conveniently placed and not omnipresent external water input source.

It is clear these methods are ineffective and troubling both to a dog and an owner, which is proven by the fact that many pet owners resort to a third option—they avoid cleaning of the dog entirely and hire a kennel or professional to clean the dog, which may include sending the dog away to a cleaner. This is expensive and some pet owners cannot afford this service.

Pet owners want a solution for cleaning a pet that is simple, loving, effective and elegant, preferably comprising an all-in-one solution.

Some efforts have been made to design devices that solve the problem of two conflicting hands being required to clean a dog; one for cleaning, one for holding of a fluid-outputting instrument. One solution that the present invention endorses, is a fluid outputting glove device that is wearable by a user so that a pet can be cleaned, scrubbed and petted with the use of a single hand, the fluid being outputted from a palm of the glove device. The other hand can be used to pet, clean and hold the dog, greatly lessening the chance of an escape and facilitating immediate holding of a dog if it tries to shake its coat.

However, there are significant problems with a basic embodiment of a fluid-outputting glove. First, there is no mixing facility—if shampoo, conditioner, or any agent is required for cleaning or treating of a dog, we return to a problem of multiple hands being required for differing jobs, which will halt the cleaning process and may lead to the dog successfully shaking its coat or attempting an escape.

Secondly, in a basic embodiment, a fluid outputting glove device may require an external fluid input source, such as a hose or tap. Thus it is not viably portable as it relies upon a fluid input source that is conveniently placed and not omnipresent. Its lack of any elegant mixing solution or any pressurizable element for pressurized fluid outputting may limit its effectiveness.

Furthermore, the glove may not provide multiple variable output options for a user, such as the ability to spray a pet from a distance and to output fluid onto the pet only when in contact via the use of a pressure-activated unit or the like.

In short, a basic fluid outputting glove is limited in its ability to provide an effective, intuitive, and variable method for how to clean a dog. It is not a total solution.

US patent 2010/0282182 A1 provides a pet cleaning apparatus which comprises a fluid outputting glove and a bladder bag that holds multiple fluid inputs. It does have mixing facility, and could therefore be termed self-contained. However, it is extremely limited; it relies upon gravity for fluid outputting and requires strapping of a movable bag to a body, which is unwieldy and cumbersome. It is not independent in that it requires strapping to the body and that the bladder bag be located above the fluid outputting glove device for fluid outputting—the apparatus does not comprise a pre-pressurizable mechanism and therefore relies upon gravity.

It lacks elegance because it relies upon external forces to function and is thus not an all-in-one independent solution. It lacks elegance because it relies upon and forces a user to wear it about themselves—an action that may be unnatural, undesired and unfashionable for a user. The bladder bag is innately puncturable and cannot receive a, for example cartridge-based, removable and replaceable mix addition container as it is maleable and not of pre-determined dimension.

Many pet owners will refuse to wear a bladder bag attachment for cleaning of a dog.

The bladder bag does not integrally mix the mix additions. Therefore whilst the apparatus, including the glove device and connecting tubes, could be said to be self-contained, the bladder bag is certainly not a self contained fluid control and mix delivery system and/or station.

Furthermore, the glove device does not provide multiple variable output options for a user; it does provide a mixing facility, but not variable options such as interchangeable ability to spray fluid from a distance, to not output a fluid, and to output a fluid only when pressure is applied to a surface via a pressure activated unit on the glove.

A fully self-contained independent solution for cleaning of a dog has not been provided. Pet owners want a solution for cleaning a pet that is simple, effective, and elegant.

SUMMARY

Examples of the present invention seek to provide a solution to any or all of the above problem(s) by providing: a fluid outputting hand device, comprising: a front portion, for going in front of a user's hand; and a fluid output point, for outputting fluid; wherein the hand device is configured for: pressure-activated outputting, so that fluid can be outputted onto a target, by applying pressure to the target; and selectable distance outputting of fluid, so that fluid can be outputted at a target, from a distance.

Preferably the fluid outputting hand device comprises a thumb selecting arrangement, so that distance outputting can be selected by a thumb of a user. One intent of the thumb selecting arrangement is to make it much easier (and more intuitive) for a user to initiate/select distance outputting of fluid from the fluid outputting hand device. Thus a user can select distance outputting of fluid, with their thumb, and preferably with very little movement. This can make the device much easier to use.

(However, distance outputting of fluid is not limited to being outputted via a selecting arrangement. Various different embodiments may be provided, to facilitate distance outputting of fluid. Thus, for example, embodiments may be provided wherein distance outputting of fluid may be achieved via any digit(s)).

According to another aspect of the invention, there may be provided: a fluid outputting hand device, comprising: a front portion, for going in front of a user's hand; and a fluid output point, for outputting fluid; wherein the hand device is configured for at least one of: pressure-activated outputting, so that fluid can be outputted onto a target, by applying pressure to the target; and distance outputting of fluid, so that fluid can be outputted at a target, from a distance.

Thus, for example, a fluid outputting hand device may be claimed, not limited to providing both pressure-activated and distance outputting functionality. For example, an invention and/or hand device may be claimed that relates solely to (preferably selectable) distance outputting of fluid, and not limited to providing pressure-activated fluid outputting, and vice-versa. All other feature(s) disclosed in the present application may be afforded, preferably and/or optionally, to this aspect.

According to another aspect of the invention, there may be provided: a fluid outputting hand device (and/or a handheld fluid outputting device), comprising a fluid output point. All other feature(s) disclosed in the present application are preferable and/or optional to this statement of invention.

BRIEF DESCRIPTION

The present invention will now be more particularly described, with reference to the accompanying drawings, by way of example only and in no way limiting the scope of the invention, in which FIG. 1 is a perspective view of a portable lightweight self-contained pre-pressurizable fluid control and mix delivery station, with a transparented view of a mix addition chamber, an embodiment of a fluid control and mix delivery system, and a pressurizing mechanism;

FIG. 5 is a cross sectional and partly transparented view of the pressurizable fluid control and mix delivery station demonstrating the fluid control and mix selecting system and an embodiment of a manual selecting element;

FIG. 6 is a cross sectional and partly transparented view of the pressurizable fluid control and mix delivery station demonstrating the fluid control and mix selecting system and an embodiment of a manual selecting element where the element is in a preferred top-facing location of the station;

FIG. 31 shows a front view of the (or a similar) thumb selecting arrangement/feature as shown in FIGS. 29 and 30, connected (directly or indirectly) to a pressure activated arrangement/unit;

FIG. 32 shows a view of a hand using the example thumb selecting arrangement;

Figure 47:
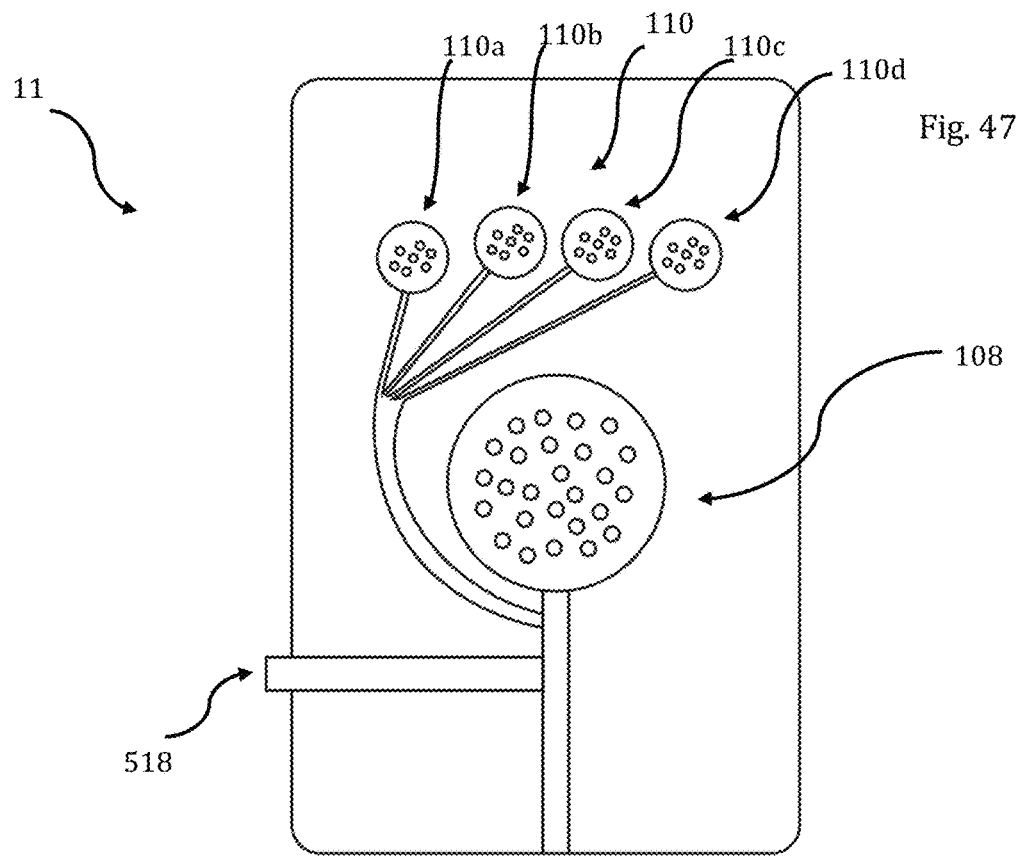
FIG. 47 shows a same view as FIGS. 45 and 45, this time showing an embodiment wherein the/a second(ary) fluid output point arrangement comprises a plurality of output points, (again showing, representationally, an embodiment of the example stopping arrangement)
Figure 48:
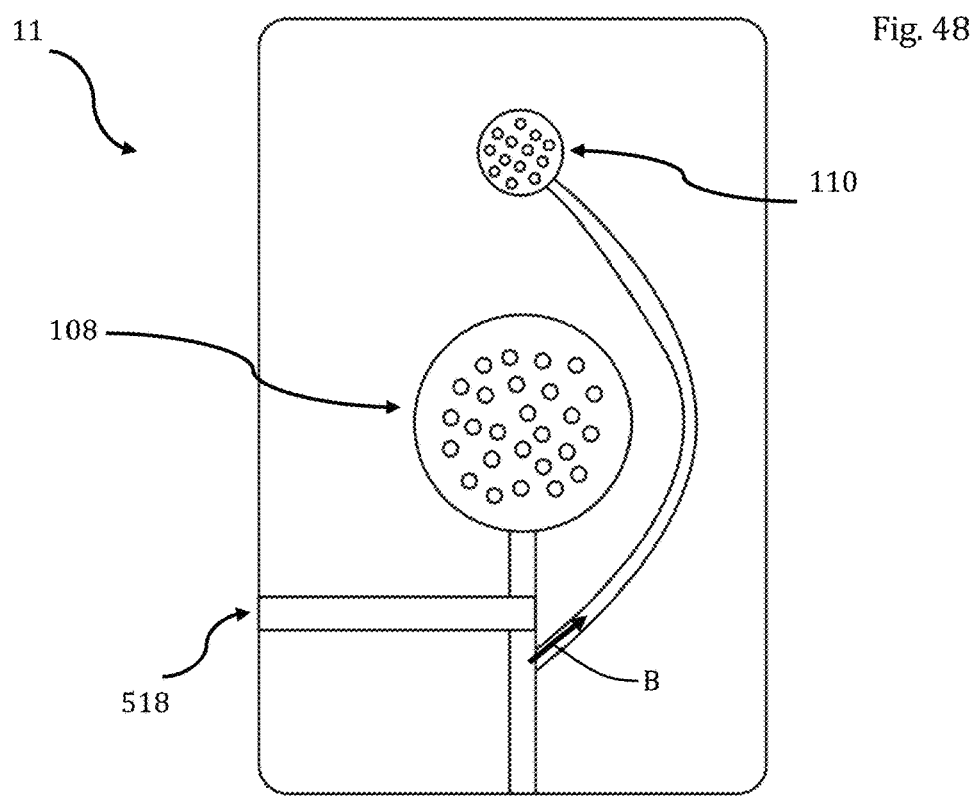
FIG. 48 shows a same view as FIGS. 45 to 47, now showing a similar example of a stopping arrangement, but now showing an example wherein the stopping arrangement is configured to stop flow from the fluid output point arrangement for pressure-activated outputting, but does not stop flow of fluid from the distance fluid outputting arrangement.
Figure 49:
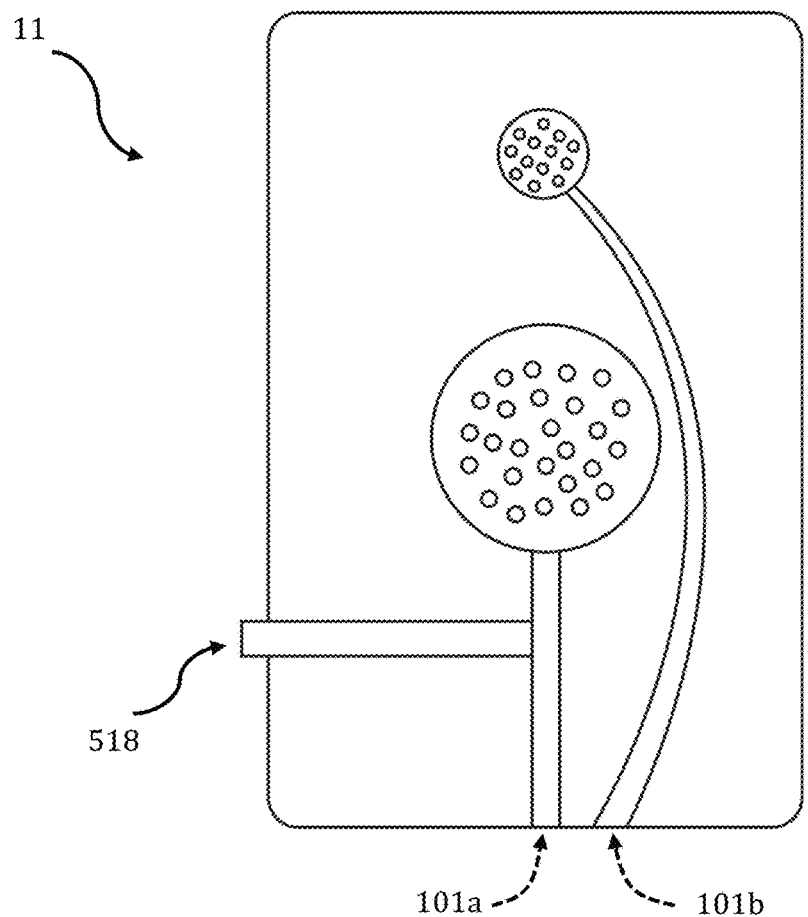
Figure 50:
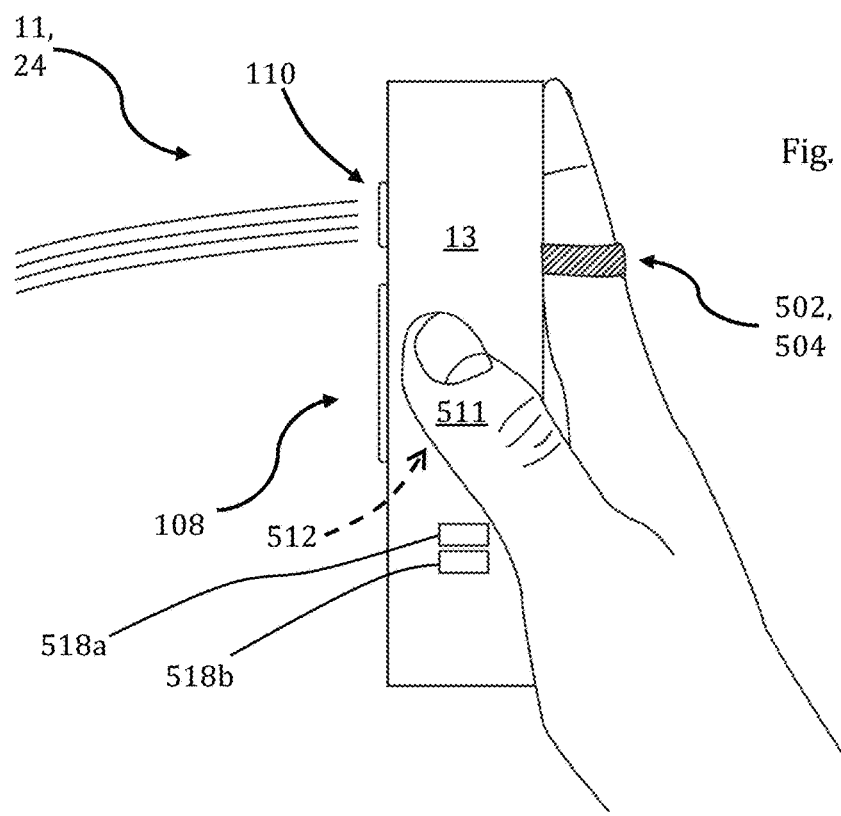

FIG. 49 shows a same or similar view as for FIGS. 45 to 48, but now showing an embodiment of the fluid outputting hand device, wherein there are two different fluid input points, one for flow of fluid for outputting via pressure-activated outputting, and one for flow of fluid for (selectable) distance outputting; and FIG. 50 shows an example embodiment of the fluid outputting hand device, wherein a thumb selecting arrangement is being used by a user, and fluid is thus being outputted from the device, from a distance.

Note: At some patent offices, when claim(s) are allowed for patent, it is required that Figures that do not show all the feature(s) of the/an invention claimed (and that are not within a scope of what is claimed) are denoted as 'not being claimed' (or words to that effect). Even in such case, it will be obvious that such Figure(s), even if denoted as 'not being claimed' (or words to that effect) in the Brief Description of The Drawings, may or do show some or many feature(s) that are essential, or preferable and/or optional, to what is claimed. Thus such Figure(s) (and/or disclosure related to such Figure(s) and/or embodiment(s)), should nevertheless be considered relevant (and/or may be relevant) to the/an invention claimed. It should also be stated more broadly that, whilst some or many of the Figures above may not show all of the feature(s) of the/an invention claimed, it will be obvious that such Figure(s) may or do show feature(s) that are essential, or preferable and/or optional, to what is claimed, which may or will be apparent, in light of the disclosure. Thus such Figure(s) (and/or disclosure related to such Figure(s) and/or embodiment(s)) should nevertheless be considered relevant to the/an invention claimed.

DETAILED DESCRIPTION

Referring to the drawings, there is shown a pet cleaning apparatus 10, which comprises a portable lightweight self-contained pre-pressurizable fluid control and mix delivery station 12, itself comprising a fluid containment chamber 14, a mechanism for pressurizing 16 said fluid containment chamber 14, at least one mix addition holding chamber 18, a fluid control and mix selecting system 20, and a housing 22 for housing said comprising elements. The apparatus 10 further comprises a glove device 24, a connecting member 26, and a manual selecting element 28.

The mix delivery station 12 is preferably oval in shape and sits flat against a surface.

The fluid containment chamber 14 can be filled with a fluid 30 by a user.

The fluid containment chamber 14 may be pressurized by a mechanism for pressurizing 16, which may be a hand pump 32. There are various methods of pressurising a fluid and/or chamber, which will be obvious to those with skill in the art, such as use of a pressurized canister as an example. In a preferred embodiment where there is provided a hand pump 32, the mechanism for pressurizing 16 features an internal pressurizing element 34.

The pressurizing mechanism 16 may also feature a safety pressure valve 36 so the fluid containment chamber 14 does not over-pressurize. Preferably it has a screw-top lid 37 so that it is removable and tightly screwable, thus fluid 30 can be poured into the fluid containment chamber 14 by a user, and the lid 37 can be tightly fitted prior to pressurization.

Preferably the containment chamber 14 is of plastics materials that have flexible qualities such that it can more adequately withstand high pressure due to flexible properties. It has a fluid chamber output point 38, and preferably has a line of sight volume measurer 40 which may have multiple volume measurements 42 so that volume of a fluid 30 in the chamber 14 may be easily seen by a user.

Preferably fluid 30 can be poured into the fluid containment chamber 14 via a large aperture into which the, preferably removable, hand pump 32 and/or mechanism for pressurizing 16 tightly fits.

There is provided about the housing 22 at least one mix addition holding chamber 18 which holds a mix addition 44 either within, or substantially within, the station 12. There may be a first mix addition 46, and a second mix addition 48, or any number of mix additions 44, the system being scalable. A mix addition holding chamber 18 may have an opening 50, which may open to a compartment 52. The holding chamber 18 comprises an opening 50, a mix addition compartment 52, for holding of a mix addition 44, and a mix addition output point 54, so that a mix addition 44 may be outputted from the mix addition compartment 52 for mixing.

A mix addition 44 may be a fluid, gel, powder, or any other materials. It may be a powder or liquid poured into the mix addition holding chamber 18, or it may be, as an example, but in no way limited to such an example, a shampoo contained within a mix addition container 56, which may be a bottle. Thus a mix addition container 56 or a bottle and/or container containing any mix addition agent, such as a conditioner or a treating agent, may be locked fixedly into the mix addition compartment 52, the container 56 thus functioning as a cartridge. Thus preferably a dimension of the opening 50 of the mix addition holding chamber 18 matches a circumferential shape of a mix addition container 54, the container 54 thus slotting into the holding chamber 18 for mixing.

Fixing of a mix addition container 56, which may act as a cartridge, within, or substantially within, a housing 22 of the station 12 may be achieved in many ways which will be obvious to those with skill in the art. An example of a possible embodiment of a fixing mechanism will herein be described which in no way limits the scope of the invention and is described by way of example only.

Figure 8:
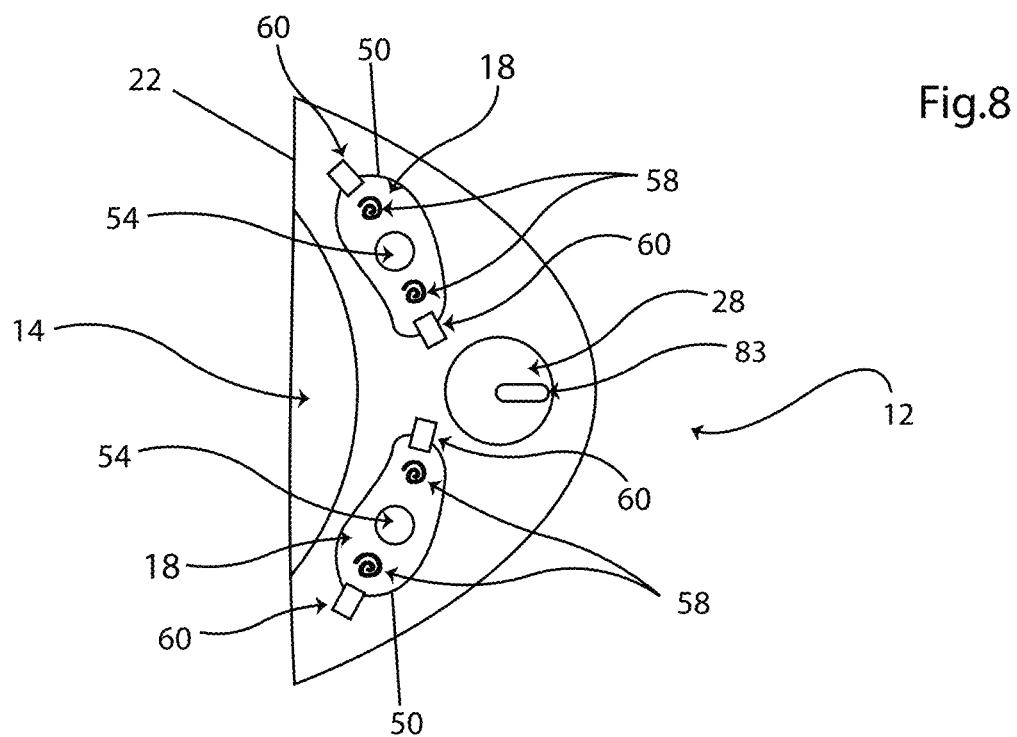
FIG. 8 is a sawn off bird's eye view of an embodiment of a mix addition holding chamber where a mix addition container is lockable within a housing of the station, functioning as a cartridge.

With reference to FIG. 8, there is shown a sawn-off section of the housing 22, focusing primarily on the at least one mix addition holding chambers 18 from a bird's eye view. A possible embodiment for a fixing mechanism is shown. A chamber opening 50 may lead to a mix addition holding chamber 18, which may feature at least one springs 58 on a floor of the holding chamber 18, and a mix addition output point 54, which may lead to a mix addition output tube 55, thus facilitating mixing.

As a mix addition container 56, which may be a shampoo bottle itself functioning as a cartridge, is downwardly pressed and inserted into the mix addition holding chamber 18, the at least one floor springs 58 resist, attempting to push the container 56 out of the chamber 18. At a top of the chamber opening 50, there may be provided at least one fixing member 60 for holding a mix addition container 56 within a mix addition holding chamber 18. The fixing member 60 may itself be spring loaded and may be downwardly curved at an overhanging edge so that when pressurized from above, preferably by a container 56, it may recede, thus facilitating entry of a mix addition container 56 through the chamber opening 50 and into the mix addition holding chamber 18, fixedly fastening the container 56 within the holding chamber 18. Thus the at least one floor springs 58 at a base of the chamber 18 facilitate removal of the, feasibly cartridge-based, mix addition container 56 by upwardly pushing a portion of a mix addition container 56 out of the housing 22 so that it can be removed by a user.

If a mix addition 44 is a powder or is received by the station 12 without a container 56, it may be poured into a mix addition holding chamber 18. It is feasible that an addition holding chamber 18 has a line of sight measurer 40.

Let it be known that the aforementioned method for holding and fixing of a mix addition container 56 within a housing 22 of the station 12 is described by way of example only and in no way limits the scope of the invention 10. There are many ways to fixedly hold a container 56 in a compartment removably and replaceably which will be obvious to those with skill in the art, and various modifications will be apparent to persons skilled in the art without departing from the scope of the invention 10.

Other possible embodiments of a holding mechanism for holding a mix addition 44 include, but are not limited to, a bayonet system, a screw-in system, and an open-and-close top system. It is feasible that there is provided no fixing system and that a mix addition container 56 is simply inserted into a chamber 18. It is feasible that a mix addition container 56 includes an aperture designed only to release a mix addition 44 when inserted into a mix addition holding chamber 18 so that a mix addition container 56 may be removable from the station 12 without spillage.

A fluid 30 from the fluid containment chamber 14 is received by a fluid control and mix selecting system 20 via the fluid chamber output point 38. A fluid control and mix selecting system 20 may feature a valve 21.

The fluid control and mix selecting system 20 will now be described in accordance with a preferred embodiment, featuring a valve 21. There are many possible embodiments of a fluid control and mix selecting system 20, which will be obvious to those with skill in the art, and the description of the valve 21 is given by way of example only, in no way limiting the scope of the invention 10, which may have any fluid control and mix selecting system.

The fluid 30, which may be put under pressure via the pressurizing mechanism 16, is received into the valve 21 via a fluid input aperture 62. It is also feasible that a fluid input is entered through a top of the valve 21. At least one mix additions 44 may be received into the valve 21 via at least one mix addition aperture 64, which features about a casing 65 of the valve 21. Preferably the valve 21 has an output aperture for outputting a fluid, although fluid may simply be outputted from a base 67 of the valve 21. Thus a fluid input may be inputted into the valve 21 and outputted from the valve 21. The valve 21 may be movable and/or rotatable. Thus if rotated and/or moved, the at least one mix addition apertures 64 similarly move. When an aperture 64 is aligned with a mix addition output point 54, which may further comprise a mix addition output tube 55, an addition 44 is received into the valve 21. In this way a first mix addition aperture 66 may receive a first addition; a second mix addition aperture 68 may receive a second addition, and so on. Thus a fluid may be inputted and mixed for outputting. Fluid may be prevented from being outputted from the station 12 by halting input of a fluid into the valve 21, or from the valve 21. The valve 21 may be configured so that multiple mixing may take place or so that only one mix addition 44 is mixed at one time. This is easily achieved via configuration of apertures. The valve 21 thus facilitates flow control and mixing. A valve 21 is described by way of example only of a fluid control and mix selecting system 20, which is not limited to including a valve 21.

It is feasible that an aperture 64 in the fluid control and mix selecting system 20 is movable independently, so that each mix addition 44 may be added via an independent movable mix addition aperture 64 and hence an independent manual selecting element 28. Thus the manual selecting element 28 may comprise multiple buttons and/or switches and the like.

Figure 1:
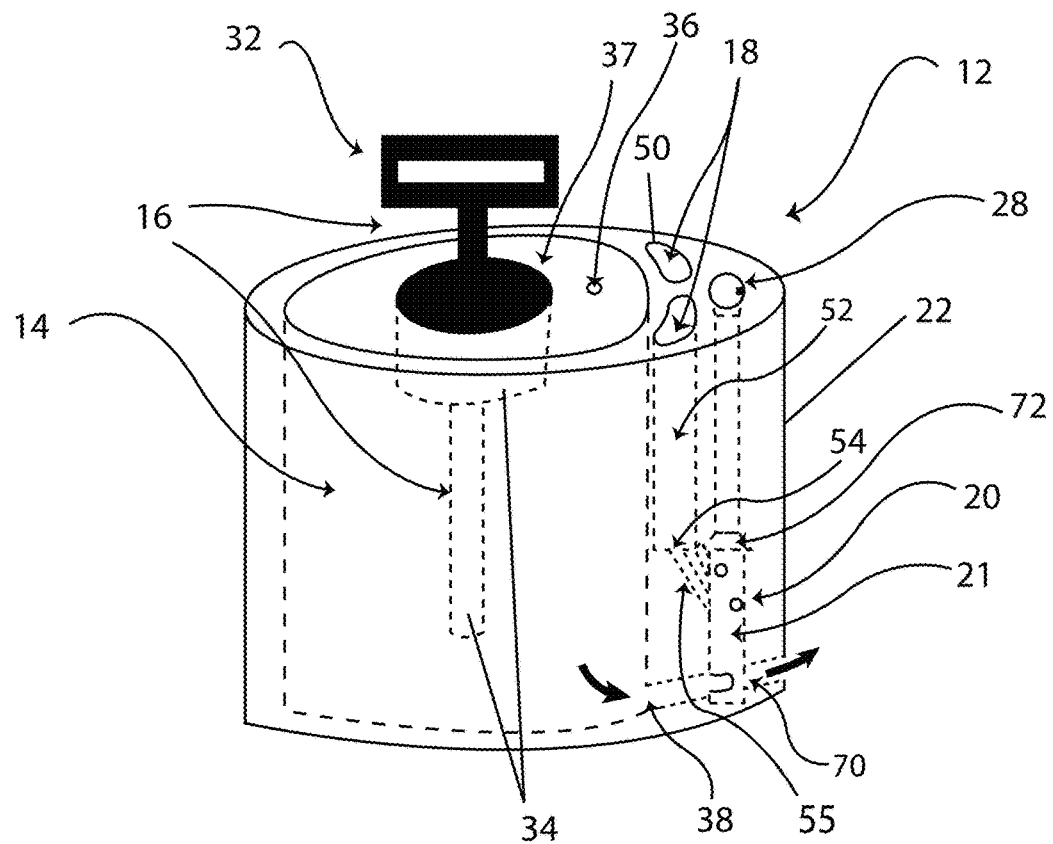
Figure 2:
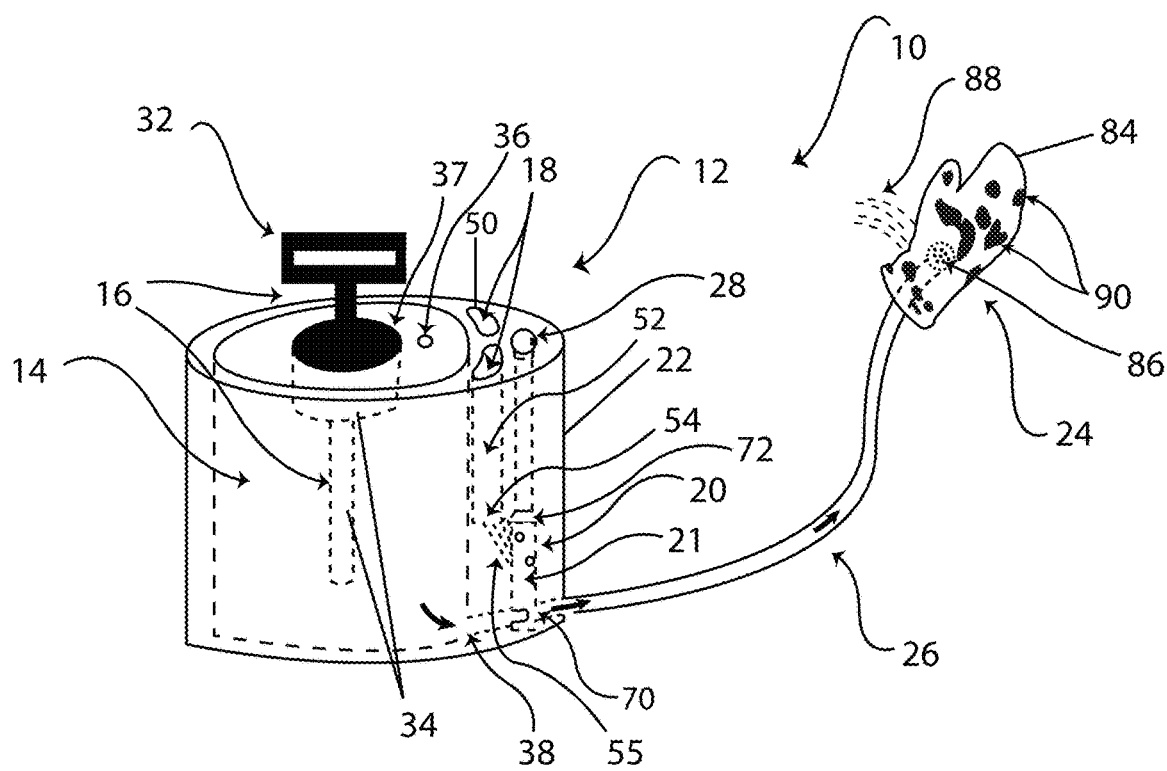
FIG. 2 is a perspective view of the portable lightweight self-contained pre-pressurizable fluid control and mix delivery station and a glove device.
Figure 3:
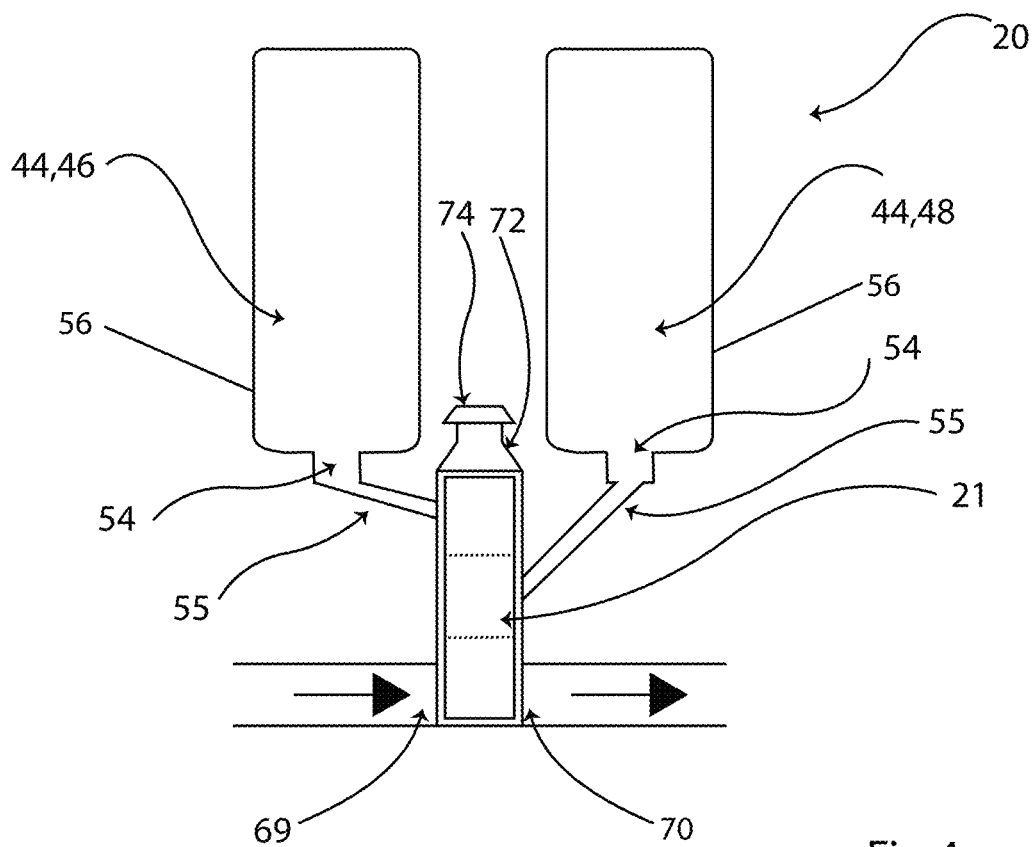
FIG. 3 is a diagrammatic cross sectional view of an embodiment of a fluid control and mix selecting system.
Figure 4:
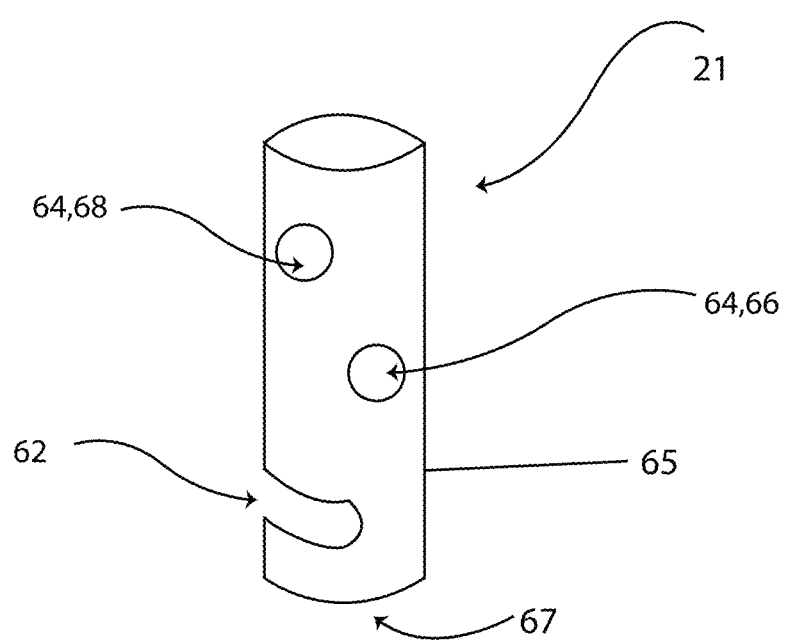
FIG. 4 is a perspective view of a fluid control and mix selecting valve.

Referring to FIG. 3, where the fluid control and mix selecting system 20 is shown diagrammatically as a cross section, there is shown a fluid input point 69 for the valve 21. It can be seen that if an input aperture 64 about the valve 21 aligns with a mix addition output tube 55 that contains a mix addition 44, mix addition 44 is drawn into the mix selecting system 20 and is mixed with a fluid for outputting.

Referring to FIG. 5, there is shown an embodiment of the invention 10 where a manual selecting element 28 is sideways protruding from the station 12. In a preferred embodiment of the selecting element 28, as shown in FIG. 6 and FIG. 8, the manual selecting element 28 is located on a top of the station 12, beside the at least one mix addition holding chambers 18. Thus the station 12 can be positioned below a user, the user retaining visibility and easy accessibility of the selecting element 28.

The fluid control and mix selecting valve 21 may have a knob or head 72, which may have a gear member 74 or the like so that a second gear member 76 may connect to the first gear member 74 thus facilitating movement of the valve 21 via movement of the manual selecting element 28 by a user, which may be achieved via a connecting cog 78. There are many ways of facilitating movement of a valve 21 and/or mix selecting system 20 via manipulation of a manual selecting element 28 by a user, which will be obvious to those with skill in the art. It is feasible that the valve 21 and manual selecting element 28 may comprise one part, thus movement of the selecting member 28 moving the fluid control and mix selecting valve 21.

Figure 7:
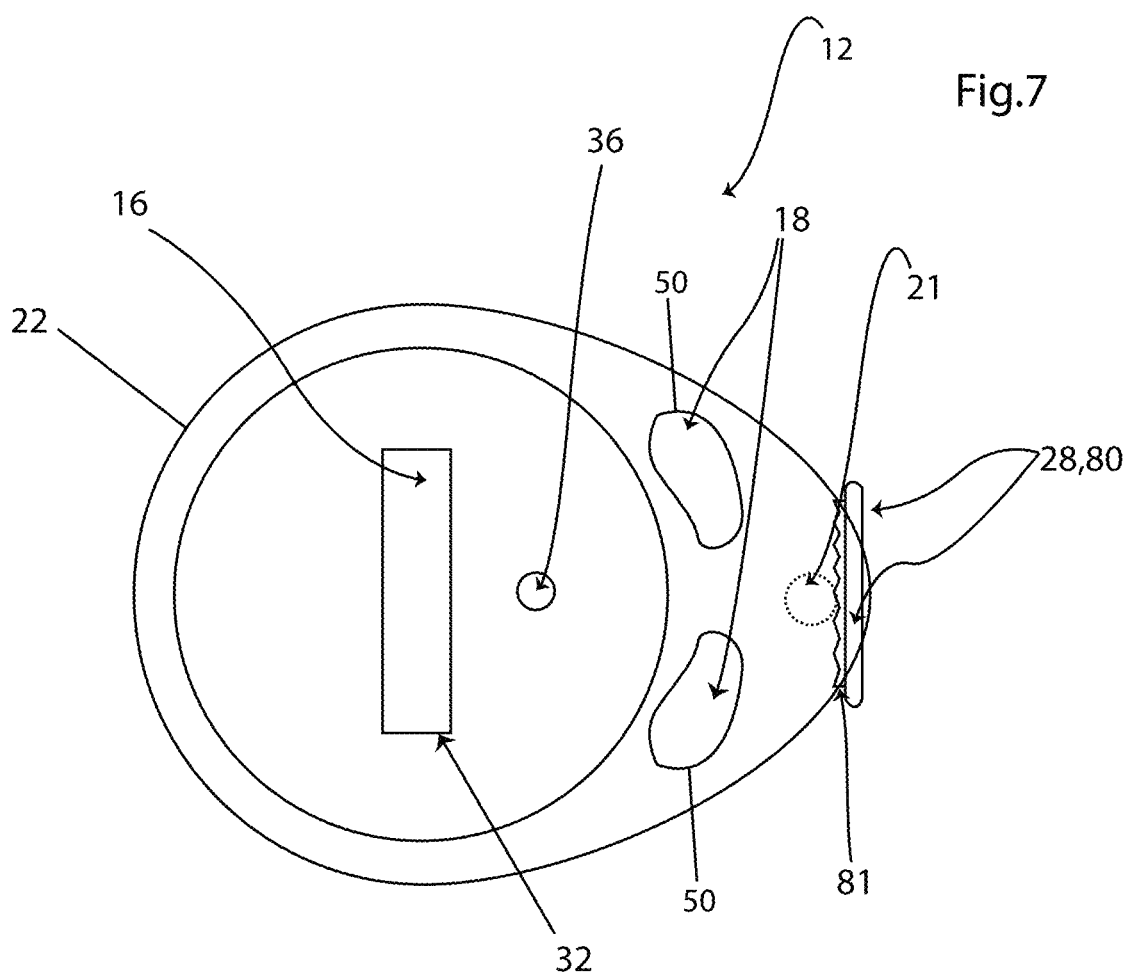
FIG. 7 is a bird's eye view of another embodiment of the manual selecting element.

A manual selecting element 28 may be engineered by various methods that will be obvious to those with skill in the art. In a preferred embodiment, as shown in FIG. 1, FIG. 2, FIG. 6, FIG. 8, and FIG. 9, the manual selecting element 28 is provided on a top facing side of the station 12. Referring to FIG. 7, there is shown an embodiment of the invention where the selecting element 28 is a tooth configuration 80, where the manual selecting element 28 either comprises, or is attached to, a tooth 81 that is connected to the fluid control and mix selecting valve 21. Thus the at least one apertures 64 of the valve 21 are moved via movement of the tooth configuration 80.

Figure 9:
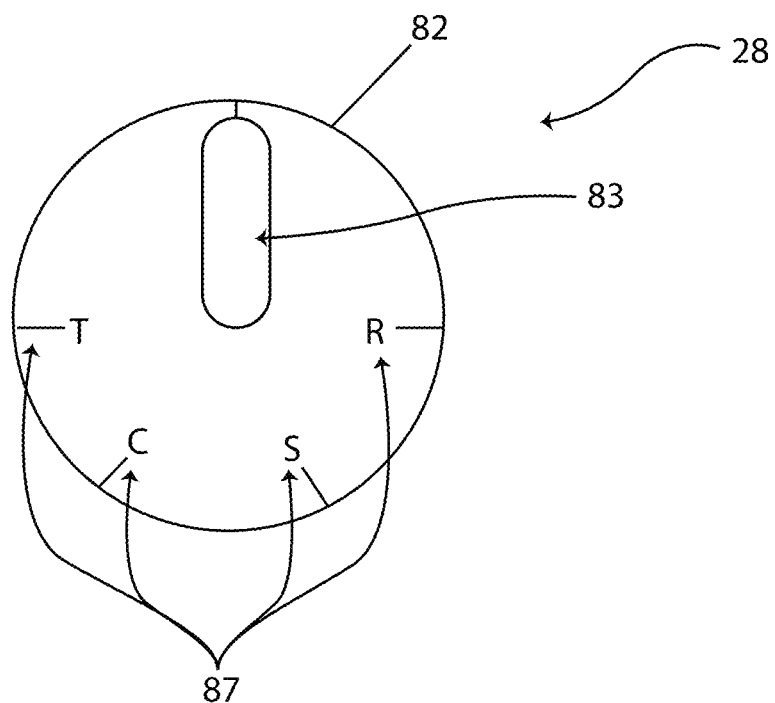
FIG. 9 is a view of a preferred embodiment of a manual selecting element.
Figure 10:
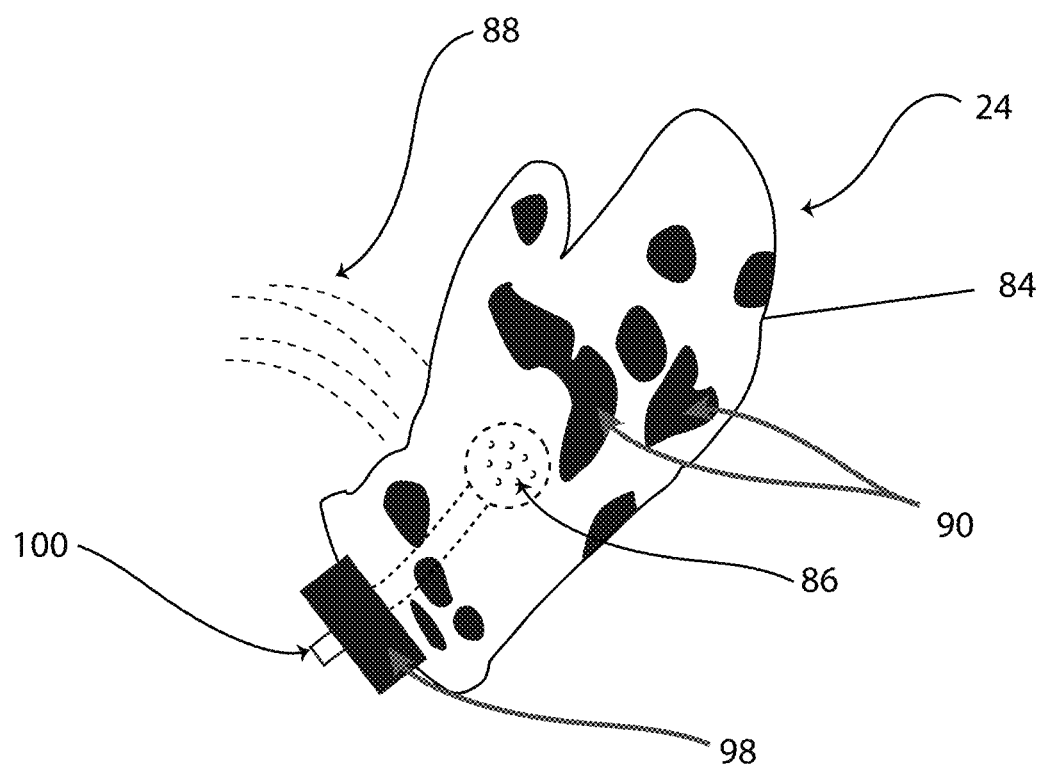
FIG. 10 is a perspective view of the glove device displaying a, preferably dog, animal mimicking fur exterior.
Figure 11:
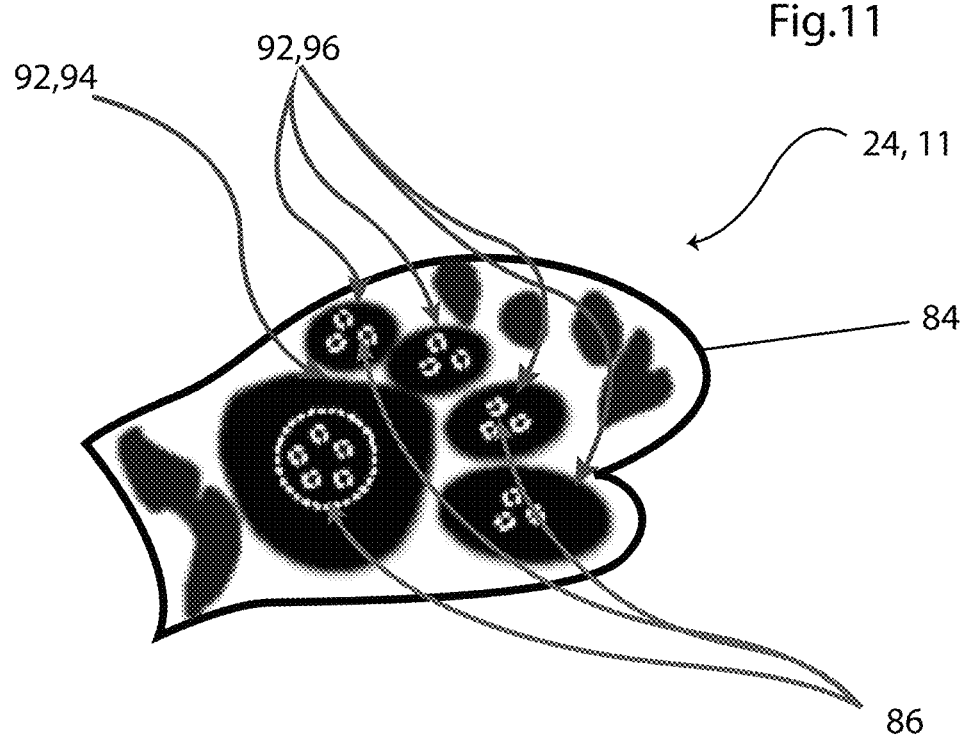
FIG. 11 is a perspective view of a palm of the glove device, (and is also an example of a fluid outputting hand device, configured for pressure-activated outputting of fluid, and also selectable distance outputting of fluid)

In a preferred embodiment of the manual selecting element 28, and referring particularly to FIG. 9, there is shown an embodiment where the manual selecting element 28 is a, preferably circular, dial knob 82, which is turnable. Thus mix and fluid output options 87 can be selected by a user via turning of the manual selecting element 28. Mix and fluid output options 87, which may include but are not limited to a default 'OFF' setting, a rinse setting, a shampoo setting, a conditioning setting, and a treat setting may be accessed by a user via turning of the dial knob member 84. This description of a manual selecting element 28 is provided by way of example only and in no way limits the scope of the invention 10. In a preferred embodiment of the selecting element 28, there may be provided options for an 'OFF' setting, a rinse setting where unmixed fluid is outputted, a shampooing setting, and a conditioning setting.

Referring to the drawings, there is shown a glove device 24, which is connected to the station 12 and hence fluid output of the station 12 via a connecting member 26 which may be an umbilical and/or a tube. The glove 24 comprises an outer covering 84, the covering 84 preferably fully housing a hand of a user, and at least one palm aperture 86 about a palm side of the device 24 so that mixed and/or unmixed fluid from the station 12 may be outputted via the glove 24 as a final output fluid 88.

Preferably the glove device 24 is covered and adorned in a, preferably synthetics, fur covering, which may have spots and/or markings 90 which mimic coverings of a, preferably dog, animal. This adds design appeal and offers added comfort for a pet when being petted and/or cleaned. Preferably, it is shaped as a mitt. The fur may act as padding.

The at least one palm apertures 86 may form a nozzle.

On a palm side of the glove 24, preferably the, preferably synthetics, fur covering is configured to mimic a shape of a, preferably dog, paw 92. It is feasible that a nozzle and/or at least one palm apertures 86 are located underneath, or substantially underneath, the paw 92, the paw 92 thus providing further padding so that abrasion and/or friction is not caused to a coat and/or skin of a pet. The paw 92 and/or fur covering may also act as a subduer to an outputting flow of fluid output from the glove 24, so that rather than a high velocity spray of fluid being sprayed on to a pet, the pet is cleaned via the damp paw 92 which receives fluid from the at least one apertures 86 about a palm of the device 24 and blocks the fluid from outputting directly, acting as a sponge that may be used to clean the pet, which may save water and clean effectively. Preferably the paw 92 comprises a pad 94 and four toe-pads 96, although it is not limited to this configuration.

It is feasible that there are provided at least one palm apertures 86 about multiple locations on the device 24, thus outputting a final output fluid 88 from multiple sites across the glove 24. It is feasible that a palm aperture 86 includes and/or is provided with a, preferably silicone and/or rubber, protruding element, so that a pet may be petted, cleaned, and simultaneously massaged by a, preferably silicone, protruding elements. Elements that improve massaging and/or cleaning of a pet, such as raised and/or tapered surfaces, may be included on the device 24.

There may be provided further enhancements to the glove device 24, such as a connection point 98 that may allow the glove to be connected to a mains supply of fluid, such as a garden hose and/or a tap, or via a double tap connector device which is commonly used to connect a shower head to a pair of bath taps. Thus the glove device 24 may be detachable and/or have an ability to function independently from a fluid input from the station 12. The connection point 98 may feature a universal connection point 100 which may either be directly connectable to an external fluid input source, or may require a connector, so that an external fluid input source may be connected to the glove 24.

Figure 12:
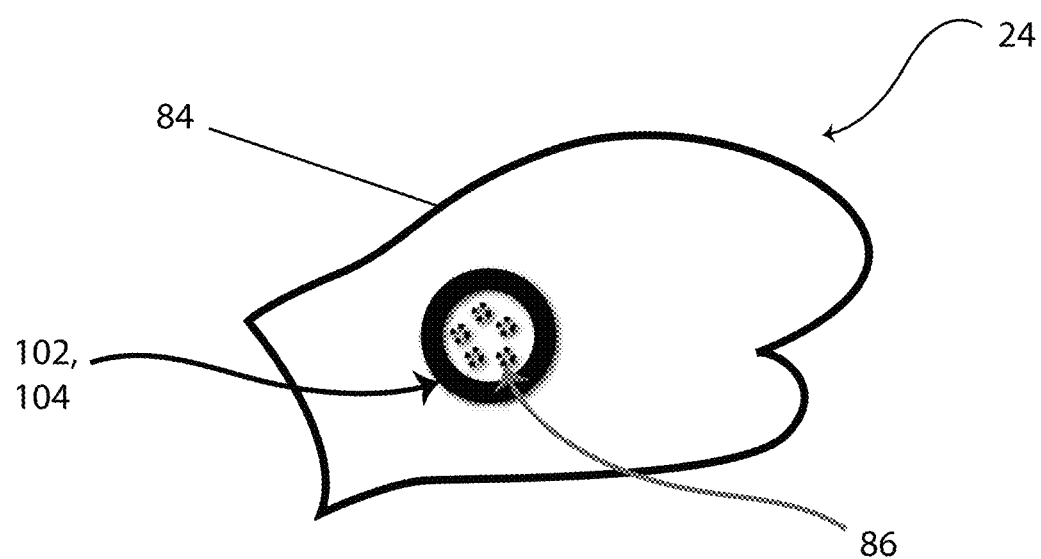
FIG. 12 shows a possible embodiment of a pressure activated unit on a palm of the glove device, (also usable for the/a fluid outputting hand device)

Referring to FIG. 12 and to a preferred embodiment of the device 24, there may be provided a pressure activated unit 102 on a palm of the device 24, which may be and/or feature a pressure-activated rim 104. Thus a final fluid output 88 may be controlled by a user so that pressure to the pressure activated unit 102, which may be depressible, either opens, or closes a channel for fluid to output from the at least one palm apertures 86 on the glove 24. Control may be digital or analogue. In this way, fluid output from the glove 24 may be activated by applying pressure to a surface on the glove 24, which may save significant amounts of water, may guarantee targeted application of fluid to a desired location, and may stop a pet from attempting an escape due to seeing and/or hearing copious amounts of fluid outputting, which may cause anxiety for a pet. In this way, fluid may never be seen by a pet during a pet cleaning process, which is revolutionary, and may significantly improve a pet cleaning experience.

It is feasible that a glove 24 may be designed so that fluid output may be halted by pressure to a surface by the glove 24, the pressure activated unit 102 in such a case closing a channel for fluid outputting by the glove 24. In a preferred embodiment, fluid output is activated by pressure to a surface of the glove 24.

Figure 13:
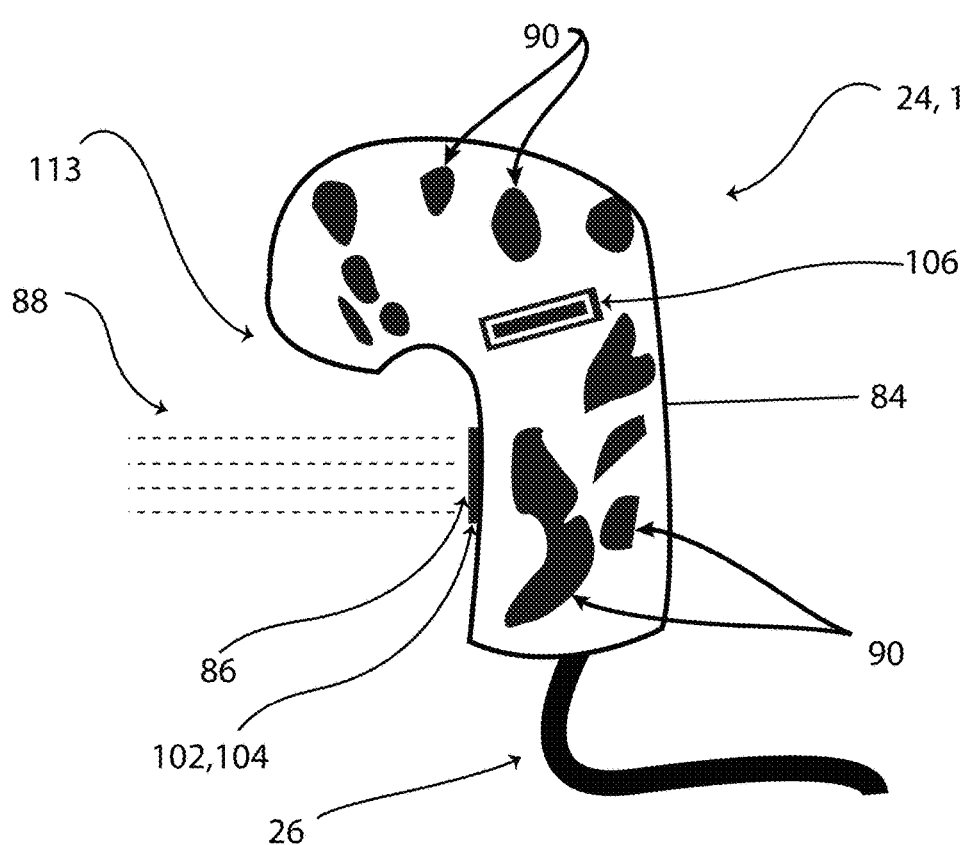
FIG. 13 shows a possible embodiment of a movement activated unit that facilitates distance spraying (and thus outputting) from the glove.

Referring to FIG. 13 there may be provided about the glove 24 a movement-activated unit 106 and/or function so that movement by a digit or digits of a user whilst wearing the glove 24 activates a final fluid output 88 from the at least one apertures 86 of the glove device 24. Thus clenching of a hand of a user may activate output of a final output fluid 88. This may be achieved in many ways that will be obvious to those with skill in the art, such as a ligamental wire, which opens and closes a channel to a fluid when stretched, or a depressible valve that opens an aperture. It is feasible that a fluid output may be outputted from a non-palm side of the device 24, such as a back of a hand.

Thus it is feasible fluid output from the glove 24 may be activated by both pressurizing on a, preferably pet coat, surface, and by movement of a digit or digits, so that fluid output is always aimed at a desired surface. The pressure activated unit 102 may guarantee a fluid flow is withheld and only outputted from the glove 24 when in contact with a pet. The movement activated unit 106 and/or function may allow an area of a pet to be sprayed and thus cleaned from a distance by a user, which may be beneficial in the cleaning of particularly dirty areas of a pet, such as under a tail. Thus fluid can be saved whilst intuitive control of a fluid output is retained fully by a user, the manual selecting element 28 being easily selectable with a second hand of the user. This aids intuitiveness, correct cleaning, and provides a large saving of fluid outputting, which has various benefits.

Figure 14:
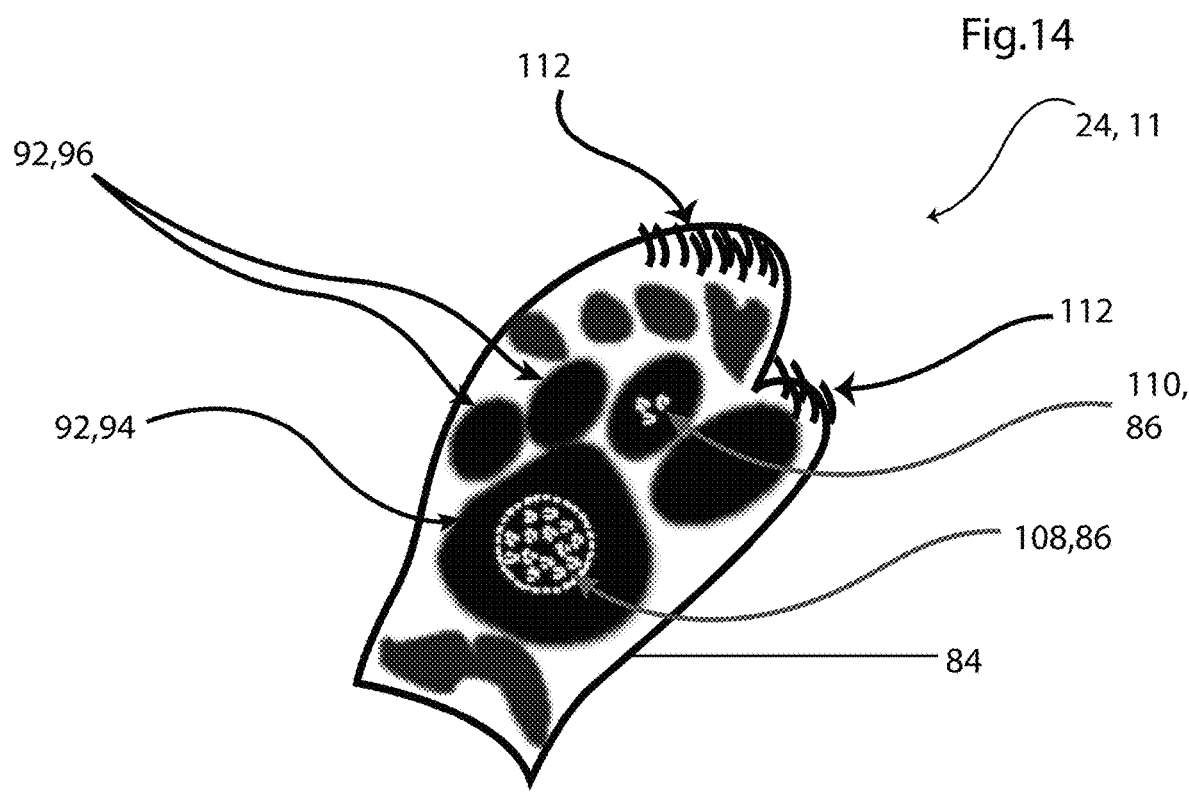
FIG. 14 shows a scrubbing surface that may be usable without activating the pressure activated unit, and shows a possible secondary fluid output point on the glove.

Referring to FIG. 14, there is provided an embodiment of the glove device 24 where there is provided a main final fluid output point 108, which comprises at least one palm apertures 86, and a secondary final fluid output point 110, which comprises at least one apertures 86, which may be substantially placed around a palm and/or hand of a user.

In such an embodiment, it is feasible that fluid is outputted from the main final fluid output point 108, which may be located centrally around a palm and/or paw pad 94 of the device 24, via pressurization of a pressure activated unit 102, so that fluid is only outputted when a palm of a hand is in contact with a desired surface to be cleaned. It is also feasible that fluid may be outputted from the secondary final fluid output point 110 via activation of a movement activated unit 106 so that the two final fluid output points 108,110 are independent of one another. The movement activated unit 106 may also be pressure activated.

Preferably a secondary final fluid output point 110 outputs fluid at greater pressure, thus being sprayable from a distance for distance cleaning. This may be achieved by providing less apertures 86 on a secondary fluid output point 110 than a main final fluid output point 108, thus outputting a final fluid output 88 at greater pressure than a main final fluid output point 108, facilitating powerful and targeted spraying from a distance by a user onto a desired and targeted surface. This has substantial benefits for a user, including powerfully and accurately targeting a problem area or an area that may be undesirable to touch, and intuitively and seamlessly interchanging to a full contact clean, which may output a fluid at less pressure for cleaning. Furthermore, there may be provided a scrubbing surface 112, which may comprise, preferably silicone, nodules, and may preferably be located about an extremity of the glove 24, which may be similar in location to the tips of a user's fingers, which are preferably inside the glove device 24.

Thus three important cleaning functions may now be provided for a user; a pet can be cleaned via pressurised contact via a pressure activated unit 102; a pet can be cleaned at a distance without contact via targeted spraying activated by a movement activated unit 106, and a coat of a pet may also be cleaned and scrubbed with a scrubbing surface 112, which may be located in such a way that a pet can be scrubbed with the scrubbing surface 112 without activating the pressure activated unit 102. Thus a lather may be scrubbed into a coat of a pet focusedly with the scrubbing surface 112, without activating a final fluid output 88, which is beneficial for effective cleaning if a lather is already present on the coat. It may be possible to activate the second final fluid output point 110 whilst the pet is scrubbed or a pet may be scrubbed independent of fluid output.

A pressure activated final fluid output point 108 and/or a secondary final fluid output point 110 that may output fluid at a greater pressure can be achieved in many ways that will be obvious to those with skill in the art. It is feasible that activation of the main final fluid output point and activation of the secondary final fluid output point 110 may be achieved via one pressure and/or movement activated unit. In a preferred embodiment, a main final fluid output is outputted via pressurisation of a pressure activated unit 102 and a secondary final fluid output which may be pressurised to a greater degree is outputted via activation of a movement activated unit 106 which is independent of a pressure activated unit 102.

A secondary final fluid output point 110 as shown in FIG. 14 that may spray fluid in a pressurised and targeted manner may be achieved, as an example, via a downwardly depressible valve 116 that features an aperture 118. When the depressible valve 116 is depressed, the aperture 118 aligns with a second aperture and/or fluid reservoir 114 so that a pressurised fluid flows through the apertures and is outputted from the secondary final fluid output point 110.

A main final fluid output point 108 may be achieved in many ways that will be obvious to those with skill in the art. Pressure applied to a pressure activated unit 102 may depress the unit, which may open a channel to a, preferably pressurized, fluid reservoir 114. Thus if the unit 102 is depressed, fluid is outputted from a main final fluid output point 108. It is feasible that a main final fluid output point 108 may be designed in such a way that fluid is outputted substantially slower and under less and/or different pressure than it is received into the device 24, so that it is of a pressure than will not scare a pet, will not waste fluid, and will effectively clean a pet. It is feasible that fluid output pressure of the main final fluid output 108 and a secondary final fluid output point 110 or any final fluid output point may be controllable by a user.

Figure 15:
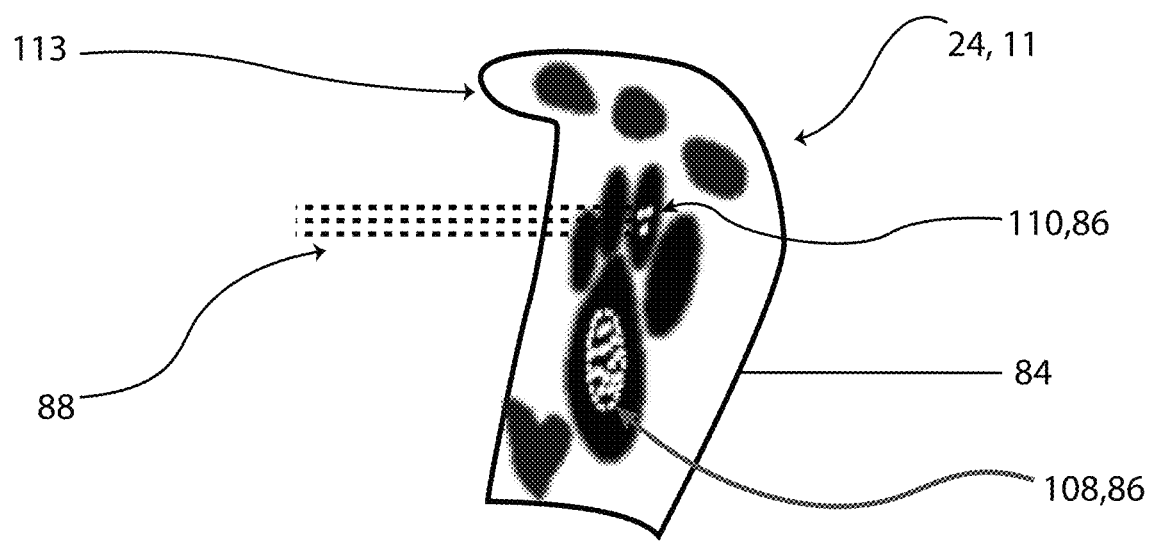
FIG. 15 shows the movement activated unit and the secondary fluid output point in action, (and clearly shows an embodiment of a/the fluid outputting hand device, configured for pressure-activated outputting of fluid, and also selectable distance outputting of fluid)

Referring to FIG. 15 there is shown an embodiment of the glove device 24 where a secondary final fluid output point 110 has been activated by bending of a user's fingers. Because a hand of a user has been moved inside the device 24, creating an overhang 113, pressure has been applied to a movement activated unit 106 which aligns an aperture 118 so that fluid is outputted from the glove 24, preferably under pressure, via the secondary final fluid output point 110. Bending by a finger or fingers of a user may depress a valve 116 that aligns an aperture 118 with a fluid input source, which may be a reservoir 114 so that fluid is outputted. It is feasible that extending of one or more digits may similarly activate fluid output, thus bending of a digit could be extendingly bending of a digit.

Figure 16:
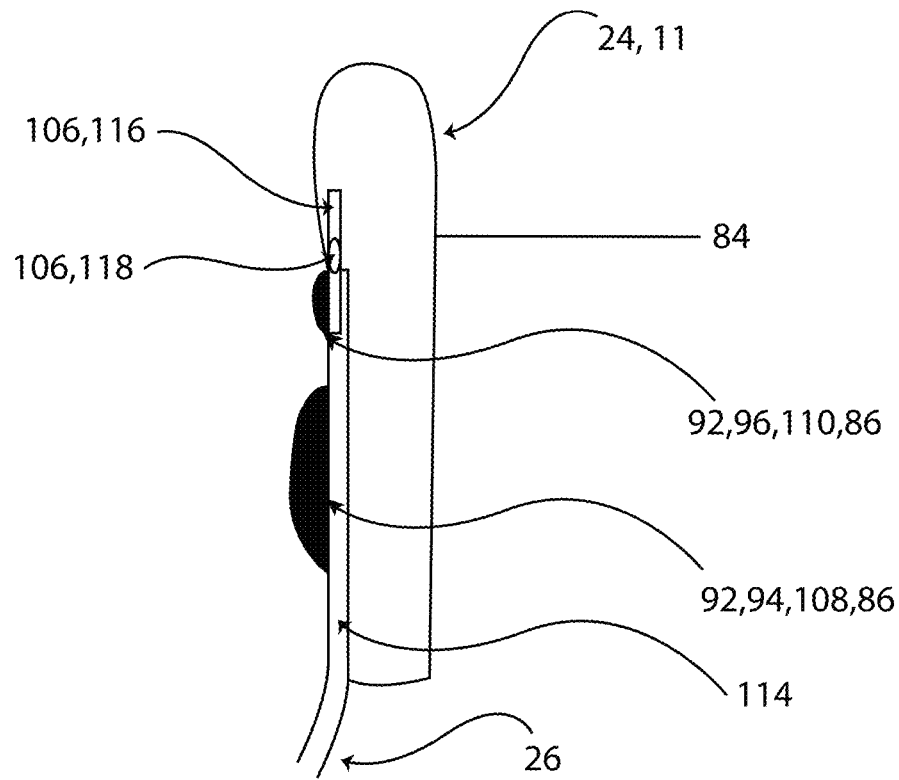
FIG. 16 is a cross sectional view of an embodiment of a movement activated unit which has not been activated.

Referring to FIG. 16, a possible embodiment of the device 24 is shown for outputting fluid via movement of a movement activated unit 106. Fluid is inputted into the device 24 via the connecting member 26, which forms a small fluid reservoir 114 inside the device 24. The fluid in the reservoir 114 cannot gain access to a, preferably secondary, fluid output point 110, the path being blocked by a movement activated unit 106, which may be a depressible valve 116 that features a movable element and an aperture 118. The unit 106 blocks fluid from the at least one output apertures 86 of the, feasibly secondary, fluid output point 110, which may be designed as a paw pad 96 of a paw 92.

As aforementioned, a movement activated unit 106 may be pressure activated.

Figure 17:
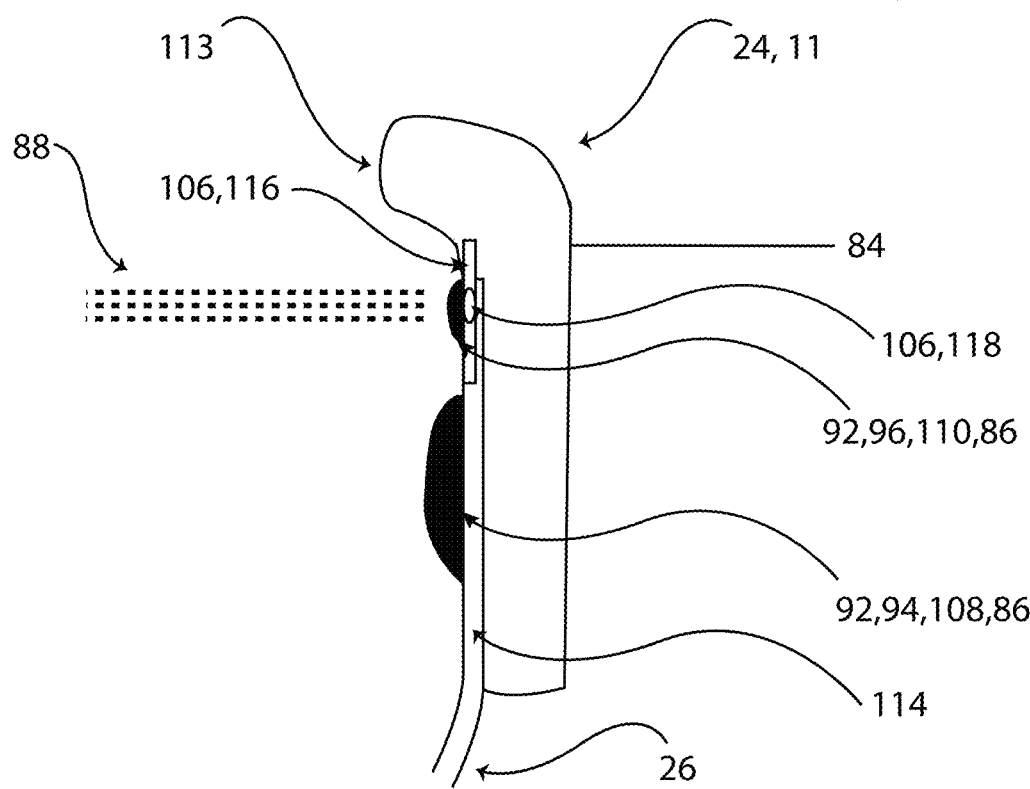
FIG. 17 is a cross sectional view of an embodiment of a movement activated unit which has been activated, thus facilitating outputting of a fluid from the glove.

Referring to FIG. 17, a same embodiment of the glove device 24 and movement activated unit 106 is shown where a user's fingers have been moved, creating an overhang 113. The movement activated unit 106 has been moved, thus aligning an aperture 118 so that fluid is outputted from the fluid reservoir 114 via at least one final fluid output apertures 86.

Similarly, fluid from a fluid reservoir 114 or from the connecting member 26 may be outputted from a main final fluid output point 108 utilising similar means, such as a depressible member that aligns an aperture with a fluid input point from a fluid source. When not depressed, the member may block access of a fluid to the main final fluid output point 108, thus not facilitating outputting of a fluid from the device 24.

These examples of how to output fluid from a fluid outputting glove device 24 via a pressure activated unit 102 and/or a movement activated unit 106 are given by way of example only and in no way limit the scope of the invention 10. There are many methods for outputting a fluid via pressure and/or movement activated units 102, 106, which will be obvious to those with skill in the art, and various modifications will be apparent without departing from the scope of the invention 10.

Preferably there are two independent mechanisms that facilitate distance spraying, and pressure activated fluid outputting. Preferably a main final fluid output point 108 and a secondary fluid output point 110 for spraying are separate. It is feasible that one mechanism and/or member could facilitate both, the member both facilitating outputting from a main final fluid outputting point 108 via pressure, and being moved and/or pressurized by movement of one or more fingers of a user, thus facilitating distance outputting.

Figure 18:
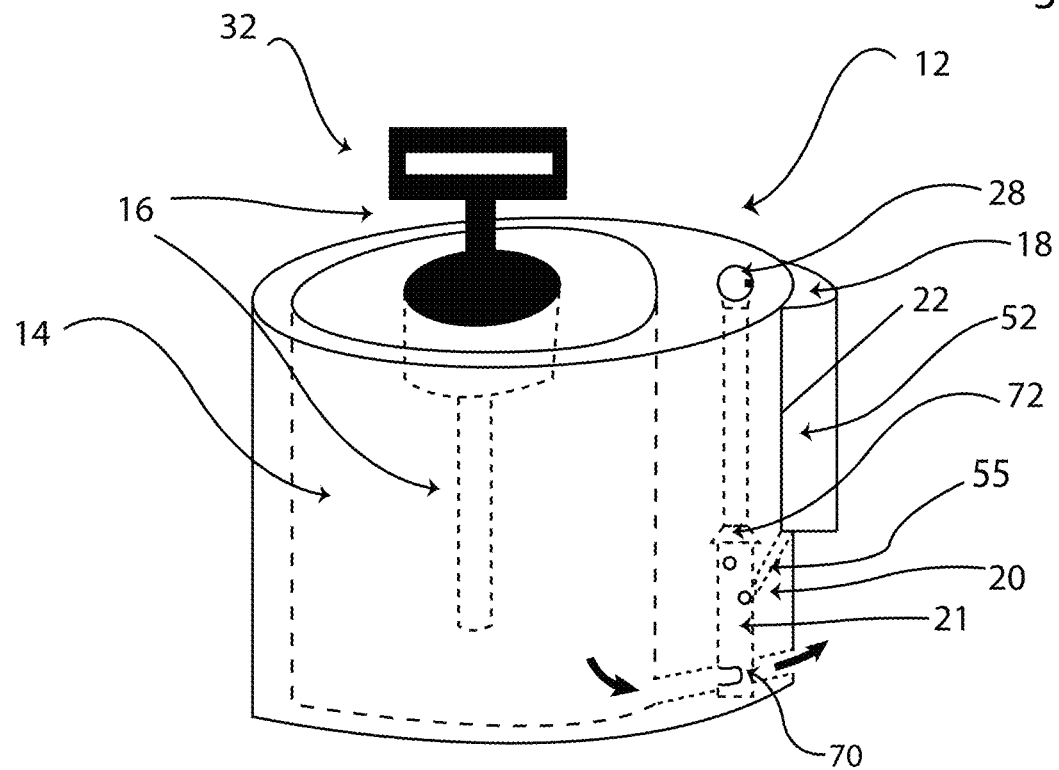
FIG. 18 is a perspective view of the housing of the station featuring a mix addition holding chamber that is on and about the station.
Figure 19:
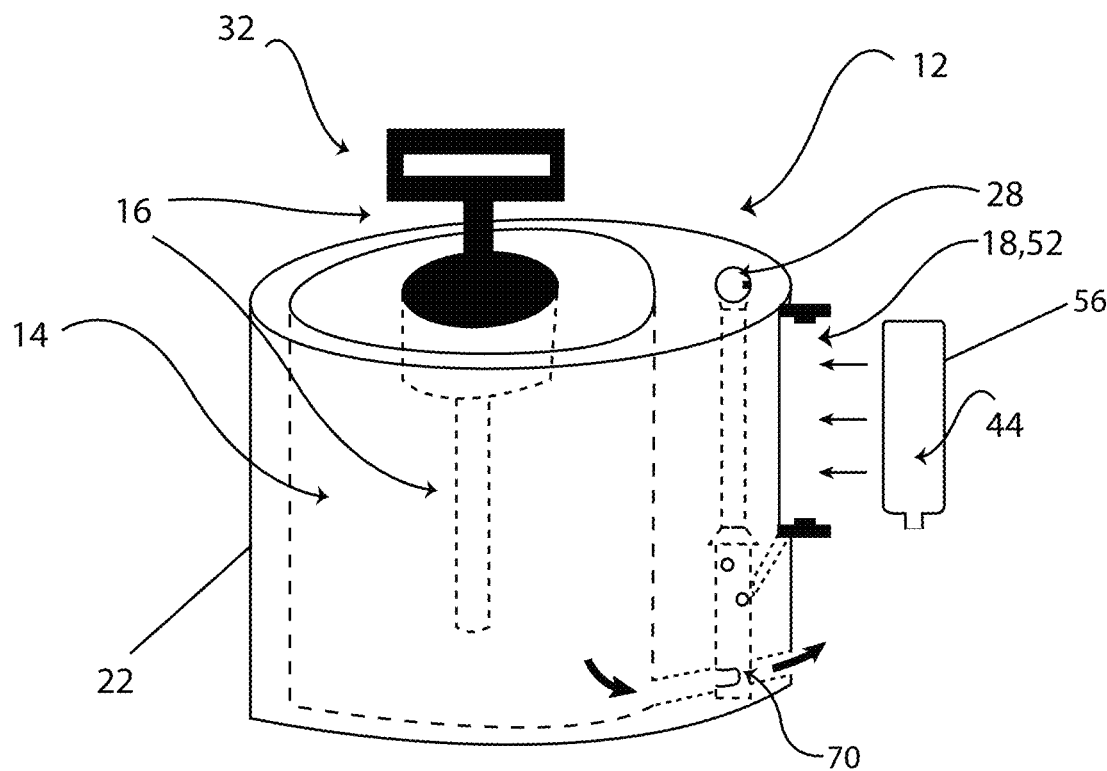
FIG. 19 is a perspective view of the housing of the station featuring a mix addition holding chamber housed on or about the station, and thus, broadly speaking, is an example of the housing comprising a mix addition holding chamber.

Referring to FIG. 18 and FIG. 19, there is shown an embodiment of the station where a mix addition holding chamber 18 is an integral part of the station 12, housed on or about the station 12. Referring to FIG. 19, a mix addition container 56 may be fixed into a chamber 18 substantially externally to the station 12.

Figure 20:
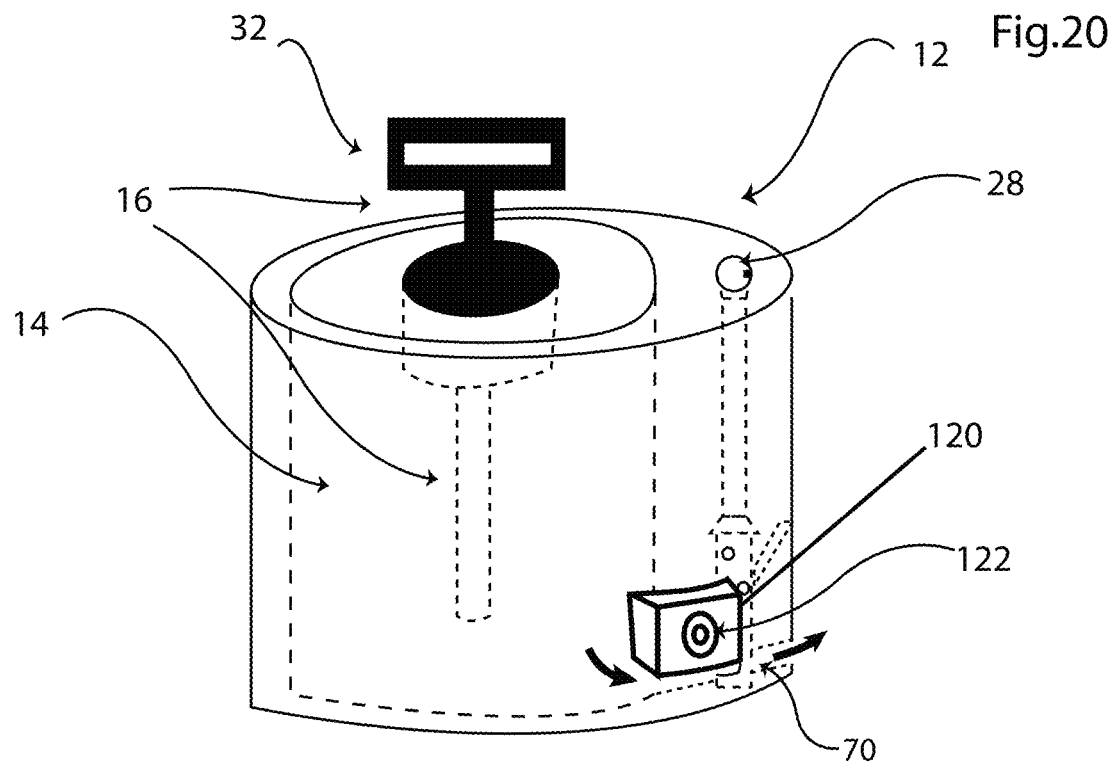
FIG. 20 is a perspective view of the station where there is provided an external fluid input receiver.
Figure 21:
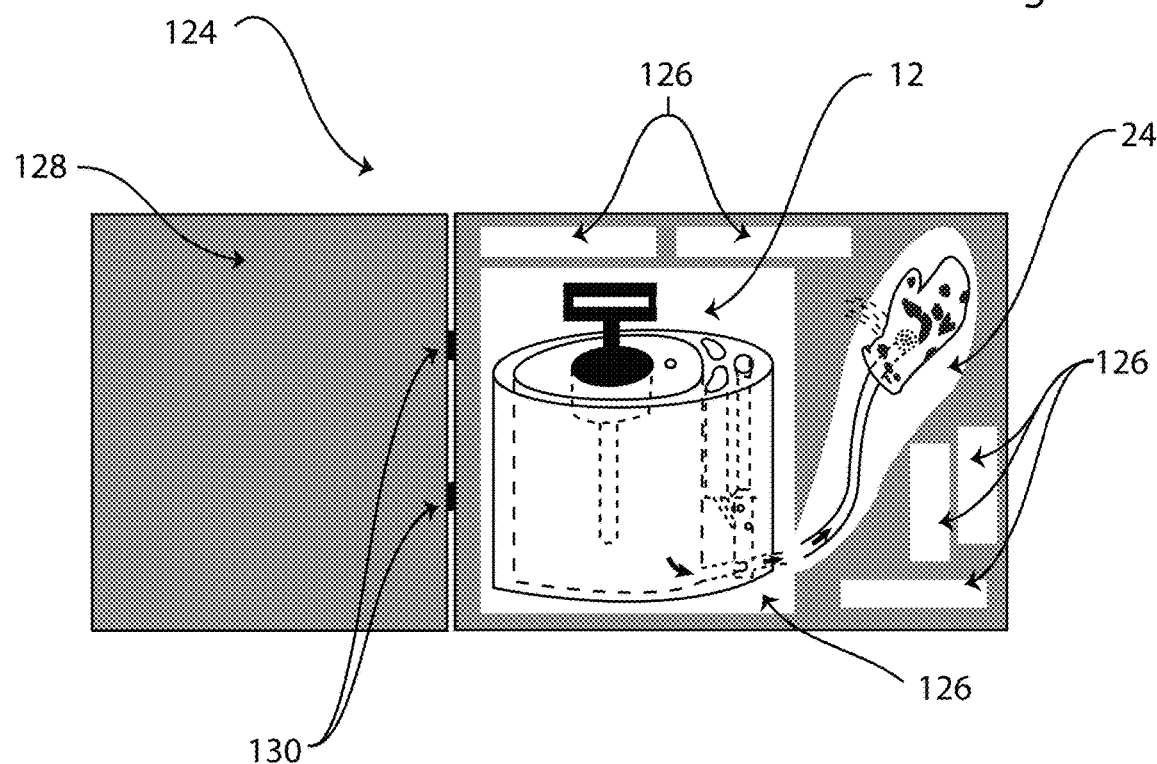
FIG. 21 shows a storage container for the cleaning apparatus, (which is preferably a pet cleaning apparatus)

Referring to FIG. 20, there is provided an embodiment of the station 12 where there is included an external fluid input receiver 120 which includes an external input connection point 122 so that an external fluid input source, such as a hose or a tap or the like, may be inputted into the station 12, the external fluid thus being inputted for mixing with one or any mix addition 44 via a valve 21 or any other fluid control and mix selecting system 20. It is feasible that the external fluid input receiver 120 may channel an external fluid into the fluid containment chamber 14 or directly into the mixing system 20 so that it by-passes the fluid containment chamber 14.

The pet cleaning apparatus 10 may be part of a wider apparatus for cleaning and training of a, preferably dog, pet, which may comprise a storage container 124, itself comprising at least one cavity 126, a lid 128 for closing the at least one cavity 126, and a pet cleaning apparatus 10 as aforementioned. There may be provided at least one hinge 130 for hinging of the storage container 124. There may be provided within the storage container 124 multiple cavities 126 for one or any of a towel, a mat, an expandable or self-expanding pet bathing pool, a nourishment for a pet, a bowl for feeding of a pet, a DVD for training of a pet, and a scanning port for scanning a media receiving device such as a smartphone or tablet device over. There may also be provided at least one cavities 126 for one or more mix additions 44 such as a shampoo or conditioner.

Figure 22:
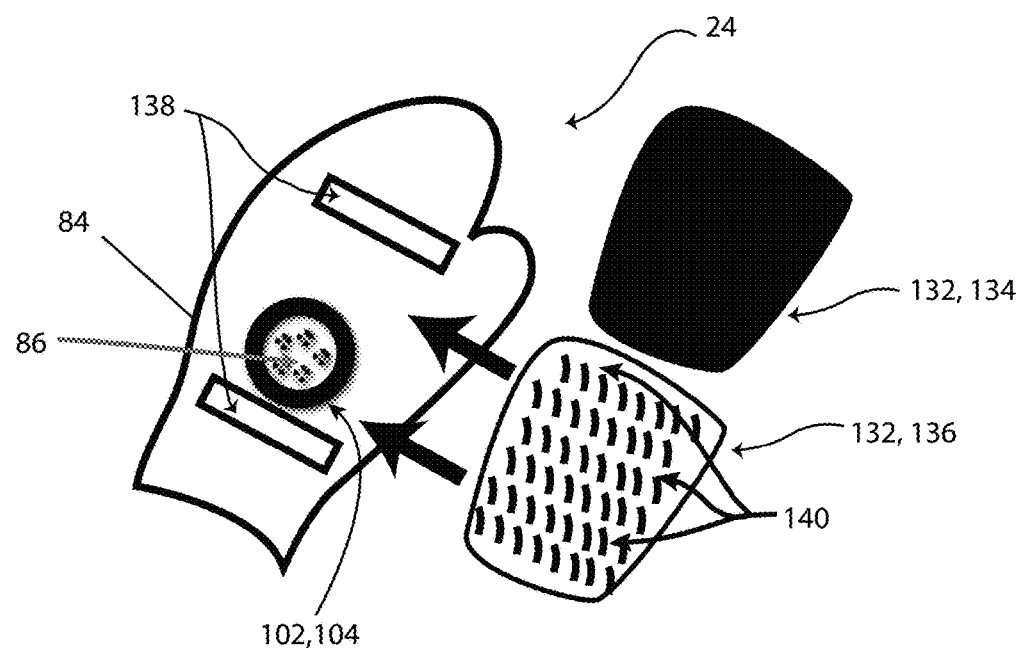
FIG. 22 is a perspective view of the glove device where a removable pad attachment is featured and may be removable so that a different pad attachment may be applied to the glove, (which such feature(s) may be provided for any fluid outputting hand device)

Referring to FIG. 22, there is provided an embodiment of the glove device 24 wherein the glove device comprises a removable surface 132. (This may be considered an example of a removably attachable attachment, (which comprises a surface). There may be provided and/or usable a plurality of removable pad attachments 132 which may either be attachable in order to replace an old and similar pad attachment 132, or may be attachable being a pad attachment 132 configured, designed and/or surfaced to provide an alternate use. Referring to FIG. 22, there is shown a generic cleaning pad attachment 132,134 being replaced by a scrubbing and/or massaging pad attachment 132,136, which may be facilitated by a fixing element 138 provided about a palm of the device 24, although there are many ways of fixing a pad attachment 132 removably to a glove device 24 which will be obvious to those with skill in the art, and a fixing element 138 is given by way of example only and in no way limiting the scope of the invention 10. Thus it is feasible that a removable pad attachment 132 may be removed so that a pad attachment 132 with a differing surface, and therefore ability, may be attached by a user. Similarly, a pad attachment 132 that is worn and exhausted may be replaced by a new pad attachment, which may add longevity to a lifespan of the glove device 24. The scrubbing and/or massaging pad attachment 132,136 may include bristles 140 that may be of plastics materials. There may be provided removable pad attachments 132 of any type and use, which will be obvious to those with skill in the art.

A pad attachment 132 may be permeable and/or may integrally include at least one cavity so that fluid may be outputted. Fluid output may be absorbed by the pad attachment 132 which may feasibly be beneficial in generating a surface for the glove which adequately cleans and does not divulge excessively large volumes of fluid upon a desired target.

The invention 10 will now be described in use by a user, with reference to a preferred embodiment which in no way limits the scope of the invention, with various modifications being apparent to those with skill in the art.

The apparatus is portably moved by a user to an area for cleaning of a pet, which may be within a house or outside.

Water, preferably warm, from a mains supply is inputted into the fluid containment chamber by a user.

The fluid containment chamber is pressurized by a user via a pressurizing mechanism, which may be a pump. The fluid control and mix delivery station may be placed on a floor by a user. At least one mix addition, such as a shampoo, conditioning agent, or treating agent may be slotted, poured and/or placed into a mix addition holding chamber for mixing with the water, or may already be present and previously locked in, so that the fluid output and mixing station is self-contained.

The mix addition may be a fluid, a gel, or a powder or any other material. If the mix addition is a non-contained fluid or powder, the mix holding chamber may be fully closable. If the mix addition is inputted in a container, it may be held in the station as a cartridge which may be removable and changeable.

A glove device is worn by a user on one hand and preferably covers a whole hand. The, preferably dog, pet is placed close to the user for cleaning. It is feasible that it is placed in a self-expandable pet cleaning bathing pool so that fluid is held in the pool during cleaning. The pet is held with both hands by a user, the user thus able to focus simultaneously on cleaning and preventing an escape.

The pet is petted by a user with the glove, which may or may not be outputting fluid. Pressure is placed on a surface of the pet's coat, which facilitates outputting of the water from a palm side of the glove device and onto a coat of the pet. This may be achieved via a pressure activated unit on the glove which opens a channel to a pressurized fluid outputted by the station, the fluid travelling through a connecting member that connects the station and the glove.

Preferably fluid is outputted slowly, with little sound, so that there is little loss of fluid and so that the pet is not enticed to shake its coat to dry it, or attempt to escape. It is feasible that a fluid output is not visually perceived by the pet.

Once the coat of the pet is wetted, a, preferably shampoo-based, lather may be introduced by the user to the pet by selecting a mix option from a manual selecting element, which is preferably located on a top facing side of the fluid control and mix delivery station so it is easily accessible and usable by a user. This provides simplicity and elegance of use. A mixing and/or control option may be chosen with one hand whilst another gloved hand cleans, holds and pets a pet.

After lathering of a pet, a rinsing option may be chosen via the manual selecting element on the self-contained fluid control and mix delivery station. The rinsing option may be water. Thus the coat of a pet can be wetted, shampooed and rinsed.

Another addition may be selected, such as a conditioner mix addition, or a coat and/or skin treating mix addition. Similarly, these may be applied to a pet with little or no breakage to a cleaning process. Selecting a mix addition on the manual selecting element, which is preferably a dial, opens one or more apertures which releases and/or induces mixing of the mixing agent with the, preferably water, fluid. Pressurized flow of water through the system may further induce a mix addition into the fluid, which may occur within a valve.

Whilst pressure is applied to a pet, fluid is outputted from the glove in the present preferred embodiment. When no pressure is applied, fluid is not outputted, thus saving fluid. An exception to this may be a movement activated unit on the glove, which when moved, facilitates spraying of a fluid output from a distance preferably by movement of an aperture which facilitates flow of a fluid to a final fluid output point on the glove. In this way, if there is a particularly troublesome area for cleaning on the pet, a fluid, which may be water or water mixed with an addition, may be fired from the glove by movement of one or more digits. This variable output option greatly enhances the cleaning process and is intuitive.

A further option for cleaning is use of a scrubbing/massaging surface. Once a pet has been wetted and a, preferably shampoo-based, lather has been built up, a scrubbing surface that may be located about a finger-tip position on the glove may be used to capitalise upon the lather to further scrub and clean the pet. Because the fluid output may be pressure-activated, this is particularly beneficial as a user may choose to gently arch their fingers, therefore releasing pressure on the surface of the glove and hence the pressure activated unit. Thus lather may be scrubbed without a fluid output from the glove.

Similarly a treating agent mix addition may be added and applied to a pet, may be scrubbed, and may be rinsed, without any halting of the cleaning process.

After cleaning, the pet may be placed on a mat and may be dried with a towel. Nourishment may be given to the pet which may also function as training. The nourishment may be placed in a bowl, which may be included as part of a wider pet cleaning apparatus and set.

The present pet cleaning apparatus may be placed into a storage container so that it can be easily stored, transported and rapidly deployed. The apparatus is self-contained and transportable and requires no wearing of any apparatus by the user, save the glove device. Other elements of a pet cleaning and training apparatus may be stored in the storage container, which may be of lightweight plastics, thus easily transportable and cleanable. All textile elements may be washable. The glove device may also be used to clean other parts of the apparatus.

If a self-expanding bathing pool has been utilised, it may include an output point so that fluid can easily be drained out, and/or it may include a low lip so fluid can be easily drained from the pool.

The above description of the apparatus in use by a user is given by way of example only, in no way limiting the scope of the invention.

The station may feature a connection point so that fluid from a mains supply can be used as the fluid input, by-passing the fluid containment chamber. A possible fluid input may be a garden hose/tap water supply. Another possible fluid input source may be from a tap via a double tap attachment that is commonly used by house owners to spray bath tap water from a shower head.

The glove may be detachable from the station and/or connecting member so that it can be used in isolation and from another fluid source.

It is feasible that a second glove device may be provided for wearing.

It is feasible that the apparatus may feature a purge cycle, whereby an addition can be purged fully from the fluid output via a purging cycle.

Referring to FIG. 18 and FIG. 19, there is shown an embodiment of the station where the mix addition holding chamber is an integral part of the station, housed on or about the station. In FIG. 19, a mix addition container 56 may be fixed into a chamber substantially externally to the station.

The fluid control and mix delivery station is an all-in-one independent solution to cleaning and treating of a pet. The design is elegant and self-contained, thus transportable. It is extremely compact and easily reloadable. It does not require wearing. Because it has its own pressurizing mechanism, it does not rely on gravity and therefore can be placed in any location during cleaning. In conjunction with a pet cleaning pool, it opens up a possibility of petting and cleaning a pet inside of a house, and of greatly enhancing the cleaning process in any location. In a preferred embodiment, a shampoo container may be locked into the station so that it acts as a cartridge. Thus an exhausted mix addition may be replaced with a new one, which may be purchased separately or with the apparatus.

Multiple additions may be conveniently housed in the station for mixing, not limited in number.

The manual selecting element, which may be a turn-dial, means that a pet can be cleaned with no interruption, which lessens chance of an attempted escape by the pet.

The main final fluid output point may be designed so that a relatively small but effective flow of fluid is outputted onto the pet for effective cleaning with little or no fluid wastage.

The glove is preferably of a mitt shape and is extremely comfortable to wear.

Mixing of the mix addition with the fluid is preferably achieved internally as the station is self-contained, and thus the mixing and any valves and/or connecting tubes for mixing may be housed internally, thus unseen by a user, which is preferable. This creates an extremely simple experience for cleaning of a pet.

A preferable pressure activated unit on the glove saves significant volumes of water as fluid may only be outputted once pressure is applied to a desired surface, which is intuitive. A preferable secondary spray option, which allows fluid to be sprayed at a target from a distance, allows a problematic area for cleaning to be targeted by a user, preferably by moving of one or more digits, which is intuitive and adds effectiveness and enjoyment to the cleaning process.

A third option for cleaning may be a scrubbing surface about a palm of the glove device, which may be located about a finger-tip location of the glove, and may comprise nodules, protrusions, and/or a raised surface so that a pet can be scrubbed and/or massaged by a user. This may be achieved during fluid output from the glove, or without fluid outputting halted by arching of a hand so that a pressure activated unit is not pressurized.

The apparatus facilitates a most intuitive, elegant, and efficient way of cleaning a, preferably dog, pet. A user can concentrate solely on the cleaning of a dog, without many of the problems associated with the present art. The fully independent and self-contained nature of the station results in an experience where the user can focus solely on the glove and cleaning, and improve the cleaning experience both for the user and the dog.

It is feasible that the invention may be used in a zoological setting, such as cleaning of an animal in a zoo, or cleaning of any animal that is owned, which could therefore be said to be a pet.

Dog owners do not want to use bladder bags or unwieldy methods for cleaning of a dog. They want an all in one solution that includes shampooing and preferably conditioning and treating of a dog coat so that the dog is happy and clean, without problems such as ineffective cleaning, misdirected fluid outputting, and attempted escapes from the dog. The portable lightweight self-contained pre-pressurizable fluid control and mix delivery station, in conjunction with the, preferably multiple variable output options, glove device, allows a user to solve these problems.

The invention can be used in any location, inside and out, and is easily transportable, preferably via a storage container, so that it can be taken to a location where a cleaning of a dog may be required.

The embodiments described above are provided by way of example only, and various other modifications will be apparent to persons skilled in the art without departing from the scope of the invention as described in the appended claims.

Referring particularly to FIGS. 23 to 50, there is shown a fluid outputting hand device 11, comprising: a front portion 13 for going in front of a user's hand; and a fluid output point 108, for outputting fluid; wherein the hand device 11 is configured for: pressure-activated outputting, so that fluid can be outputted onto a target, by applying pressure to the target; and distance outputting of fluid, so that fluid can be outputted at a target, from a distance. (Examples of the glove device in any of FIGS. 1 to 22, which allow for both pressure-activated outputting and distance outputting of fluid, are also examples of a fluid outputting hand device, comprising: a front portion, for going in front of a user's hand; and a fluid output point, for outputting fluid; wherein the hand device is configured for: pressure-activated outputting, so that fluid can be outputted onto a target, by applying pressure to the target; and distance outputting of fluid, so that fluid can be outputted at a target, from a distance).

Figure 24:
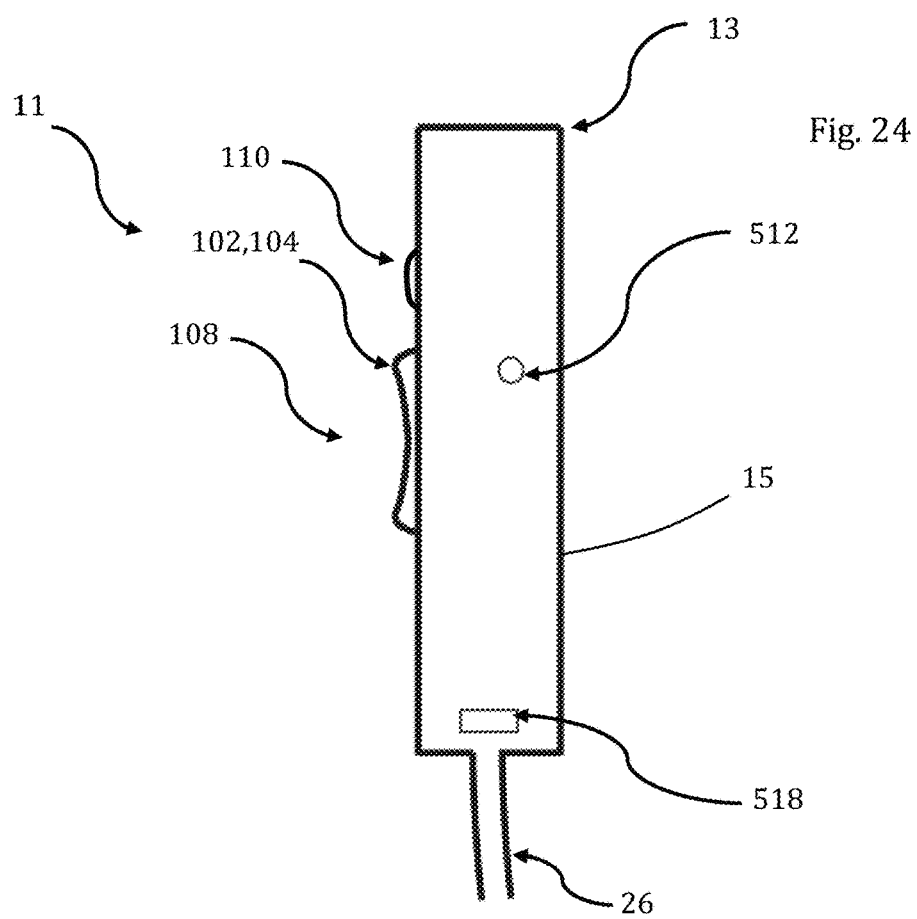
FIG. 24 is a side view of the fluid outputting hand device.

In the example of FIG. 24, for example, a user, when using the device 11, can apply pressure to a target with the front portion 13. The device is shown comprising an arrangement to facilitate pressure-activated outputting (which, in the example, comprises a protruding rim 104. The rim is preferably protruding (as shown). The rim is preferably depressible. Thus the rim is preferably an embodiment of a depressible feature. The rim, in the example, is an embodiment of (or part of an embodiment of) a pressure-activated unit. In the example shown, thus if a user presses against a target with a front side (and/or any of the pressure-activated arrangement (and/or rim)) of the device, outputting of fluid can be initiated. The example shown is shown by way of example only. (As will be shown, the device may comprise a stopping arrangement, which may be able to prevent pressure-activated outputting).

(It is feasible the hand device may have protrusion(s) and/or feature(s) that extend out in front of the device, and that pressure-activated outputting is initiated by applying pressure to a target with such protrusion(s) and/or front feature(s). For the sake of the present application, any such feature (eg that extend out in front of the front portion), are considered to be part of the front portion of the device, since they are in front of and/or further forward than a hand of a user).

It will be obvious that the examples of FIGS. 23 to 40 may comprise any of the feature(s) and/or characteristics as disclosed with reference to the glove device as disclosed in any of FIGS. 1 to 22. Thus, for example, with reference to the (or any embodiments of the) hand device 11, pressure-activated outputting of fluid and distance outputting of fluid may, for example, be outputted from the same fluid output point. However, it is feasible that the hand device comprises a further fluid output point(s), and pressure-activated outputting of fluid and distance outputting of fluid are outputted from different output points. (It is also feasible that pressure-activated outputting and distance outputting of fluid share the same output point(s), partially and/or share any fluid output aperture(s); for example, the fluid output point for pressure-activated outputting may, for example, comprise a plurality of fluid output apertures. It might be that, for pressure-activated outputting, some or all of these apertures are used for fluid outputting. It may then be, for example, that, for distance outputting of fluid, different aperture(s) and/or less aperture(s) and/or more apertures of the fluid output point are used, and/or that some (but, feasibly, not all) of the apertures are used in common for both pressure-activated outputting and distance outputting of fluid. (Nevertheless, it should also be stated that it is feasible, also, that all the same aperture(s) are used for both distance outputting and pressure-activated outputting) Thus various permutations are possible. Any permutation is possible.

(As has been stated, it is feasible fluid may be outputted at greater pressure for distance outputting (as opposed to pressure-activated outputting). This may be achieved in many ways. As has been stated previously, this may be achieved by the distance fluid output point arrangement comprising fewer output aperture(s). This may create more pressure at the output point arrangement. More broadly, greater pressure (which may be very useful for spraying output fluid some distance, for example), may be achieved by having a lesser total output aperture area (whether or not there are more aperture(s) or not). Thus, for example, if the fluid output point arrangement for pressure-outputting comprises one large aperture (or several), such that fluid is outputted via pressure-activation at almost no pressure, it may be, for example, that the distance fluid output point arrangement comprise a plurality of aperture(s), (which may be small, or very small), perhaps for example around ten apertures in total), and that the total area of the apertures of the distance fluid output point arrangement is just a fraction (eg a tenth, for example) of the total area of the fluid aperture(s) for pressure-activated outputting. It therefore goes without saying that this could lead to fluid being outputted at significantly more pressure for distance outputting (eg for spraying) than for pressure-activated outputting. (Pressure activated outputting may, or may not, be outputted at pressure, and this is taken by way of example only). Whilst outputting fluid at greater pressure may be particularly useful for distance outputting, this is given by way of example only, and any fluid output point arrangement (for any functionality) may output at greater pressure than any other output point arrangement and/or function. Broadly speaking, the device may be configured so that fluid can be outputted at different pressure. Preferably, the device may be configured so that fluid can be outputted at different pressure, for different output functionality. Different output functionality may include, for example, pressure-activated outputting, and distance outputting of fluid. Either one (or any function) may be outputted at different pressure from any other). Any and/or other output functionalitie(s) may be provided).

(It should also be stated (referring to the example given previously of greater fluid output pressure being achieved by having less fluid output aperture(s)), that it is possible, technically, to have a lesser output aperture total area, whilst in fact having a greater amount of output apertures. This could be achieved by having more output apertures in total, but them being far smaller in total area. Thus fluid outputting at greater pressure, technically, could be achieved by having less output apertures, but could also be achieved by having more output apertures).

Figure 27:
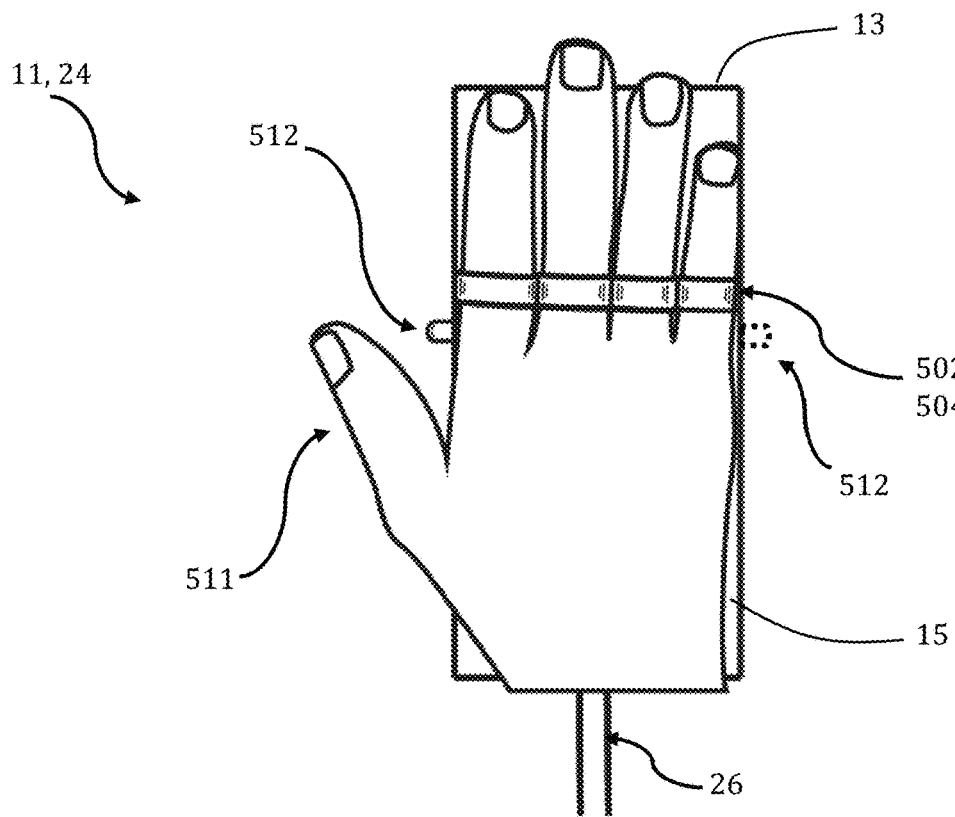
FIG. 27 shows a hand of a user facilitated in wearing the hand device via finger holders.
Figure 28:
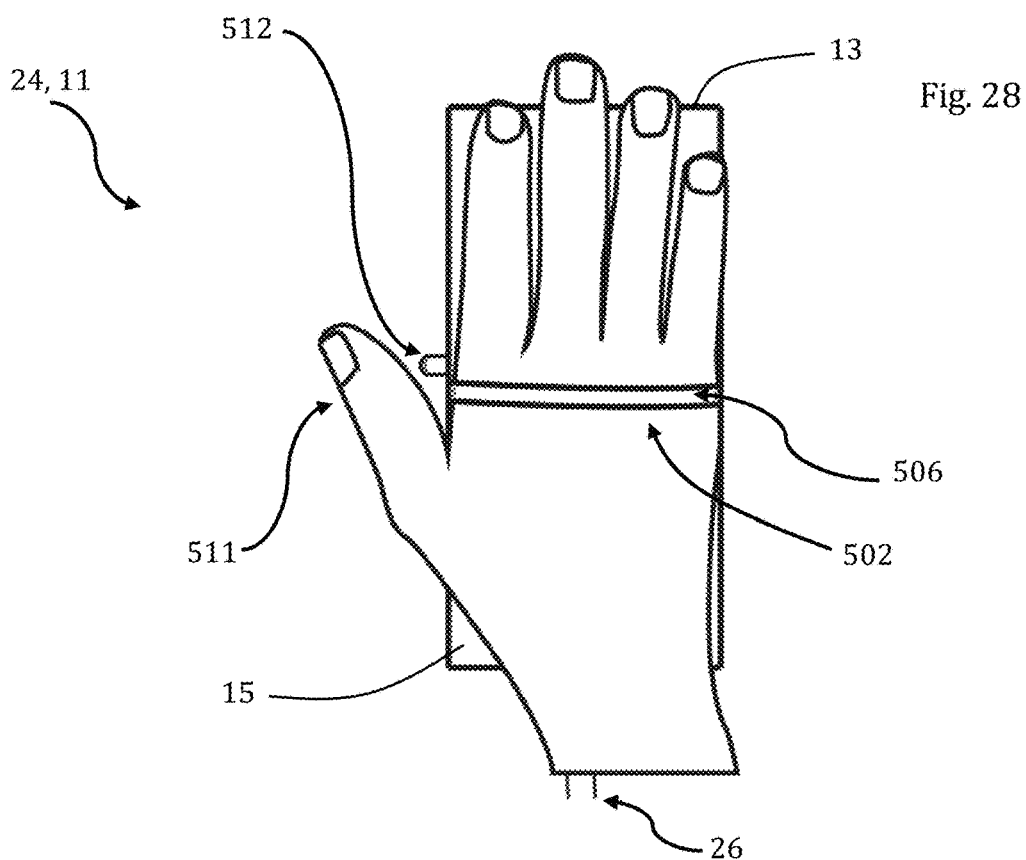
FIG. 28 shows an embodiment of the hand device wherein there is provided a back securing arrangement comprising a strap element(s) to facilitate wearing of the device.

Preferably the fluid-outputting hand device comprises a thumb selecting arrangement, so that distance outputting can be selected by a thumb of a user. An example of this is clearly shown in FIG. 23, for example, where the thumb selecting arrangement comprises a button 512, (although any feature to facilitate selecting of distance outputting by a thumb may be provided). In the example, the button (which is shown as a right-handed version of the device), is depressible, so that the user can initiate distance outputting from the hand device via depressing the button with their thumb. This is an example of the thumb selecting arrangement comprising a protruding feature, to facilitate distance outputting of fluid. (A good view of the example button 512 protruding is shown in FIGS. 27 and 28. The feature is shown provided on a left side of the front portion 13, which is optimal positioning for a user to use with their thumb, whilst wearing and/or using the device. (Again, best shown in FIGS. 27 and 28)).

Preferably the thumb selecting arrangement comprises a movable element, movable by a thumb of a user. (A button is movable, and therefore would be within the scope of being a movable element). This is best shown in FIGS. 29 to 32, where the thumb selecting arrangement comprises a feature 514 that partially or wholly surrounds a thumb 511 of a user, in use. (The examples shown could be described as a type of thumb 'stirrup', but are provided by way of example only). However, it is feasible, rather than a movable element, that the thumb selecting arrangement, for example, simply comprises a wall and/or surface that can be pushed against by the thumb of a user, to initiate distance outputting of fluid.

(Another example(s) of an (preferably thumb) arrangement not comprising a movable element would be, for example, a touch-activated arrangement. It will be known that computers often come with touch-screen interfaces. So, in a more complex embodiment, a touch-activated interface may be provided. This may require a touch-sensitive screen, (which may be a computer screen). This could be provided, for example, in a similar position to where the example thumb selecting arrangements are provided in the examples shown/described, in which case, it would be an embodiment of a thumb selecting arrangement. However, it may be provided at any place on the device, and thus is not limited to being a thumb selecting arrangement. Other examples of a (preferably thumb) touch-activated selecting arrangement may be provided; for example, a surface may be provided (not limited to being a computer surface and/or screen) which can be touched, to activate distance outputting. One example would be a metal plate (or any surface). If the user touches the plate (or any surface), it may thus initiate distance outputting. This can be done is various ways. For example, touching of the metal plate (or any surface) may complete a circuit, which, in such an example, activates distance outputting. Such examples (or some of these examples) may be considered to be and/or include 'earthing' examples, where the user, in touching the surface, earths the circuit/device/example, thus initiating distance outputting. In other examples, a capacitor(s) may be used/provided (or any other technology), and touching of the metal plate (or any surface) may affect (electrical) charge, thus initiating distance outputting. These are just several examples of possible touch-sensitive examples. However, such examples tend to be electronic in nature. (Thus, more broadly, the device may initiate distance (and/or pressure-activated) outputting of fluid, partially or wholly electronically). Thus, whilst possible, they may not at all be ideal, due for example, to overcomplexity and/or over-expensiveness and/or the fact that water getting near electronics (and/or on any touch-sensitive surface(s)) may be particularly problematic, and could even affect functionality, (and could even be dangerous). However, it is thus shown that examples of an arrangement (which may, or may not, be a thumb selecting arrangement) may be provided, which do not comprise a movable element).

(The example thumb selecting arrangement of FIG. 31 is shown, by way of example, comprising a portion 516 for going around a portion or a whole of a user's thumb. The thumb selecting arrangement of FIG. 31 is also shown comprising a connecting portion 515 that connects the portion for going around a portion or a whole of a user's thumb and (and/or towards) a fluid output point arrangement. The 'connecting' portion and/or arrangement may alternatively be defined as a portion that leads towards a fluid output point. Thus, broadly put, the portion 516 for going around a portion or a whole of a user's thumb (and/or, more broadly, the (preferably thumb) selecting arrangement, to facilitate distance outputting of fluid) may be connected to a fluid output point. ('Connected' is a broad term, and includes even if they are connected directly, or connected via one or more (ie a plurality of) features. In the example of FIG. 31, they are connected via a connecting portion/arrangement 515. But as stated, they may be more directly connected, or there may be more parts than just one (ie portion 515) between them. Nevertheless, they may still be connected via the plurality (more than one) parts, and may still be connected in such a way that use of the distance outputting (preferably thumb) selecting arrangement is able to move a portion or a whole of the pressure-activated arrangement, (eg a pressure-activated unit). As shown, this may be a way of activating distance outputting of fluid.

Furthermore, the or any (preferably thumb) distance outputting selecting arrangement may be connected to the or any (portion of the) pressure-activated arrangement (eg a pressure-activated unit).

(All the shown thumb selecting arrangements, usable to initiate distance outputting of fluid, are examples of a distance outputting selecting arrangement. All the shown thumb selecting arrangements, usable to initiate distance outputting of fluid, are examples of a selecting arrangement to facilitate distance outputting).

It is feasible the hand device may comprise a thumb selecting arrangement on both sides of the hand device, which may be useful so that it can be used by both left handed and right handed users. It is also feasible the hand device may come in either left, or right, handed versions, each with a thumb selecting arrangement only on one side. (FIG. 27 shows an example (denoted in dashes) of how there may be provided a thumb selecting arrangement (which is shown, by way of example, comprising a button 512) on the other side of the hand device, and/or how such a positioning may be provided, for a left-handed version of the hand device (ie if no right-handed thumb selecting arrangement were provided).

Figure 40:
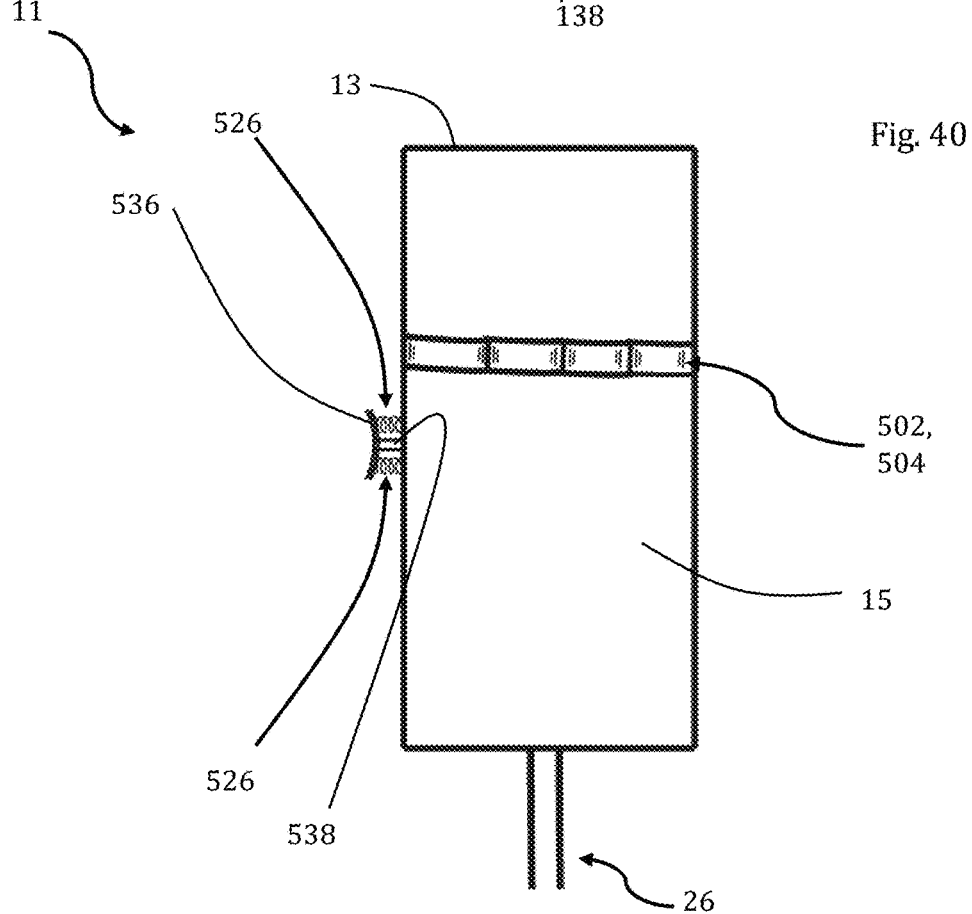
FIG. 40 shows an embodiment of the fluid outputting hand device wherein the thumb selecting arrangement comprises an external spring.

Preferably the thumb selecting arrangement comprises a feature that is depressible and/or movable inwards, depressible (and/or movable inwards) by a thumb of a user, to initiate distance outputting of fluid. One of the intents of such an arrangement is that the user can initiate distance outputting by squeezing/moving their thumb toward their hand and/or inward. This type of movement with the thumb is particularly intuitive for selecting distance outputting. This is clearly shown in the button embodiments, where the button is depressible. Thus it can be moved inwards (towards and/or into/further into the front portion, in the example). It is also shown in the example of FIG. 40 (ie a feature wherein a portion or a whole of the feature is depressible and/or movable inwards), which may be a particularly useful embodiment. Preferably such a depressible/inwardly movable feature is depressible/movable towards the front portion of the hand device. More preferably, such embodiments are preferably depressible towards a left side of the front portion (this is shown in various of the drawings, and clearly in the button embodiments and in FIGS. 40, 41, and 42). It is feasible a feature may be provided that is depressible (and/or a portion or a whole of the feature may be movable inwards) and may be provided on a side of the device, but be further (ie a portion or a whole be further) forward/ahead of the side of the device, or further (ie a portion or a whole be further) behind the side of the device (ie from a side view). Nevertheless, if a thumb of a user pushes a portion or a whole of the feature inwards, it is deemed, for the sake of the present application, to be depressible and/or movable inwards.

The thumb selecting arrangement may be spring-loaded. Thus the thumb selecting arrangement (or any selecting arrangement, not limited to a thumb selecting arrangement) may comprise a spring element(s). An example of this is shown in FIG. 40, for example, which shows a feature that is movable inwards and/or depressible. There is shown a spring element(s) 526. This could be useful, and may mean that, once the feature is pressed, due to tension of the spring element(s), the feature returns to its original position, once pressure on it is removed. The spring element(s) may also create resistance against the feature being pressed, which could be helpful either for the mechanism (ie of outputting and/or initiating outputting) and/or the user-interface. (The term 'spring element' is here used extremely broadly, and includes within its scope any compressible element(s). Therefore, for example, a piece of material (such as sponge and/or foam, for example) that creates resistance and/or 'spring' to the feature, is considered, for the sake of the present application, to be an example of a spring element).

Figure 37:
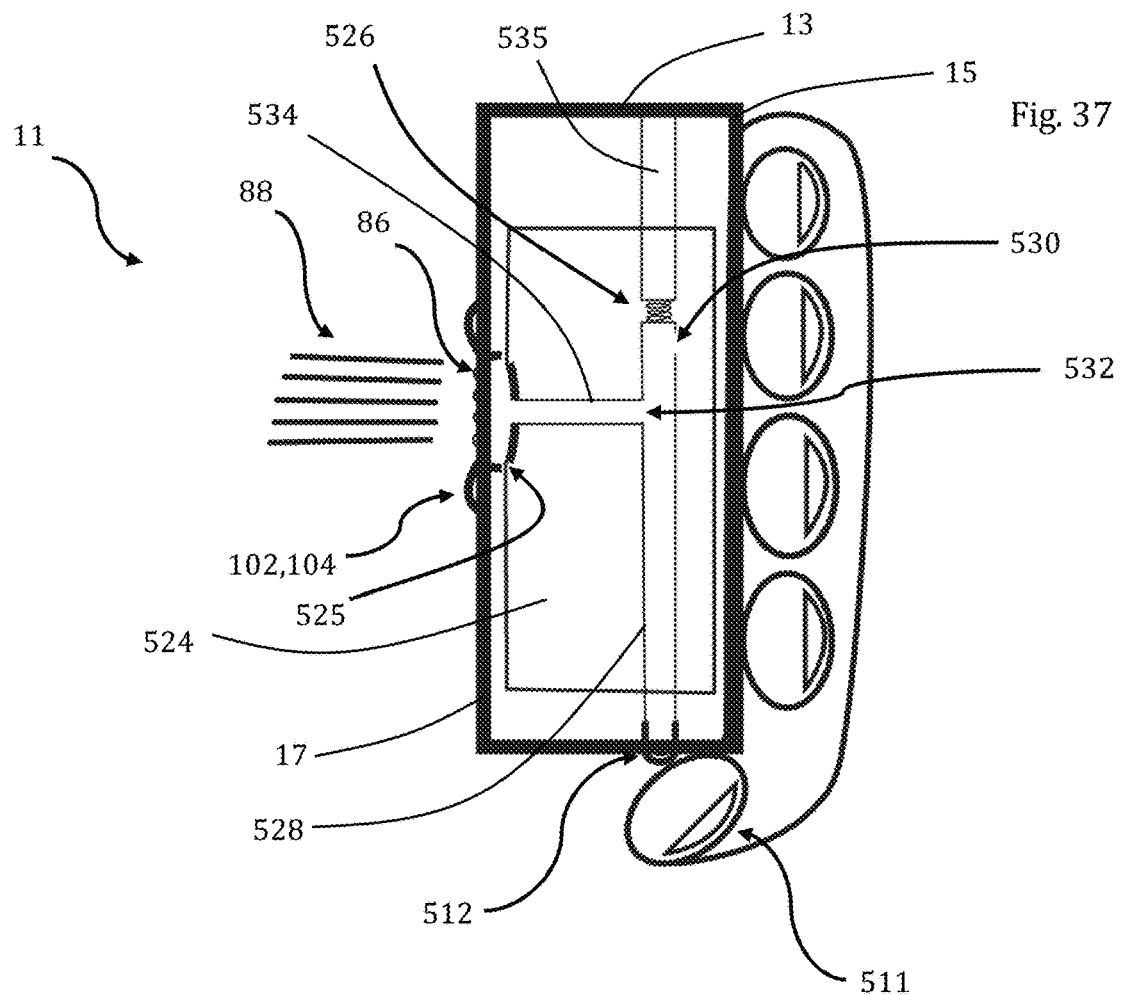
FIG. 37 shows the same embodiment, wherein a thumb selecting feature (a button, in the example) has been pressed by a user, thus initiating distance outputting.

In FIG. 37, the thumb selecting arrangement is shown comprising an internal spring element(s) 526.

(It will be apparent that the pressure-activated outputting arrangement may be spring-loaded. Thus the pressure-activated outputting arrangement may comprise a spring element(s). This may be useful, for example, for provided a spring-loaded pressure-activated unit. Thus, for example, (and taken by way of example only), in the example of FIG. 24, for example, the pressure-activated unit may be spring-loadedly depressible. This is just one example, and the arrangement is not limited to being spring-loaded. (Thus the pressure-activated outputting arrangement and/or the distance outputting selecting arrangement may be spring-loaded)).

It may be useful for the thumb selecting arrangement to comprise a curved surface 536, shaped to fit to a user's thumb. This is clearly shown in FIG. 40, for example, where there is provided a feature that comprises a curved surface 536, shaped to fit to a user's thumb. This may make the feature/arrangement more comfortable for the user, and may have other benefits. It may also make it easier for the user to use the thumb selecting arrangement and/or to depress and/or move any feature provided. Therefore it may make it easier and/or more comfortable for the user to initiate distance outputting.

In the example of FIG. 40, the thumb selecting arrangement comprises a protruding element/feature, the protruding element/feature comprising a curved surface 536, shaped to fit to a user's thumb.

Figure 41:
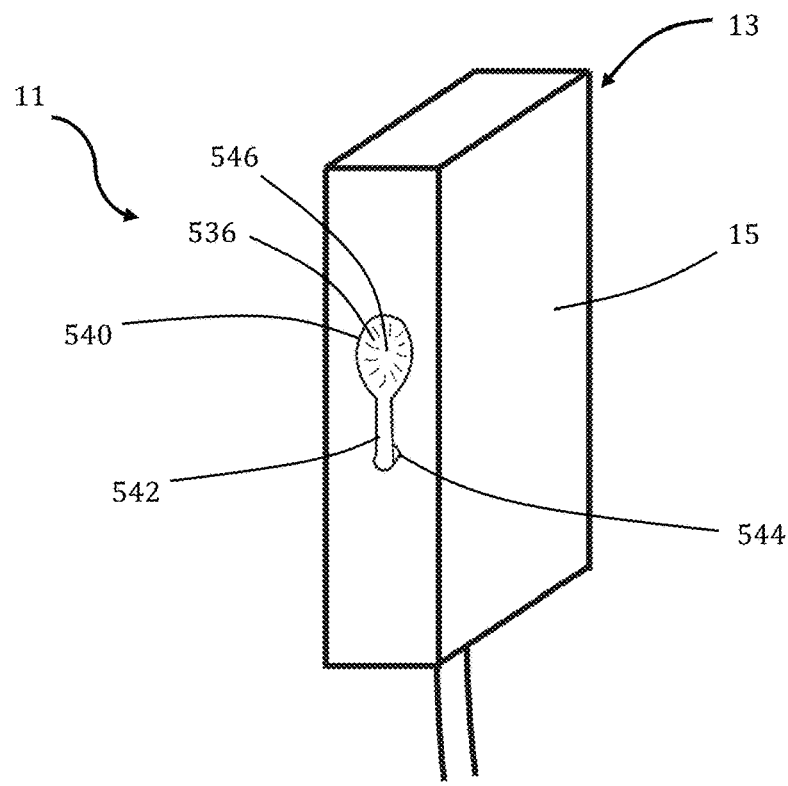
FIG. 41 is a perspective view of a particularly preferred embodiment of a thumb selecting arrangement.

An even more preferred embodiment is shown in FIG. 41. In FIG. 41, the thumb selecting arrangement is shown comprising a feature. The feature is of a more evolved shape/design. Shown by way of example only, and as a preferred embodiment, the example comprises a head 540, which is preferably spoon-shaped—ie the head is preferably recessed/curved inwardly (similarly, for example, to how the head of a spoon is). Thus, the example comprises a curved surface 536, shaped to fit to a user's thumb. The example is also shown comprising, shown by way of example only, a stem 542. In the example, there is also shown a portion 544 from which the stem originates. In the example, portion 544 is secured to and/or originates from the front portion body. Etchings are included on the head 540 of the thumb selecting feature. This is intended to denote that the head, in the example, is innerly curved (similar to a spoon head, for example). This therefore provides a curved surface, which the thumb of a user can sit in.

The example thumb selecting arrangement of FIG. 41 may comprise a spring element(s) for example, behind the head 540 (or any part(s)) of the feature. Thus, if a user applies pressure inwardly with their thumb (whilst their thumb rests on the head 540), the spring element(s) may be useful (for reason(s) previously set out, or any other). A spring element(s) may be provided elsewhere in the example (not limited to being behind the head). Thus, more broadly, the or any thumb selecting arrangement may be spring-loaded. Such an arrangement may, or may not, be similar to the spring arrangement as shown in FIG. 40. (The thumb selecting arrangement may comprise a spring element(s) anywhere, not limited to the examples/positions stated).

In the example shown in FIG. 41, preferably the user applying pressure to the head 540, and moving it inwardly, with their thumb, initiates/selects distance outputting. It is feasible the whole arrangement may move and/or move inwardly when a user applies inward pressure, with their thumb, to the head 540.

In the example of FIG. 41, preferably general surface/portion 546 is the deepest part of the head (similarly to how a general central area of a spoon head is the deepest part of the spoon head and/or curve).

(The head 540 feasibly may not be curved, but preferably is. It may be of any shape, size, etc).

In order to retain clarity of the unusual thumb selecting feature of FIG. 41, other preferred features are not shown. However, preferably, on such an embodiment, a back securing arrangement is provided. This helps a user wear the device. Furthermore, most preferably, a back securing arrangement comprising a finger holder(s) is provided. Thus a back securing arrangement such as that shown in FIG. 40 is preferably provided for the embodiment of FIG. 41. (In the present application, any feature(s) disclosed, unless stated otherwise, may be used for and/or provided with any other embodiment disclosed (and any embodiment(s) at all)).

Figure 42:
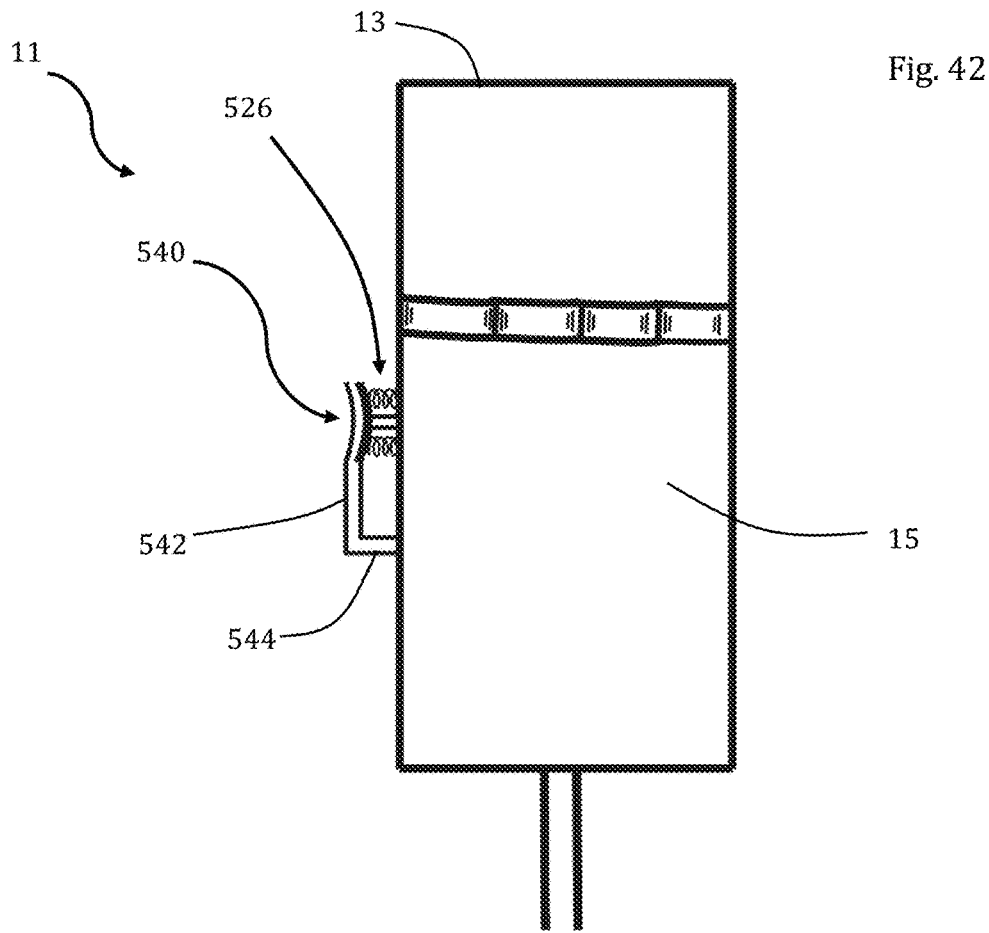
FIG. 42 shows a back view of a same/similar embodiment as shown in FIG. 41, thus showing a side view of the example thumb selecting arrangement.

The example of FIG. 41 is, of course, again an example of the thumb selecting arrangement comprising a protruding element, since, preferably, a portion at least of the thumb selecting feature protrudes out of the front portion/front portion body. Thus, an example representation of a possible back view of the embodiment of (or of an embodiment very similar to) the thumb selecting arrangement of FIG. 41 is shown in FIG. 42. As can be seen, a portion or a whole of the thumb selecting arrangement protrudes out from the front portion/front portion body. In the example of FIG. 42, it could be said that the thumb selecting feature is shown in a sectional view, because, from the view shown (just as if a spoon were shown from a level side view), it may in fact not be possible to see the curved surface 536 of the head 540. This depends on the design and/or shape configuration of the feature, and may, or may not, also be the same for the example of FIG. 40.

It may be that the example thumb selecting arrangement of FIGS. 41 and 42 comprises a pivot/joint. For example, there may be a pivot/joint between, for example, portion 544 and the stem 542. This may allow for the head 540 to be pressed down/inwards by a user, without the portion 544 being pressed/moved into the front portion body (in the example). The movement inwards of feature 538 may then initiate/result in distance outputting of fluid. Thus. In the example, the head (or any portion) of the thumb selecting arrangement may be movable (to initiate distance outputting), without the portion 544 (or any other portion(s)) being movable/moved. This concept is not limited to the shown embodiment. Any thumb selecting arrangement may comprise a pivot/joint. (Note, there may not be a 'stem'. Furthermore, if there is a feature 542, it may more broadly be defined as a portion 542. Nevertheless, a pivot/joint may still be provided, for any embodiment, not limited to those comprising a feature 542, and not limited to the example(s) shown).

Figure 33:
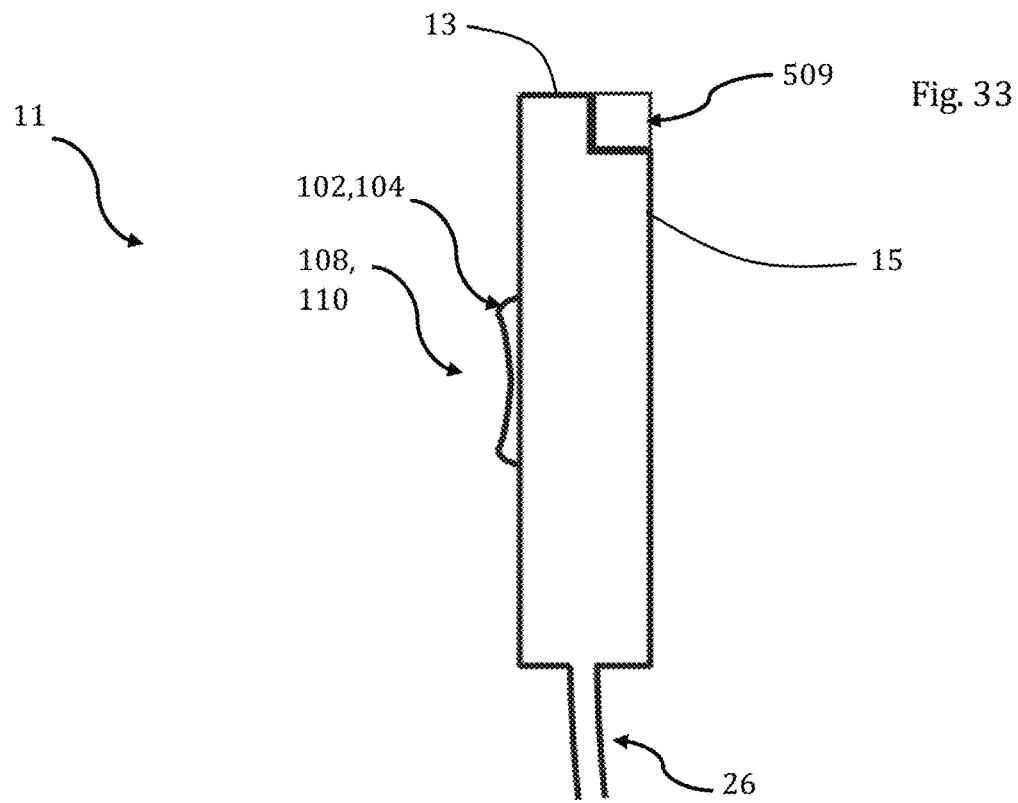
FIG. 33 shows an embodiment of a selecting arrangement to facilitate distance outputting of fluid, wherein the selecting arrangement comprises a depressible portion on/at a top of the device.

Any selecting arrangement to facilitate distance outputting may be provided. (Not limited to a thumb selecting arrangement). The fluid outputting hand device may comprise a depressible portion, depressible to initiate distance outputting of fluid. This is shown in FIG. 33. In FIG. 33, it is shown that the hand device comprises a depressible portion 509 at a top of the hand device. In the example, the depressible portion 509 is at a top of the front portion of the hand device. However, a depressible portion, depressible to initiate distance outputting of fluid, may be provided anywhere about the front portion of the hand device and/or anywhere about the hand device. FIG. 33 is an example of a portion of the front portion of the hand device being depressible, to initiate distance outputting of fluid. (FIG. 33 is an example of a selecting arrangement to facilitate distance outputting, the selecting arrangement not being a thumb selecting arrangement). In the example, a portion 509 of a top of the hand device (and/or of the front portion) is depressible, to initiate distance outputting of fluid. Embodiments may be provided wherein a portion or a whole of the top of the hand device (and/or of the front portion) is depressible, to initiate distance outputting of fluid.

Figure 34:
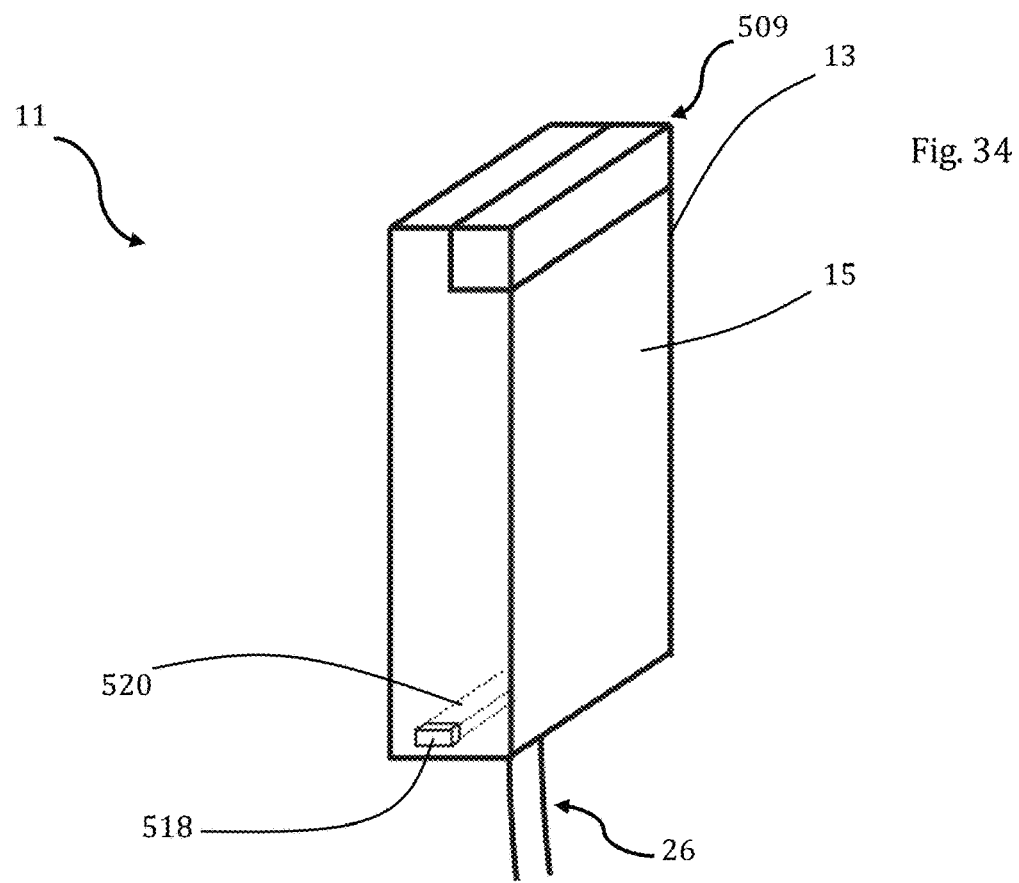
FIG. 34 shows a perspective view of a similar such depressible top portion embodiment, wherein there is also provided a stopping arrangement to stop flow from the device.
Figure 35:
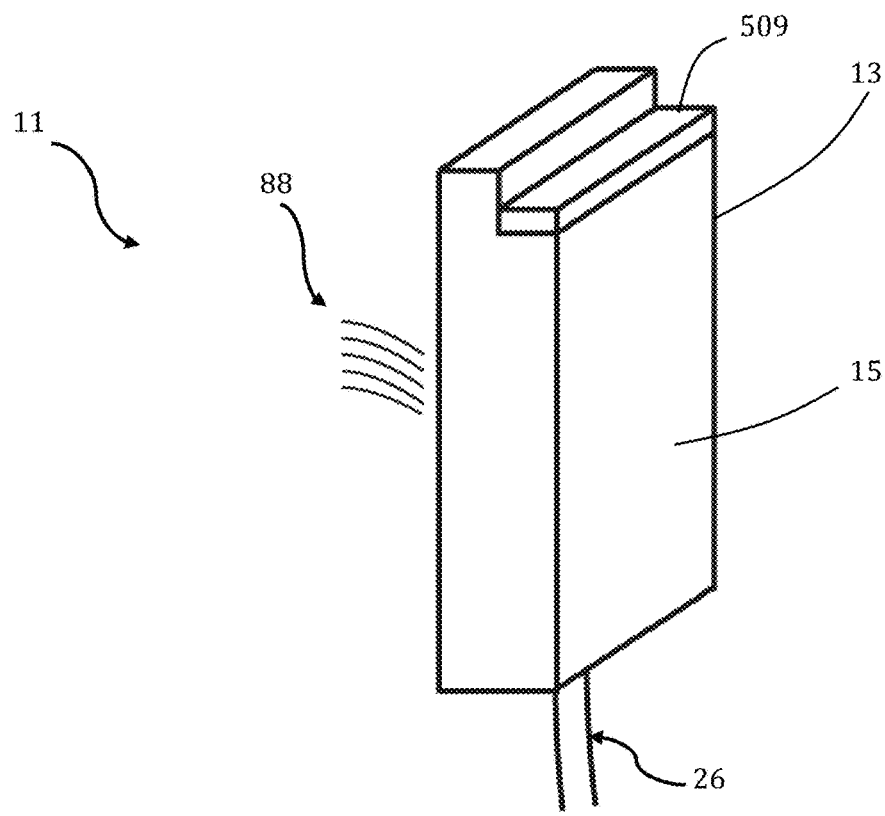
FIG. 35 is a perspective view of substantially the same embodiment, wherein the depressible portion has been pressed, thus activating fluid outputting from a distance.

A similar/same example is shown in FIGS. 34 and 35. In FIG. 34, the example is shown from a back perspective angle. The depressible portion 509 is shown not depressed. In FIG. 35, the depressible portion 509 has been depressed. Thus fluid 88 is now shown being outputted from a distance. (It is feasible that, rather than a portion of the top of the front portion and/or of the device being depressible, a whole of the top of the front portion and/or of the device is depressible, to initiate/select distance outputting).

It is feasible the hand device may comprise a plurality of arrangements to facilitate distance outputting. For example (taken by way of example only), the device may comprise both a thumb selecting arrangement, and also a depressible portion (eg as shown in FIG. 33, for example).

Figure 36:
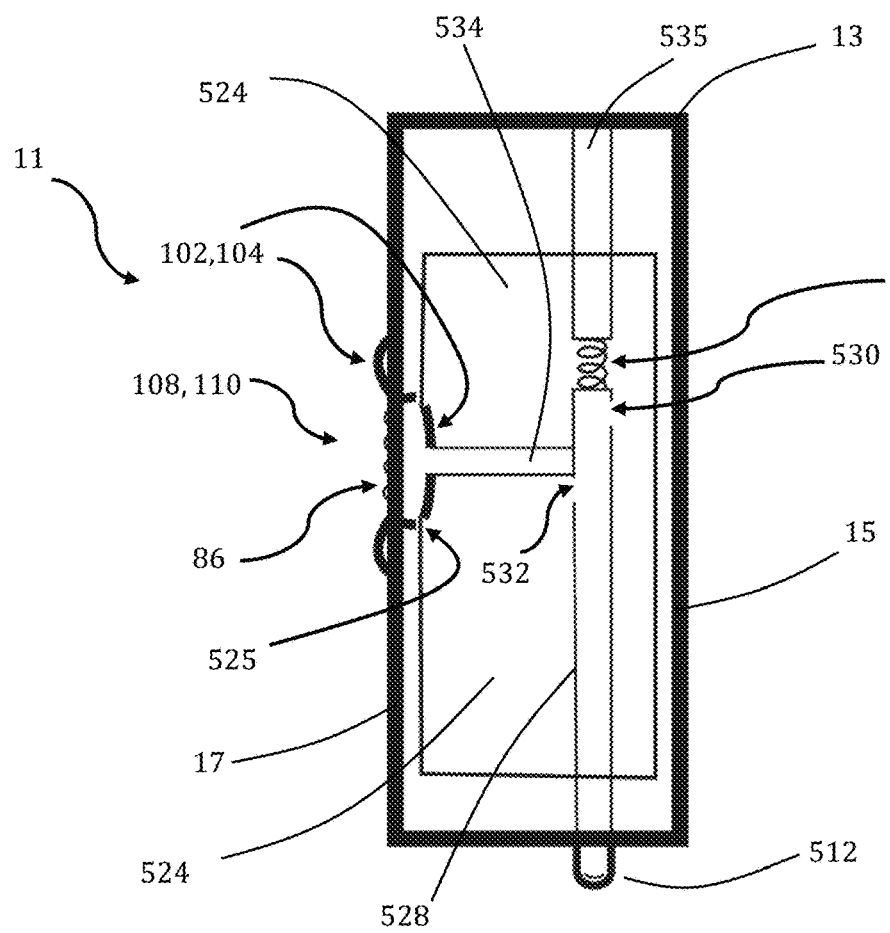
FIG. 36 is a partially internal view of an example embodiment, showing how a pressure activated arrangement and a distance outputting arrangement may function, in an embodiment wherein a thumb selecting arrangement is provided.

Referring to FIG. 36 and FIG. 37, there is shown/denoted a basic embodiment of how fluid may be outputted via pressure-activated outputting, and via selectable distance outputting. The described example is given by way of example only.

Thus, as stated, described by way of example only, there is shown, in the example, a fluid reservoir and/or area 524 inside the device 11. When the pressure activated arrangement is used (which may comprise a pressure activated unit 102, which may be depressed), in the example, it opens at least one channel 525 to the fluid reservoir/area 524, thus facilitating flow of fluid from the reservoir/area, which can then be outputted from the fluid output point arrangement, which, in the example is for both pressure-activated outputting of fluid, and also for selectable distance outputting of fluid, and which, in the example, comprises a plurality of fluid output apertures 86. In the example, once pressure is relaxed from the pressure activated arrangement (which in the example comprises a pressure-activated unit 102), it returns to its original position. Thus fluid outputting is halted.

The device 11 is also configured for distance outputting without applying pressure to a surface, and in the shown example, there is provided an arrangement to facilitate selectable distance outputting of fluid. In the example, this comprises a thumb selecting arrangement. In the example, the example thumb selecting arrangement comprises a depressible button 512.

The arrangement to facilitate selectable distance outputting may further comprise a spring element(s) 526 (which may be a coil spring, and/or anything that is deformable in such a way that it functions as a spring). This may be useful, for example, so that the button (or any feature(s) of a thumb selecting arrangement, or of any arrangement, not limited to a thumb selecting arrangement) can (resiliently) return to its original position once it is no longer pressed and/or used. The spring element(s)/feature(s) 526 may also, for example, aid analogue functionality of the arrangement to facilitate selectable distance outputting. It may, for example, provide resistance against pressure and/or movement by a user of any feature(s). This may provide the user with more intuitive and gradual/graduated control of fluid outputting from a distance.

An example arrangement will now be described. In the shown example, (taken by way of example only), the example button 512 is part of (and/or in communication with) a member and/or feature 528 (which may be hollow and/or elongate and is preferably internal to the device). The example member and/or feature 528, in the example, comprises two apertures. In the example, a first aperture 530 preferably always (in the shown example) allows fluid into the member. In the example, a second aperture 532 may allow fluid into the member and/or feature 528 (which is preferably elongate). In the example, and as shown in FIG. 36, a second aperture 532 is preferably not, by default, aligned with an output channel 534 which, in the example, leads to the fluid output point. In the shown example, there is shown a spring element(s)/feature(s) 526 which, in the example, is lodged and/or located between the member and/or feature 528 (which is preferably hollow), and another feature 535 (which may, as shown in the example, be a further member, which may also be elongate). (The feature 535 need not be provided—for example, the spring element/feature 526 may simply be up against a side of the device, or at any place/position of the device). The spring element (s)/feature(s) 526 (which may be defined as being part of a spring arrangement) is shown in FIG. 36 extended, thus forcing the button 512 (or any feature(s) and/or portion(s) of any thumb selecting arrangement) to protrude from the device 11. The examples shown are shown by way of example only. Any or all of the feature(s) shown and/or disclosed may be provided.

In FIG. 37, the same basic example embodiment is shown, with the thumb selecting arrangement now being used by the user. The example button 512 is shown having been pressed by a user's thumb. The button is depressed/pressed. In the example, this has tensioned the spring arrangement, which in the example shown comprises a coil 526. In the example, by depressing the button, the member/feature 528 (which is preferably hollow and is preferably elongate) is moved. In the example, this has aligned the second aperture 532 with the example output channel 534. Thus fluid can flow into the output channel 534. Thus fluid can now flow out of the fluid output point. Thus a fluid output 88 is shown outputted from the fluid output point.

This example is given by way of example only and is a very basic way to demonstrate how fluid can be outputted via pressure-activated outputting, and can be outputted from distance via an arrangement to facilitate selectable distance outputting. It also shows how an example thumb selecting arrangement may be used, in use. There are a vast array of ways that pressure-activated and distance outputting can be done, and the example is shown by way of example only. The example of utilizing a spring element(s) is also in no way limited by the example shown.

The (or any) distance outputting of fluid may feasibly be analogue, whereby (for example, with reference to the example of FIG. 36 and FIG. 37) when only a part/portion of the second aperture 532 is aligned with the output channel 534, fluid is outputted at less pressure (and/or less volume, eg per second) than when the aperture 532, for example, is fully/wholly aligned with the output channel 534. Thus a user may, feasibly, be able to control distance output strength. This is just one example of how volume and/or strength and/or speed of distance outputting of fluid may be controllable by a user.

Figure 23:
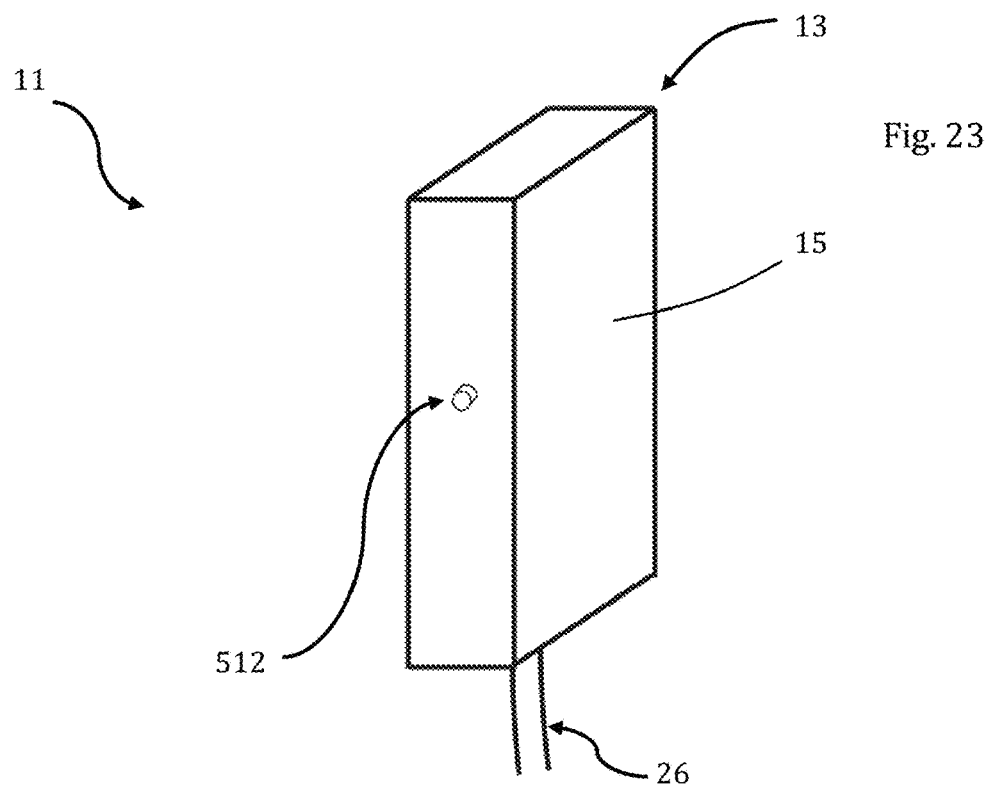
FIG. 23 is a perspective view of a fluid outputting hand device comprising a thumb selecting arrangement to select distance outputting of fluid.
Figure 25:
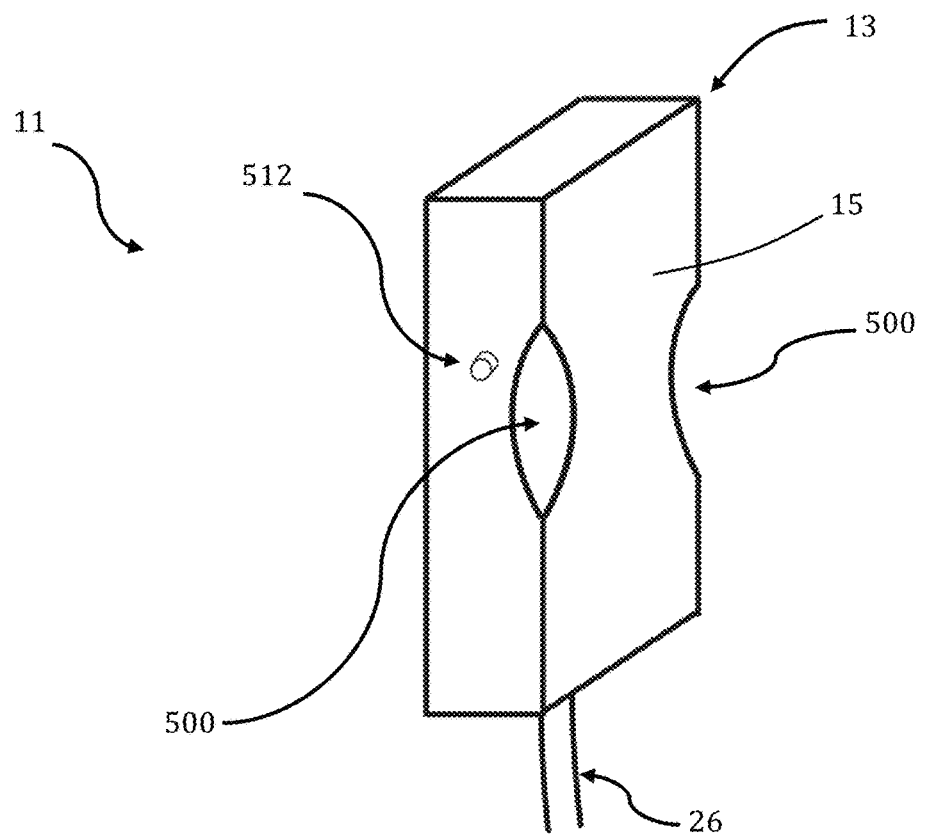
FIG. 25 is a perspective view of the hand device wherein a front portion of the hand device is shaped to aid gripping and/or holding by a user.

As shown in FIGS. 23, 24, and 25, for example, the hand device need not be secured to the hand (or have any securing arrangement to secure it to a hand), and may thus be grippable by a user. Thus the user, in the examples of FIGS. 23 to 25, for example, may simply grip the front portion 13, to use the hand device. (In the example of FIG. 25, the front portion (or any part of the device) is shown shaped to aid gripping/holding by a user. In the example, this is aided by recess(es) 500, which can be used to help grip the hand device. This is shown by way of example only, and it may be that the front portion is shaped in any other way, to facilitate gripping/holding. Any arrangement/shape to facilitate gripping/holding may be provided). Furthermore recess (es) need not be provided in the position shown in the example of FIG. 25, for example. For example, the recess(s) may be more centrally positioned at each side of the front portion, (and/or may be at any position at each side of the front portion, for example). Thus the sides of the front portion may be recessed and/or shaped, to aid gripping, not limited to the example shown in FIG. 25.

Figure 26:
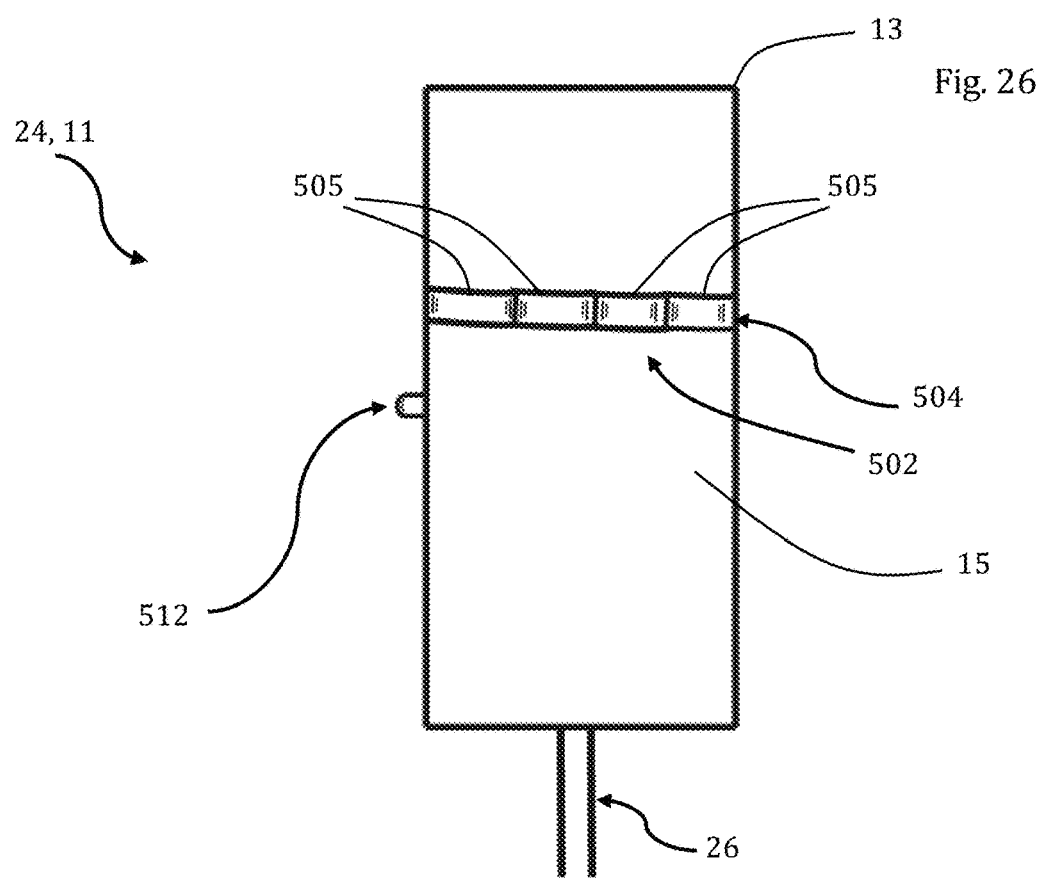
FIG. 26 shows an embodiment of the hand device wherein the hand device has become a glove device, the hand device comprising a back securing arrangement, comprising finger holding element(s) to enclose a portion of a hand of a user.

However, preferably the fluid outputting hand device comprises a back securing arrangement 502. Thus the hand device becomes a type of glove device. In the example of FIGS. 26 and 27, the back securing arrangement comprises a finger holder arrangement 504. The finger holder arrangement may comprise any number of finger holder(s) 505. In the example the finger holder arrangement comprises four finger holders. Nevertheless, for example, it is possible only one finger holder is required and/or that a finger holder(s) is provided that more than one finger can fit into. For example, a large single finger holder may be provided that two fingers (or more) can fit into. This may be all that's required to secure the user's hand to the device. In another possible example, it is possible two large finger holders are provided, with each one being able to fit two fingers into. Thus four fingers could be held in two large finger holders. These are all examples of a finger holding arrangement. (If not already clear, it should be stated that embodiments such as those in FIG. 2 and FIGS. 10 to 17, for example, are embodiments of a fluid outputting hand device comprising a back securing arrangement, because the back of the glove device, in those embodiments, plays a role in keeping the hand device secured on the hand of the user. A back securing arrangement may use any part of the back of the user/wearer's hand, to help secure the device to the user's hand, whether it be back of the palm/main part of the hand, and/or back of the digit(s) of the hand, for example. Thus FIG. 2 and FIGS. 10 to 17 (and many others in the present application), show examples of a back securing arrangement).

In FIG. 27, a user's hand is shown with finger(s) fitted into the finger holder arrangement. In the example, each of the four fingers of the user's hand fit into a finger holder of the finger holder arrangement.

Preferably the finger holder arrangement (and/or finger holder(s)) is elastic. Thus, in the example of FIG. 27, preferably each of the finger holders is elastic. This may be useful for various reasons, and may be particularly useful so that people of all different sizes of hands can use the hand device. It may also make securing the hand into the device more comfortable. It is feasible the or a portion of the finger holding arrangement may be removably attachable. It may be that different finger holder arrangements (or portion(s) of a finger holder arrangement(s)) are provided. Thus the (or a portion of the) finger holder arrangement(s) and/or back securing arrangement(s) may be removably attachable, and interchangeably usable. (A plurality may be provided). Thus different interchangeably usable finger holder arrangements (or portion(s) of them), may be provided, for example, of different sizes. This may be useful so that, for example, a person with large hands (eg a male adult) may be able to use the device. Then the or a portion of the finger holder arrangement may be removed, and a new (or portion of a new) finger holder arrangement may then be attached, which for example, may be configured for use by a user of smaller hands (such as a child, for example). Thus it is feasible the (or a portion of the) finger holder arrangement(s) (and/or the (or a portion of) any embodiment of a back securing arrangement(s), not limited to a finger holder arrangement) may be removably attachable, and may be interchangeably usable. (Such removable attachability could be achieved, for example, via Velcro® type solutions (eg hook-and-hook, and/or loop-and-loop, and/or hook-and-loop). (The term 'Velcro®' is here used as a broad term, to include within its scope any solution that a layperson would consider to be 'Velcro®'. Thus it is broad). This is just one example of how removable attachability may be achieved, in no way limiting the concept. For example, clip(s), or any other solution(s), may be provided, to facilitate removable attachability).

In the example of FIG. 28, the finger holder arrangement comprises a strap element 506 to secure a hand of a user. The or any strap element(s) may, or may not, be elastic. The or any strap element(s) may, or may not, be removably attachable.

In some embodiments, the back securing arrangement may surround most or all of a back of a hand of a user. For example, in the embodiment of FIG. 15, for example, the back securing arrangement surrounds most or all of a back of a hand of a user, and, in fact, surrounds all of a back of the user's hand, with the back securing arrangement simply being provided by way of the back of the glove.

However, preferably the fluid outputting hand device has a partially or wholly open back (as shown clearly in FIGS.

Figure 39:
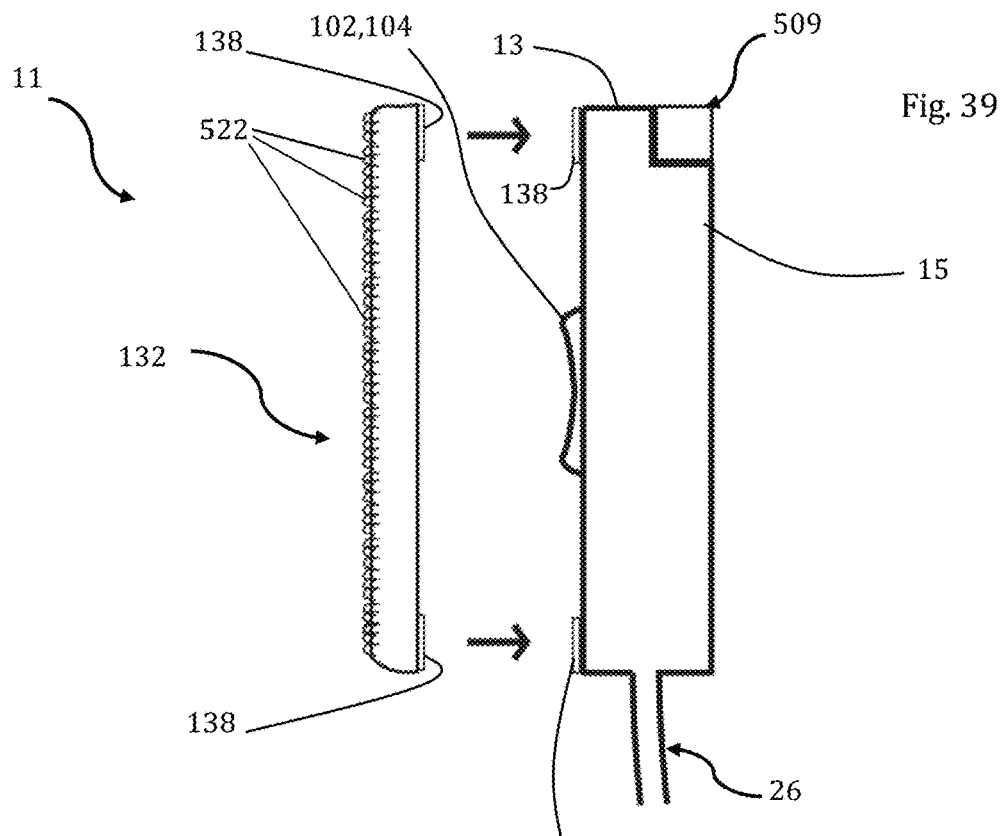
FIG. 39 is a side view of the hand device wherein the hand device comprises a removable (engagement) surface, which may be a pad attachment.
Figure 43:
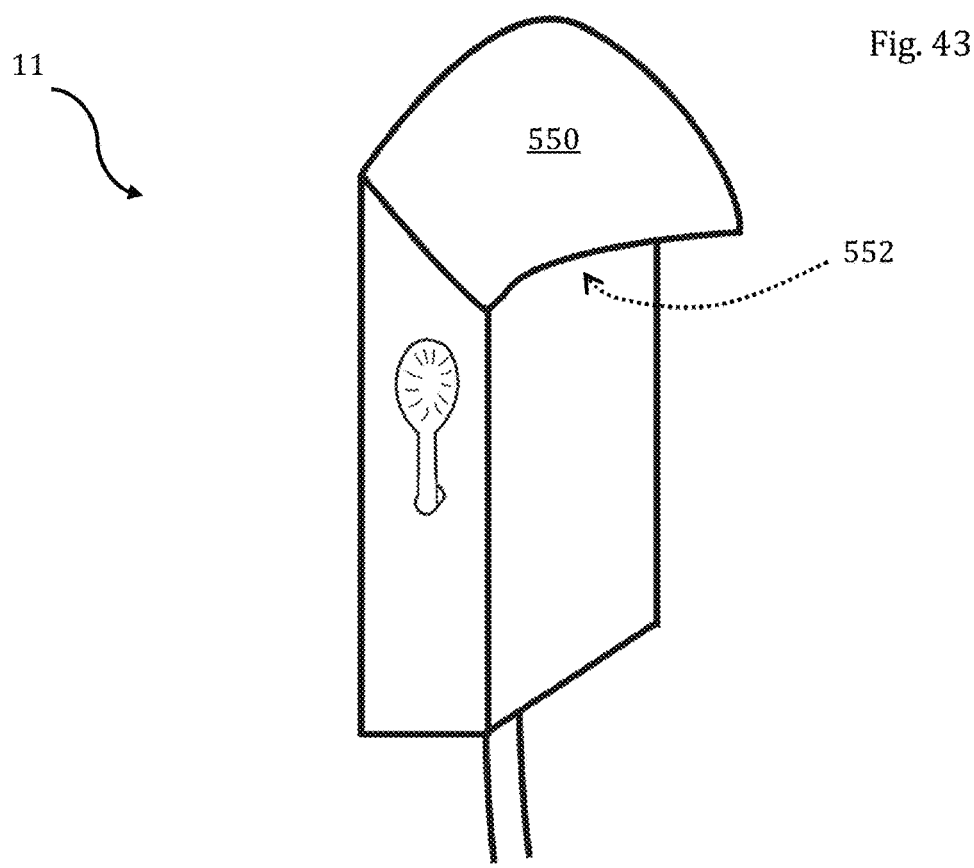
FIG. 43 shows an example of the fluid outputting hand device, wherein the device has a partially open back.

23 to 37, for example, and FIGS. 39 and 40, which show the hand device having a fully open back). It is feasible, however, that, for example, rather than having the whole back open, that the hand device may slightly/partially extend from the front side of the hand, to then go over the top, and 'part' of the back of a user's hand. Thus it would be said to have a 'partially' open back. ('Back' here refers/is with reference to any portion that goes over the back of a user's hand). An example of a partially (but not wholly) open back is shown in FIG. 43, where a very basic depiction is shown, where the device is shown in a shape where part of the top of the device goes over a hand of a user. Thus there is formed a hood 550 (in the example), (which may more broadly simply be defined as a portion 550). In the example, the portion 550 partially or wholly goes over a hand of a user). This is simply shown by way of example, and many shapes/varieties may be possible of partially open back embodiments. The hood 550, in the example, thus forms a type of inner crevice/space 552, where the tops of a user's fingers may be placed/situated, in use. This could make the device easier to hold and/or use, or be beneficial for other reasons, such as avoiding fluid going onto the user's hand. A strap element(s), finger holder(s) element, or any other feature(s) (and/or feature(s) that have been disclosed) may be provided further.

Figure 38:
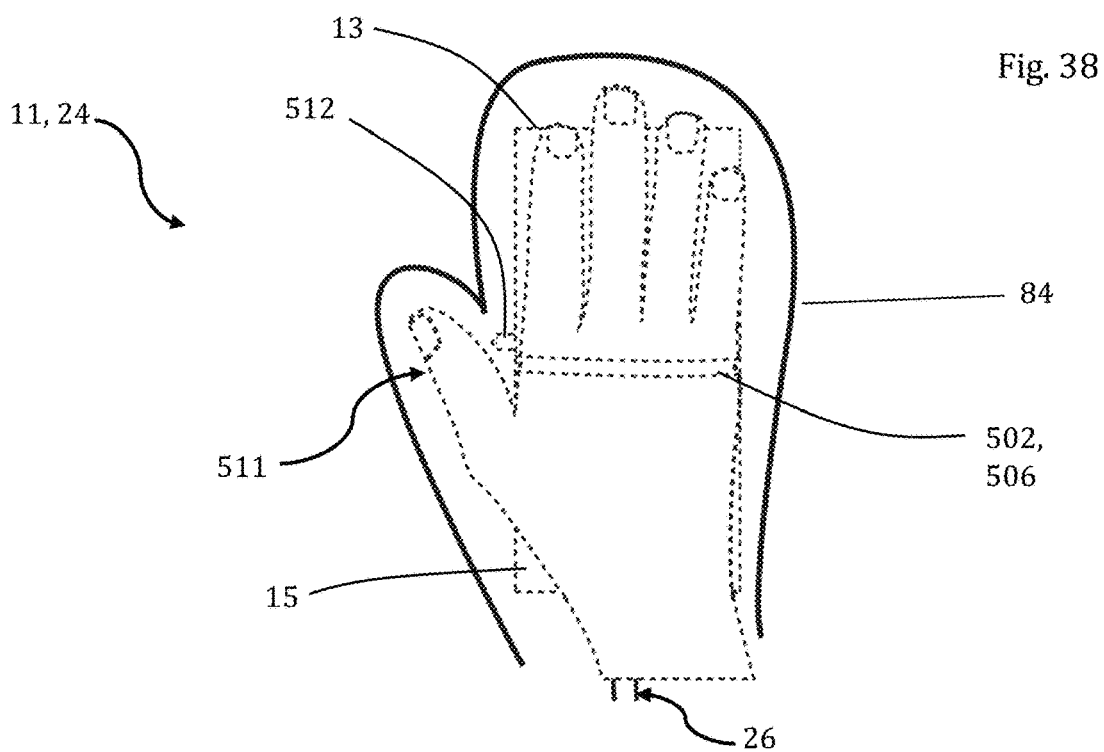
FIG. 38 shows an embodiment wherein there is provided a wearable covering for fully housing a hand of a user, hand shown in dashed lines to denote it is shown inside, thus showing the hand device in a glove device embodiment.

There is shown an embodiment in FIG. 38 wherein the fluid outputting hand device comprises a full outer covering, thus forming an embodiment where there is a back securing arrangement that wholly covers a back of a user's hand. In such an embodiment, the device may resemble embodiments similar to those shown, for example, in FIGS. 10 to 17, etc. Nevertheless, in such embodiment, there may be provided further securing arrangements. For example, the device 11 of FIG. 38 still comprises an internal back securing arrangement, with a strap element 506 clearly shown. The example further comprises an outer body/covering that fully covers a back of a user's hand. Thus, in such an example, the hand of the user may be or is completely entered into (and covered by) the device.

(The fluid outputting hand device is preferably removably attachable from the or any connecting element/member 26).

Figure 29:
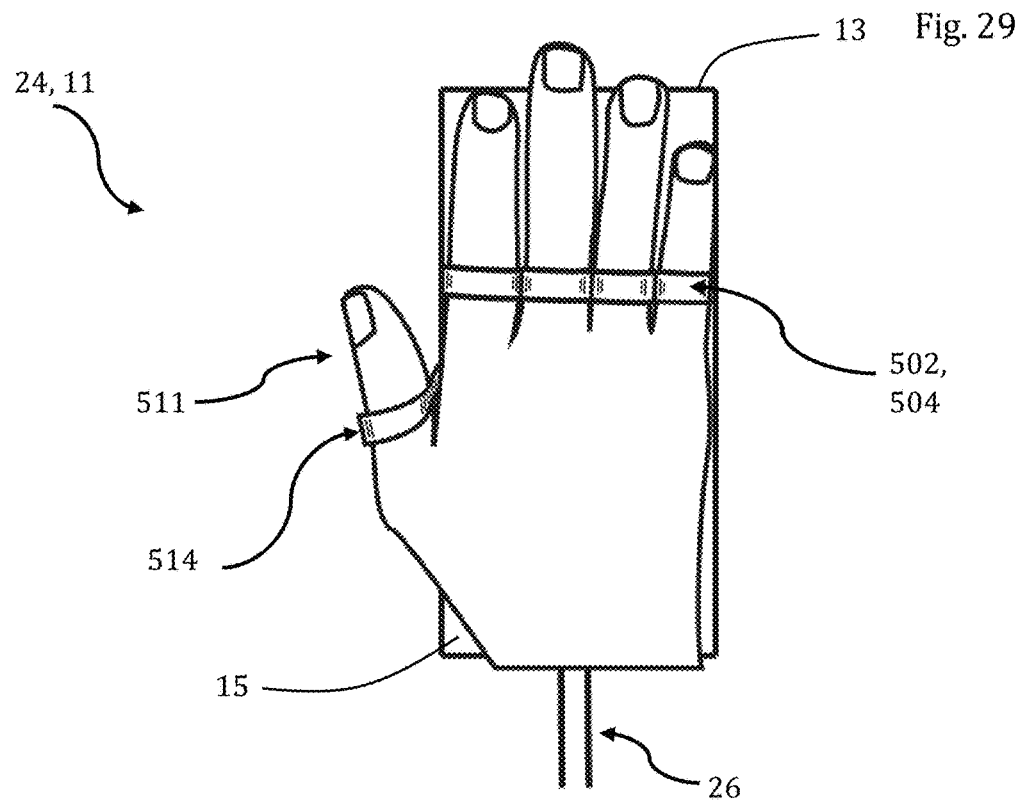
FIG. 29 shows an embodiment of the hand device wherein there is provided a thumb selecting feature that surrounds a portion or a whole of a user's thumb.
Figure 30:
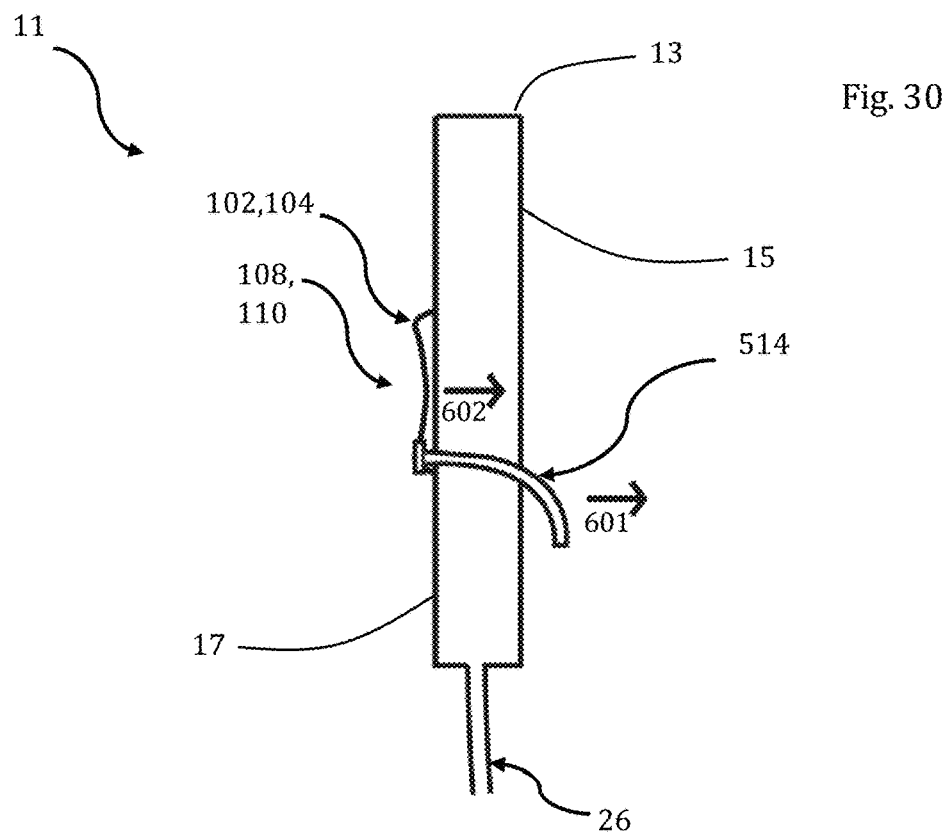
FIG. 30 shows a side view of the hand device and the (or a similar) example thumb selecting arrangement of FIG. 29.

In FIGS. 29 to 32, there are shown embodiments wherein the thumb selecting arrangement is configured to go around a portion or a whole of a user's thumb. (This is best shown in FIG. 29 and FIG. 32). FIG. 30 suggests, in one example embodiment, (and denoted with arrow 601), once the user has the arrangement (and/or any feature(s) of the example thumb selecting arrangement) around a portion or a whole of their thumb, they may move their thumb backwards (ie in the general direction of arrow 601), and that this may initiate distance outputting of fluid. By way of example, it is denoted that such movement may itself move an outputting arrangement (or any relevant feature(s)) of the device backwards (denoted by arrow 602). This may initiate outputting. Thus it is feasible, as can be seen in FIG. 30 (and various other Figures) that the same mechanism (in part or in full) which initiates pressure-activated outputting may be used to initiate distance outputting, in so far as (as can be seen in FIG. 30), the device comprises a pressure-activated outputting arrangement, which, when pressed against a target, outputs fluid. Furthermore, a portion or a whole of this same arrangement is again pushed 'backwards' when the example thumb selecting arrangement of FIG. 30 is pulled backwards and/or moved. Thus the thumb selecting arrangement may, in some way, be connected to the/a pressure activated arrangement of the device. This is just one embodiment, taken by way of example only. (Pressure-activated outputting and distance outputting of fluid may or may not be interconnected in such a way).

The fluid outputting hand device may comprise a stopping arrangement, to stop at least one of: pressure activated outputting of fluid when pressure is applied to a target; distance outputting of fluid. Thus, for example, in embodiments where the hand device comprises a thumb selecting arrangement, the hand device may comprise a stopping arrangement, to stop distance outputting. This may be useful to stop fluid outputting when it is not desired (either for pressure-activated outputting, and/or for distance outputting of fluid). An example of a stopping feature 518 is shown, by way of example, in FIG. 24. A user may, for example, be able to use this feature to stop any fluid outputting. Thus it may be usable to stop pressure-activated outputting, or distance outputting of fluid, or both. Thus, if the feature 518 is a protruding button, for example, the user may be able to press the button, and thus stop fluid outputting (as disclosed above). This may be particularly useful to use if the user has finished using the hand device, or if, for example, the user wants to take a break whilst using the hand device, and wants to put the device aside, and does not want the hand device to accidentally output fluid (eg if pressure-activated outputting was initiated, by mistake, for example, from leaving the hand device touching a surface and/or if the arrangement to initiate distance outputting was selected, by mistake, eg by lying the hand device on a surface, which then led to the arrangement to initiate distance outputting being triggered/selected). It may also be useful, eg just to prevent distance outputting, when using the pressure-activated outputting function. Thus, if the hand device is being used, and a user presses it against a target (eg a pet, a car, or any other target) in order to activate pressure-activated outputting of fluid, it may be annoying and/or non-beneficial to also initiate distance outputting (eg by triggering the thumb selecting arrangement (or any other arrangement for initiating distance outputting)). Thus, it may be that a stopping arrangement is provided so that the user can use pressure activated outputting, with it being guaranteed that distance outputting is not selected/initiated.

The fluid outputting hand device may comprise a removably attachable engagement surface 132. An example of this is shown in FIG. 39. This may be used in combination with fluid outputting (eg using a different engagement surface/element 132, with different qualities, eg for use on different parts of a dog/pet (or any target)), or may be used without fluid outputting. For example, the example engagement surface 132 of FIG. 39 may be, for example, an absorbent pad, and may be used, after the device has been used to clean (eg with a mix addition fluid output) a car, and then perhaps rinse the car (with a non-mixed (eg solely water) fluid output), with the absorbent pad/element then being attached to the hand device, to absorb fluid from the car surface and/or shine the car. In such a situation, it may then be useful to use the stopping arrangement, so that it is guaranteed fluid is not outputted, whilst absorbing and/or shining takes place.

Alternatively, the example removably attachable engagement surface of FIG. 39 may, for example, be a soft surface which may be used to help clean and engage with parts of a pet. Eg a harder, or more sharp surface (such as a comb-like surface) may be used to clean, brush and/or output fluid onto various parts of a dog (eg the dog's back, etc). That surface may then be removed, and this softer example engagement surface of FIG. 39 may then be attached, perhaps continuing to use the hand device for fluid outputting and cleaning, but now using it on more sensitive parts of the dog, such as face of the dog, or legs and/or paws of the dog, etc. Thus the softer surface may then run along such example sensitive parts of the dog, with the pressure-activated function still being usable. In the example, the engagement surface comprises a soft surface 522, which may comprise hairs, or any other material/surface. (Alternatively, similar to the car example, the example removably attachable engagement surface of FIG. 39 may, for example, be used to clean, dry, or brush a pet, after they've been cleaned (eg with mix addition) and/or rinsed (eg with a non-mixed (eg solely water) fluid). Again, in such a situation, it may then be useful to use the stopping arrangement, so that it is guaranteed fluid is not outputted, whilst cleaning, drying, and/or brushing of the pet takes place. Thus a brushing and/or drying surface may be provided, and may be provided removably attachably).

A mating arrangement may be provided to help mate/attach the or any removable engagement surface. Any mating arrangement may be provided. In the example mating arrangement of FIG. 39, the mating arrangement comprises a fixing/mating feature(s) 138. This may, for example be/comprise a Velcro® (including within its scope any hook and loop, hook and hook, loop and loop solution, or any solution that would or could be deemed, by a layman, to be a Velcro®-type solution). In the example, the removably attachable engagement surface comprises a fixing/mating feature(s). In the example, they mate with a corresponding fixing/mating feature(s), to help fix to (and become part of) the front portion of the hand device. (Feature 132, in the example shown, may be defined as a removably attachable attachment, comprising an engagement surface, (and/or as an example of a removably attachable surface)).

Thus, as has been shown, the hand device may comprise a removably attachable surface. (An example of this is shown in FIG. 22, and also FIG. 39). The surface may come as part of an attachment. (In fact, a removably attachable surface itself could be considered to be a removably attachable attachment). A good example of a removably attachable attachment is in FIG. 39, where a view is shown of the/an attachment (comprising a surface) removed. However, other (perhaps more basic) embodiments may be provided, eg wherein simply a (cloth) surface, (for example), may be removably attachable to the hand device. Thus simply a surface (preferably of a shape that matches a portion or a whole of the front of the device (and/or, more broadly, any part(s) and/or a portion or a whole of the device), may be removably attachable to the hand device. For example, in an embodiment for cleaning a car (or any other use/surface), a cloth (which is an embodiment of a 'surface') may be removably attachable to the front (or part of the front (and/or any part(s) and/or a portion or a whole of) the device. Preferably it is of a shape that matches a portion or a whole of the front of the hand device. It may be attachable via any means/in any way, (eg Velcro®-type solutions, clip(s), etc), and is preferably easily and substantially instantly removably attachable. This may be used, for example, as a 'drying surface' to dry a car (or any surface to be cleaned/engaged), after cleaning, and/or even as a 'polishing surface' to polish a surface (eg after washing it). Thus there may be provided a removably attachable surface(s) for the hand device. As stated and/or shown, there may be provided different types of removably attachable surface(s). These may suit different needs and/or functions. For example, different surfaces may be used to clean different dogs/animals, (eg who have different types of coats—eg animals with different types of coat, or even different types of dog, which have different types of coat). Different types may be used for different function—eg a scrubbing attachment/surface, which may be attachable to scrub a surface (or any item/animal, etc). (The or any scrubbing surface may comprise protrusion(s), (eg rubber protrusion(s)), which may aid scrubbing. An example would be protruding bristles, and/or any protrusions). Thus via different removably attachable surfaces, the hand device may be able to carry out different cleaning functions. As stated, the surface may come as part of a removably attachable attachment, which may comprise further feature(s). For example, the or any attachment(s) may comprise a hard part(s), (eg a hard back part(s)). This may facilitate attachment.

It should also be stated, a removably attachable surface/attachment is not limited to being only for the (or a portion of the) front of the device; it may be of a shape such that it extends to other part(s) of the device (eg the top and/or back and/or side(s) of the device) and may feasibly cover a whole of the device and/or a hand of the user, which would also be an embodiment of a removably attachable surface. Thus a removably attachable surface may be provided in any form, not limited to the embodiments shown and/or disclosed. A removably attachable pad is shown in FIG. 22, for example, as an example embodiment of a removably attachable surface, (and thus an example of a removably attachable feature, comprising a surface).

Figure 44:
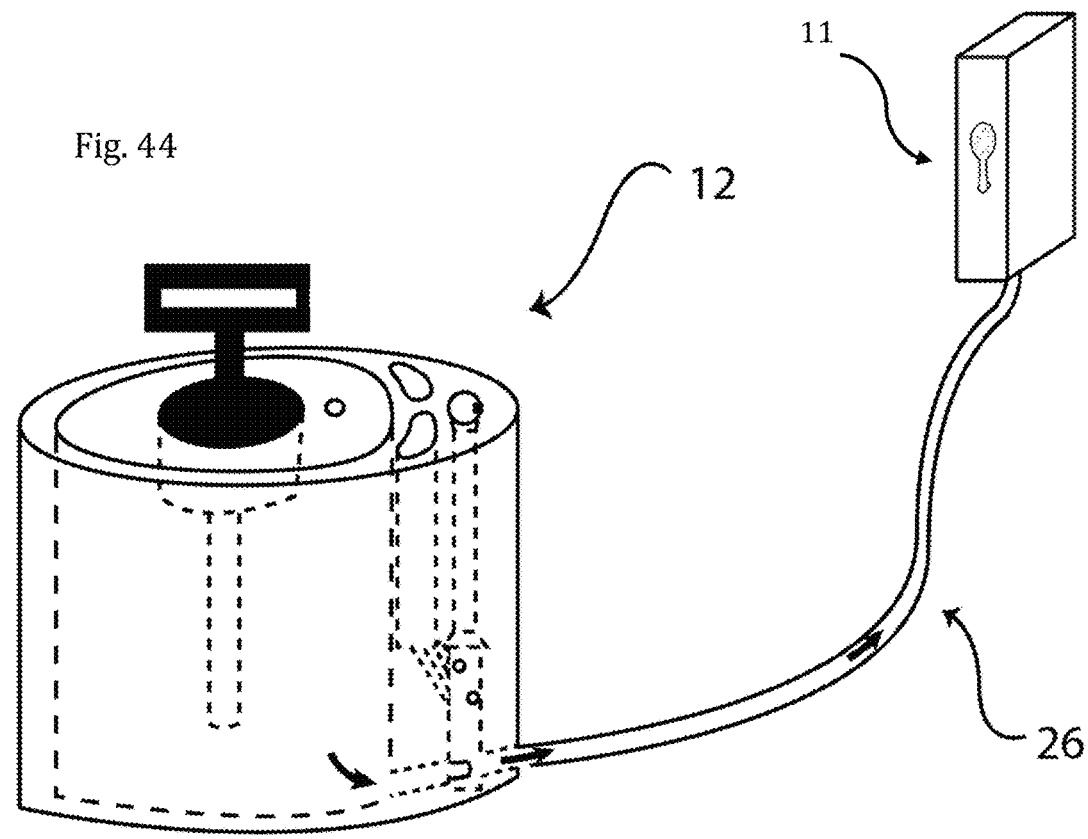
FIG. 44 shows an example of the fluid outputting hand device as part of a fluid outputting apparatus.

The fluid outputting hand device may be provided as part of an apparatus, the apparatus comprising: the fluid outputting hand device; and at least one of: a fluid reservoir (preferably portable); a pressurizing mechanism; a mixing system, to facilitate mix addition outputting from the fluid outputting hand device. Such an apparatus may comprise a portable station (as shown in many of the drawings (and as shown in FIG. 44)). However, the portable station example shown is shown by way of example only, and any of: the/a fluid reservoir (preferably portable); the/a pressurizing mechanism; the/a mixing system; and the/a selecting system (for selecting mix addition(s)) may, or may not, be provided, and need not be provided by way of a 'station' as shown. Furthermore, the/a fluid reservoir (preferably portable); the/a pressurizing mechanism; and the/a mixing system need not be provided in an all-in-one solution, and may, for example, be provided separately, at different parts/positions of the apparatus, not limited to being provided all together in an all-in-one solution, such as the example station/embodiment(s) shown. Any or all of: the/a fluid reservoir (preferably portable); the/a pressurizing mechanism; the/a mixing system; and the/a selecting system may, or may not, be provided together, in an all-in-one solution. A mixing and selecting system may be provided.

If a portable station is provided, preferably it comprises a/the fluid reservoir, the fluid outputting apparatus further comprising a connecting element (eg a tube, for example), which may also be referred to as a connecting member, to facilitate flow of fluid from the fluid reservoir to the fluid outputting hand device. The station may further comprise a mixing system to facilitate mixing of at least one mix addition, and may also comprise a selecting system. However, whilst the drawings show the example station 12 comprising a selecting system, it is feasible a selecting system and/or selecting element/feature may be provided anywhere on the apparatus, not limited to being provided on the station. The (or any) station may, or may not, comprise a mix addition holding chamber(s), (as has been previously shown). The station may further comprise a pressurizing mechanism (eg a pump, preferably a hand pump).

(The or any mix addition(s), in use, may be held internally to the station, partially or wholly, and/or externally on/to the station, partially or wholly). The or any mix addition holding chamber(s) may, for example, be provided partially or wholly internally inside/within the housing of the station and/or may be provided externally on the housing partially or wholly). (It is also feasible that a mix addition holding arrangement may be provided anywhere about the apparatus, not limited to being associated with the station).

As will be apparent, various example embodiments have been shown regarding pressure-activated outputting and/or (selectable) distance outputting of fluid. As will be apparent, the hand device 11 (including all embodiments of any fluid outputting glove device) may comprise any arrangement to facilitate pressure-activated outputting of fluid. Similarly, any arrangement for facilitating (selectable) distance outputting of fluid may be provided. Thus the fluid outputting hand device may be pressure-activated in any way. Thus the fluid outputting hand device may facilitate (selectable) distance outputting in any way.

Similarly, whilst various embodiments of an (example) station have been shown, offering 'all-in-one' provision of multiple features (ie portable fluid reservoir, mixing and selecting system, pressurizing mechanism (and preferably the ability to hold at least one mix addition and/or mix addition container), such features need not be provided together in an 'all-in-one' solution, and may be provided, for example, separately anywhere about/as part of the apparatus. Furthermore, the apparatus need not comprise all the aforesaid features. Furthermore, a 'station' may, or may not, be provided, whether or not the aforesaid features are provided. Any arrangement of any type may be provided to provide any of the aforesaid features and/or functionality. For example, any arrangement to add mix addition(s) may be provided, etc.

Referring to FIG. 44, there is shown an example of the hand device 11 as part of a fluid outputting apparatus. In the example, the apparatus comprises a station 12 (in the example, same/similar to as shown, for example, in FIG. 1 and FIG. 2). Thus, in the example, fluid can travel from the fluid reservoir and/or station comprising a fluid reservoir, along the connecting member 26 (which is shown as a tube, in the example), and out from the hand device 11. Preferably, the hand device also comprises a back securing arrangement (not shown in the example).

Referring to FIGS. 45 to 49, there is shown a sequence of representational figures, to represent (in basic terms) (and/or show) an example(s) of a stopping arrangement. (Other aspects of the/an invention are not shown, to help provide clarity to and/or focus on the stopping arrangement). These figures may be considered to be semi-transparented and/or cross-sectional, and are representational.

Figure 45:
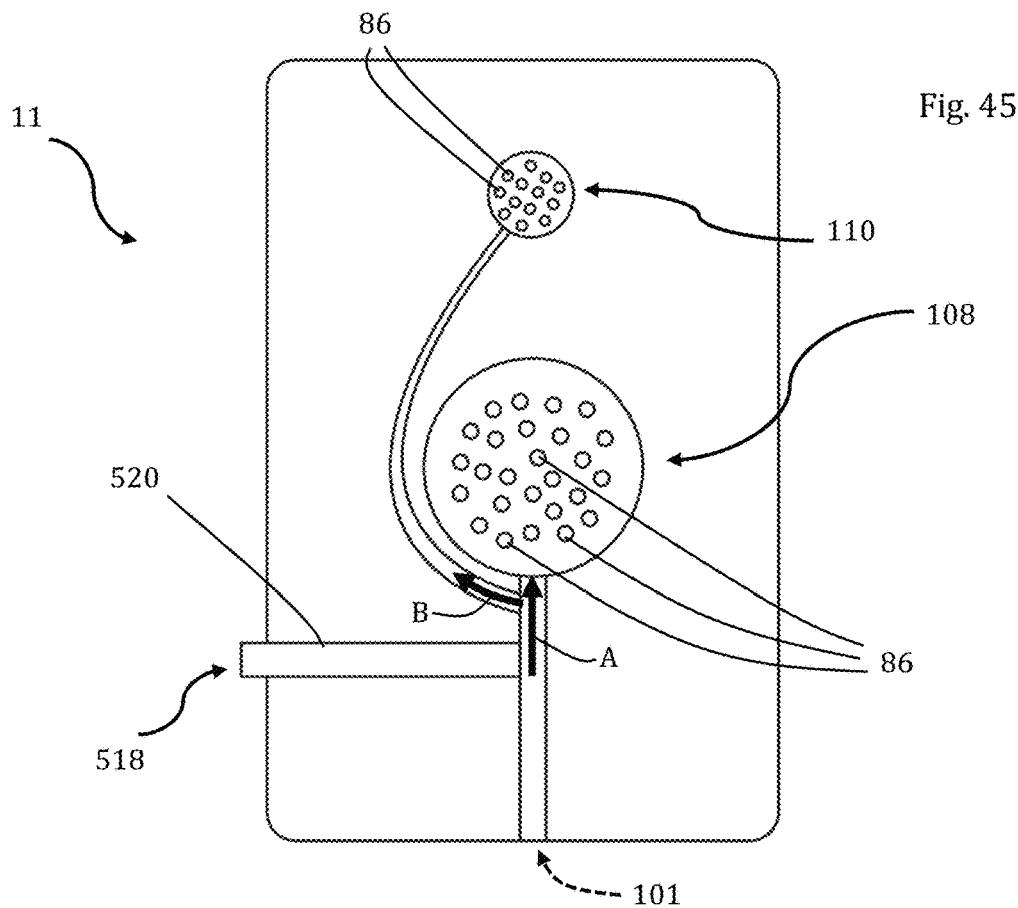
FIG. 45 is a representational view (and/or cross-sectional and/or partially transparented view) of an example embodiment of the fluid outputting hand device, showing an example embodiment of a stopping arrangement for stopping flow of fluid from the device.

Referring to FIG. 45, there is shown an embodiment of a stopping arrangement. There is shown a first fluid output point arrangement 108, which is for pressure-activated outputting of fluid. There is shown a further (and/or second (ary)) fluid output point arrangement 110, which is for distance outputting of fluid, in the example. In the example, both the pressure-activated output point arrangement and the further (and/or second(ary)) fluid output point arrangement comprise a plurality of fluid output apertures 86.

In FIG. 45, there is shown an example fluid input point 101 (eg to receive fluid from a connecting member, or from any other source).

The stopping arrangement is shown comprising a stopping feature 518. In the example, the stopping feature is (and therefore comprises) a button. It is shown (in FIG. 45) initially extending out from the fluid outputting device.

In FIG. 45, the stopping feature 518 has not been selected/used (and/or depressed) by the user. Because, in the example, a stopping element/member 520 has not been used, fluid can flow to the pressure-activated fluid outputting point, and can also potentially flow to the distance fluid outputting point. This is denoted by arrows A and B.

Figure 46:
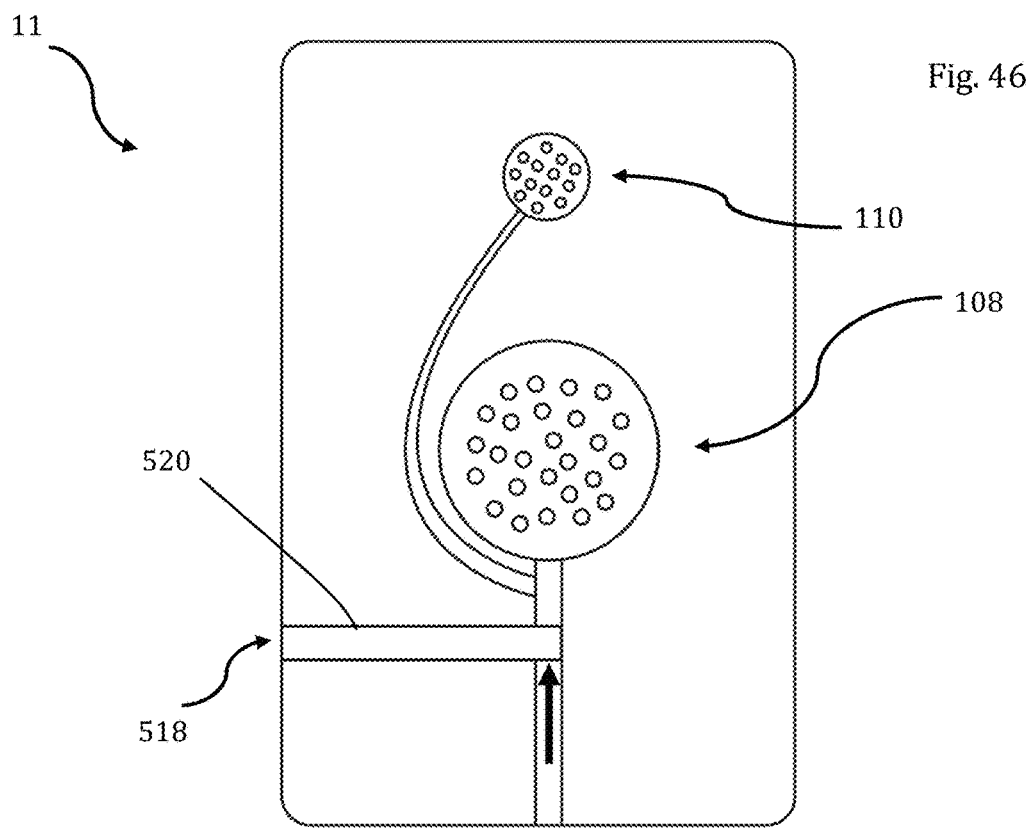
FIG. 46 shows the same embodiment as FIG. 45 (and the same view), now showing wherein a stopping feature has been used/selected, and the stopping arrangement is in a mode where it is stopping and/or blocking flow of fluid.

However, in FIG. 46, the same example is shown, but now the button (an embodiment of a stopping feature) has been pressed by the user. It can now be seen that the example stopping element 520 has now blocked flow of fluid, and that fluid cannot now get to either of the fluid output point arrangements. Thus, by using the stopping feature/arrangement, the user has stopped the device from being able to output fluid from the fluid output points.

A very similar embodiment is shown in FIG. 47, which shows the same features, but now shows an embodiment wherein the distance outputting fluid output point arrangement 110 comprises a plurality of output points (four output points in the example). (The plurality of output points are numbered 110a, 110b, 110c, 110d). This may (or may not) be used (and may be useful) in an outputting configuration that attempts to mimic a (dog) paw. Examples of an outputting arrangement mimicking a dog paw have been discussed previously. Thus the four distance outputting points may be positioned substantially similarly to where the four small paw pads of a dog's paw are located. The pressure-activated output point arrangement may be positioned substantially similarly to where the main pad of a dog's paw is located. The device may then be adorned/designed/decorated to make these pad parts clear and obvious (from an aesthetic point of view). Thus the device can be designed to mimic a pad of a (preferably dog) paw.

In the example, output points 110a, 110b, 110c and 110d each comprise a plurality of fluid output apertures 86. (However, they need not comprise a plurality).

In FIG. 48, a different embodiment is shown wherein the device is configured so that the stopping arrangement only prevents pressure-activated outputting of fluid, but does not prevent distance outputting of fluid. In the example, with the stopping feature 518 (which is shown, in the example, as a button) used (pressed, in the example), the stopping arrangement blocks flow of fluid from the pressure-activated fluid outputting point arrangement (as shown). But it in no way blocks flow of fluid to the distance fluid outputting point arrangement. (Denoted by arrow B, which denotes/shows fluid can still flow/travel to the distance fluid outputting point arrangement 110).

In the examples of FIGS. 45 to 48, there is shown one fluid input point to the device. However, in FIG. 49, there is shown two fluid input points 101a and 101b; one for input of fluid to be outputted via pressure-activated outputting; and one for input of fluid to be outputted via distance outputting of fluid. (Note: these may be 'hidden from view' of the/a viewer/user, eg by being provided within one external housing and/or tube. Thus the user may not know/see there are two fluid input points). In the example, the stopping arrangement can only stop pressure-activated outputting of fluid. However, it is feasible a stopping arrangement may be provided to stop either pressure-activated outputting of fluid, or distance outputting of fluid, or both. It should also be said that, distance outputting of fluid and pressure-activated outputting of fluid may be outputted from the same fluid output point (and/or from a same, or very similar, location on the device) and/or may share fluid output point aperture(s). In such a case, the stopping arrangement may stop both pressure-activated outputting of fluid and distance outputting of fluid. (However, nevertheless, it is feasible, even in such an embodiment, that the stopping arrangement may only stop either pressure-activated outputting of fluid or distance outputting of fluid).

(It should also be stated that the fluid output point for distance outputting of fluid (which is often referred to as a/the 'second(ary)' or 'further' fluid output point), may be simply 'a' fluid output point (rather than a 'second(ary)' or 'further' fluid output point) in the sense that there may be provided an embodiment wherein there is not a pressure-activated output point/functionality (and therefore not what may be referred to as a 'first' fluid output point). Thus when the term 'second(ary)' or 'further' fluid output point is used, it should be noted that, in embodiment(s) wherein there is no pressure-activated output point/functionality, the term 'distance outputting fluid output point' may be more appropriate. Furthermore, use of the term(s) 'second(ary)' and 'further' does not preclude claiming of such embodiment(s), (ie wherein there is no pressure-activated output point/functionality), in which case, what is defined as a 'second(ary)' or 'further' fluid output point may simply be defined (eg in a claim) as 'a' fluid output point and/or as a distance outputting fluid output point).

Referring to the example stopping arrangement, a very basic embodiment is shown. In the example, the stopping arrangement comprises a button. The button, in the basic example, forms part of a member/element 520 (or may be connected to a member/element 520). (The button need not form part of (or be connected to) the/a member/element 520 in order to be able to move the/a member/element 520, and the example is provided by way of example only). The member is then moved when the button is depressed, and blocks flow of fluid. This is just one example of a stopping arrangement, and feature(s) other than a button may, or course, be used/provided. Similarly, a member/element (or any feature(s)) blocking a flow of fluid is shown by way of example only. Many way(s) of stopping flow of fluid may be used as part of a stopping arrangement, all falling within the scope of being a stopping arrangement.

(Note: An 'arrangement' may, or may not, comprise a 'mechanism'. Thus whenever the term 'arrangement' is used (eg stopping arrangement), the arrangement may be claimed as being/comprising a mechanism, but is not limited to being/comprising a mechanism. Thus the stopping arrangement, for example, may be/comprise a mechanism. (The term 'comprising' includes within its scope 'being')).

(It should be noted that FIGS. 45 to 49 do not show a thumb selecting arrangement. However, it will be apparent that embodiments that comprise a thumb selecting arrangement to facilitate distance outputting may comprise a stopping arrangement, and therefore may comprise a/the stopping arrangement(s) as shown in FIGS. 45 to 49. As stated, such other feature(s) are not shown in FIGS. 45 to 49, simply to provide clarity and focus as to what is shown, with reference to the stopping arrangement embodiment(s)/example(s)).

(It should be noted (as has been noted before), that distance outputting and pressure-activated outputting may partially or wholly share the same output point arrangement (and/or any output aperture(s)). In many Figures from FIG. 23 to FIG. 39 (eg FIGS. 30, 33, and 35, for example), it is shown and/or suggested that pressure-activated outputting and distance outputting may be carried out (ie fluid may be outputted) partially or wholly from the same fluid output point (arrangement). In other Figures (eg FIG. 24 and FIG. 50, for example,), it is shown and/or suggested that pressure-activated outputting and distance outputting may be carried out via different fluid output point arrangements. It should be noted that either of these is possible. It should also be noted that any other feature(s) disclosed in an example/embodiment wherein distance outputting and pressure-activated outputting of fluid are carried out (ie fluid may be outputted) partially or wholly from the same fluid output point (arrangement) may be provided for an embodiment(s) wherein pressure-activated outputting and distance outputting are carried out via different fluid output point arrangements. Thus such feature(s) may be provided with reference to either or any embodiment(s). It will also be obvious that for any embodiment wherein distance outputting and pressure-activated outputting of fluid are carried out (ie fluid may be outputted) partially or wholly from the same fluid output point (arrangement), alternately, a further (or 'second(ary)') output point arrangement may be provided for distance outputting of fluid, and for any embodiment wherein pressure-activated outputting and distance outputting are carried out via different fluid output point arrangements, alternately, distance outputting and pressure-activated outputting of fluid may be carried out (ie fluid may be outputted) partially or wholly from the same fluid output point (arrangement).

With regard, to what is shown in FIG. 16 and FIG. 17 (and generally described and/or alluded to on several occasions through the present application) it is feasible the aperture(s) 118 may itself also be (or form part of) the or a fluid outputting point arrangement. Thus the aperture(s) 118 may itself/themselves be a fluid output aperture(s) 86.

As previously stated and/or alluded to, the fluid outputting hand device may be connectable to a mains supply and is not limited to connecting to the/a station. Thus there may, for example, be provided a connection arrangement and/or functionality that may allow the fluid outputting device to be connected to a mains supply of fluid, such as a garden hose and/or a tap, or, for example, via a (preferably double) tap connector device. (Such double tap connectors are commonly used to connect a shower head to a pair of bath taps).

Referring to FIG. 50, there is shown one preferred embodiment, in use. The example shows an embodiment of the fluid outputting hand device 11, with fluid being outputted from the device, from a distance. In the example, the user has initiated the distance fluid outputting with their thumb. In the example, a thumb selecting arrangement has been depressed/pushed in by the user's thumb. (The feature(s) of the thumb selecting arrangement are not visible, as they are obscured by the thumb of the user. However, any of the examples of the thumb selecting arrangement (eg any as shown in FIGS. 23 to 49) may be used/provided).

The user has pressed their thumb inwards, and depressed part or a whole of the thumb selecting arrangement, and fluid is seen thereby being outputted from a fluid output point, which, in the example shown, is a distance outputting fluid output point. The device is shown comprising a front portion, which is shown in front of the user's hand. The example is also shown comprising a back securing arrangement 502, which, in the shown example, comprises an elastic arrangement which is seen going round a finger(s) of the user, and which preferably comprises four finger holders, (as shown, for example, in FIG. 27).

The example device is also shown comprising a stopping arrangement(s). In the example, there are shown two stopping feature(s) 518. This, therefore, may be or is an example of an arrangement wherein there is a stopping feature (eg 518*a*) to stop/prevent outputting fluid via pressure-activated outputting, and a stopping feature (eg 518*b*) to stop/prevent distance outputting of fluid. (As stated, embodiment(s) may be provided wherein one stopping feature 518 may feasibly carry out stopping/preventing of both types of fluid outputting (ie pressure-activated and distance outputting). The stopping features are shown where they are by way of example only, and may be located anywhere about the side of the device, and/or anywhere at all.

The example is also shown comprising a fluid output point for pressure-activated outputting of fluid. Thus, the example shown is an example that also comprises an arrangement to facilitate pressure-activated outputting of fluid.

(The example thumb selecting arrangement of FIG. 50 is denoted as comprising a button (512) under the user's thumb. However, more preferably, the example device comprises a thumb selecting arrangement such as those seen in FIG. 40 to FIG. 43).

The front portion 13 of various examples of the fluid outputting hand device 11 are shown comprising a back face 15. The front portion 13 of various examples of the fluid outputting hand device 11 are shown comprising a front face 17.

The front portion need not be of any particular shape, and may (or may not) be deformable. (It is also feasible it may be solid in nature). The term 'front portion' is a broad term.

It should also be stated that the term 'front portion' is in no way limited to examples such as those shown in the drawings; for example, a 'bare-bones' version of the hand device may be provided, where the internal and/or functional elements of the device are not, (or substantially are not), encased and/or covered. Thus a very basic embodiment of the device may be provided, (or even an advanced embodiment), where the pressure-activated and/or distance outputting arrangements are not, (or substantially are not), encased and/or covered. Thus one can imagine, if an embodiment such as that, for example, shown in FIG. 32 is provided, without the (substantially cubic/rectangular, in the example,) body being provided, but instead just with the other functional features provided, (and perhaps a back securing arrangement (eg a strap(s)), the device may still function just as well. Such an example may be provided. And such an example, if any features are provided in front of the hand, (eg the output point(s)/aperture(s) and/or any material(s) comprising the output point(s)/aperture(s), for example), then that is still an example of a hand device comprising a front portion. Thus if one imagines the example of FIG. 32, for example, without the example cubic/rectangular body it comprises (and which is annotated with the feature number '13'), then it would be just a 'bare-bones' embodiment. But it should be stated clearly that such an embodiment would still be within a scope of comprising a front portion 13, for going in front of a user's hand, because the mechanical and/or functional features (eg the circular body (and other feature(s)), in the example of FIG. 32) would still be considered to be a front portion, for going in front of a user's hand. Thus it should be made clear that the term 'front portion' is a very broad term, and 'bare-bones' embodiments are within a scope of being a fluid outputting hand device, comprising a front portion 13.

However, as is clear/apparent by the nature of the disclosure in the present application, preferably a portion or most or a whole of the pressure-activated arrangement and/or a portion or most or a whole of the distance outputting arrangement are provided internally to the device. (A bare-bones embodiment would be an example where the pressure-activated arrangement and/or the distance outputting arrangement are not internal to the device—they are simply on-show, externally. Preferably a portion or most or a whole of the pressure-activated arrangement and/or a portion or most or a whole of the distance outputting arrangement are encased and/or covered. (Many examples are shown of this, and in a bare-bones embodiment, the pressure-activated arrangement and/or the distance outputting arrangement are not encased and/or covered).

It will be apparent, from the nature of the disclosure, and from the preferred embodiments disclosed, that preferably distance outputting is initiated via an arrangement that requires constant/continuing pressure (or, more broadly, 'action'), to initiate the distance outputting. Various examples have been shown and/or disclosed of this; for example, in the example of FIG. 23, (or FIG. 27, 28 or 32, for example), the thumb selecting arrangement is configured so that when pressure (or, more broadly, 'action') is applied by the thumb of a user, distance outputting is initiated, and so that, when pressure/action is released/stopped/ended by the thumb of the user, distance outputting ceases, (eg via the arrangement returning to an original position). (Touch-sensitive example(s) have also been mentioned, which may require permanent/constant/continuing touch from a user, for distance outputting to continue). Similarly for the example of FIGS. 33 to 35, wherein the device comprises a depressible top portion (or any depressible embodiment)], or for the button example of FIGS. 27 and 28 (and others), for example—again, preferably constant pressure/action is required, for distance outputting to continue, so that, in FIG. 35, for example, the user must maintain pressure on the depressible top portion, and when they release pressure from it, distance outputting ceases, (with it preferably returning to an original position). The same is preferably the case for the button in FIG. 23 (and others), which preferably can be depressed by the thumb of a user, such that the user can then release pressure on it with the thumb, with distance outputting then ceasing, and the button preferably then returning to its undepressed position. There are various ways of achieving this. It has been explored how this can be achieved via the arrangement to facilitate distance outputting being spring-loaded, and spring-loadedly returning to its original position. However, it will be apparent that being spring-loaded is only one way of achieving such a result, in no way limiting the concept. For example, it may be achieved via air-pressure, which returns the arrangement to its original position, for example, with distance outputting ceasing once pressure/action is released by the user. In another example, deformable material(s) may be used. For example, looking at the example of FIG. 41, for example, where it has been previously suggested and/or explored that a pivot or hinge may be provided, rather than that, for example, (and providing this example by way of example only, in no way limiting the concept), if the example arrangement in FIG. 41, for example, is deformable generally at the area between feature 542 and feature 544, (or at any other place), (eg made of resilient deformable rubber, for example), then it may be possible for a user to apply pressure with their thumb, (eg to the head 540, in the example, thereby pushing the head inwards, (due, for example, to deformability of a portion or a whole of the arrangement), thus initiating distance outputting, and that then, once the user releases pressure with their thumb, the arrangement may return to its original position, (due to the deformable material (eg rubber) being resilient), thus halting distance outputting. This is an example, then, of a portion or a whole of the arrangement being deformable. (Any example may be provided wherein a portion or a whole of the arrangement being deformable, not limited to the example disclosed/mentioned). Thus there are many ways, (not limited to spring-loadedness) that this effect (of requiring constant pressure/action by a user, for distance outputting), may be achieved. Any such method/way may be provided, for any arrangement to facilitate distance outputting. For example, such method/way may be provided for the top depressible portion example (or any depressible portion example) of FIGS. 33 to 35, for example. Similarly such examples may utilize (ie be) spring-loaded. All permutations/combinations are possible, which will be apparent.

However, it should also be noted that distance outputting may be provided in an ON/OFF manner. For example, there may be provided a user means (of any type, eg button, switch, etc, or any other type) which can be used to turn on, and turn off, distance outputting, without requiring constant pressure/action from the user. A switch would be an example. Thus the hand device may comprise a switch which the user can use to turn off and turn on distance outputting. Thus a button example may be provided (similar/same to such as shown in FIG. 23 (and others), for example), where the user presses the button, and rather than it returning to its original position when the user releases pressure on it, it may simply be pressed, and may then remain pressed/depressed. This may, for example, initiate distance outputting (or the opposite). The user can then release pressure on it, with distance outputting continuing. The user may then be able to press it again, with the button then becoming undepressed, with distance outputting stopping (or the opposite). This may be the case for any of the examples shown and/or disclosed; for example, in the example of FIG. 35, once the user depresses the depressible portion, it may remain depressed, even when the user releases pressure on it, with distance outputting continuing (or the opposite). They may then be able to press it again to release it, with it becoming undepressed, and distance outputting stopping (or the opposite). Thus such a concept may be the case for any embodiment disclosed in the present application, and for any embodiment at all. However, as made clear in the nature of the disclosure in the present application, preferably the arrangement is configured so that the user must apply continuing pressure/action for distance outputting to continue, and that when they release pressure, distance outputting ceases. This is more intuitive and engaging for the user, and also has the benefit that it may save more water/fluid (and thus may save other material(s), such as mix addition(s), for example), in use.

(It should also be stated, for embodiments that comprise a movable element, embodiments are not limited to requiring movement 'inwards'; for example, a protruding element may be provided that, for example, protrudes out from the hand device, on the thumb side of the hand device. It may be possible that the user can initiate distance outputting by moving the movable element 'upwards' with their thumb, for example, (or downwards, for example, or even by moving the movable element 'outwards' from the hand device, or in any direction, for example), to initiate distance outputting. This is disclosed just to make clear that a wide variety of embodiments may be provided. The example provided is provided by way of example only, in no way limiting the concept. (Such examples are not limited to being arrangements that are 'thumb' selecting arrangements. And again, as stated, such example may require constant/continuing pressure/action from the user, for distance outputting to continue, or may not require constant/continuing pressure).

Thus it has been clearly disclosed that embodiments may be provided wherein continuing pressure/action is required, for distance outputting to continue, but that it is also possible that embodiments may be provided that do not require continuing pressure/action from the user, for distance outputting to continue. (Nevertheless, if pressure-activated outputting is also provided, such embodiments would be within a scope of being configured both for pressure-activated outputting, and distance outputting of fluid).

It should also be stated, touch-sensitive examples have been disclosed (eg electronic versions and/or arrangements), such as touch screen, or 'charge' based (and/or 'earthing') examples (eg with a metal plate). Whilst touch-screen examples will tend not to require continuing touch for distance outputting to continue, and whilst 'charge' type (and/or 'earthing') arrangements will tend to require continuing touch, in both cases, the opposite may be the case. Thus in these cases, it is feasible continuing action/touch may be required by the user, for distance outputting to continue. But it is also possible that embodiments may be provided that do not require continuing action/touch from the user, for distance outputting to continue. Thus in touch versions, continuing touch may be required, or touch may initiate distance outputting (or the opposite), and the user may then be able to stop touching, with distance outputting continuing, and a further touch may then stop distance outputting (or the opposite). As stated, touch versions may be overly complex for the device. Thus it is unlikely such embodiments would be provided.

Note: the term 'continuing' will now be used, with reference to the concept of 'constant/continuing' action/pressure. Note: the term 'action' will now be used, as a broad term, rather than more limited term 'pressure' or 'touch' or others, with reference to 'continuing action'. This is for several reasons—firstly, as stated, embodiments may be provided where 'pressure' is required (and/or movement of a movable element). However, embodiments may be provided where 'touch' initiates distance outputting (which may not need 'pressure' as such). But both are examples of where 'action' is required by the user. (ie 'touch' and 'pressure' are both examples of 'action' from the user, that initiates distance outputting). Furthermore, the term 'pressure' can be misleading because the term 'pressure' is often more associated with putting pressure on something 'inwards' or 'downwards'—(eg in the examples of FIGS. 27 and 28, for example, where pressure is applied to the button, to depress it 'inwards', or the example of FIGS. 33 to 35 for example, where pressure is applied 'downwards' to the depressible portion. However, it has been made clear that embodiments may be provided where a movable element may be movable in any direction/way, to initiate distance outputting, (eg 'upward' and/or 'downward', or 'backwards'). Whilst it could be said 'pressure' is still applied by the user in such embodiments, to avoid any misunderstanding, the term 'action' is used, as it is quite clear that on any such embodiments (and on 'touch' embodiments, for example), 'action' (whether it is pressure or not) is required, to initiate distance outputting. Thus, as stated, preferably continuing action is required by the user, for continued distance outputting. However, embodiments may be provided wherein continuing action is not required, for continued distance outputting.

It should also be noted, embodiments may be provided wherein continuing action is required by/from the user, for distance outputting to continue, but that an arrangement is provided wherein the selecting arrangement (preferably a thumb selecting arrangement) can be held in an action position, (eg 'locked'), so that distance outputting continues, no longer needing action from the user. An example, for example, would be wherein there is provided a feature, such as a member, which can be moved, and then perhaps locked in place, to hold the/a (preferably thumb) selecting arrangement in a position wherein distance outputting of fluid is activated. Thus, for example, in the embodiment of FIG. 27, if a feature(s) were provided so that, once the button has been pressed by the user's thumb, the user can move the feature, to lock and/or hold the button in a depressed position, then the user would be able to stop applying pressure on the button (ie stop providing continuing action), and distance outputting would nevertheless continue. For the sake of the present application, this would still fall within the scope of being a selecting arrangement that requires continuing action from the user, for distance outputting to continue, because it provides that option (ie continuing action from the user, for distance outputting to continue). It simply provides the 'addition' of an option to lock the arrangement in an action position, thus stopping action from being required by the user. (Any solution to lock and/or hold the/a selecting arrangement may be provided, not limited to physically holding/locking the arrangement externally—for example, a further user means may be provided, which the user may activate (eg a button, switch, or any other user means), which may lock and/or hold the arrangement partially or wholly internally (rather than partially or wholly externally), thus locking and/or holding the arrangement in an action position, wherein distance outputting continues. However, such embodiments may be needlessly complex. Furthermore, such a result (offering both 'continuous action required' distance outputting, and also offering 'continuous action not required' distance outputting), in the same device, may be provided, not limited to locking and/or holding the/a selecting arrangement in an action position; for example, a selecting arrangement may be provided which requires continuing action from the user, for distance outputting to continue. (Various embodiments of this have been disclosed and/or shown). And the device may also comprise a selecting arrangement that does not require continuing action from the user, for distance outputting to continue. (Various embodiments have been disclosed—eg ON/OFF examples, (such as a switch, button, etc, for example), which can be used to turn on, and turn off, distance outputting, without requiring continuing action from the user. Thus the device may feasibly comprises a plurality of selecting arrangements, to facilitate distance outputting of fluid.

Preferably the pressure-activated outputting arrangement and/or the distance outputting arrangement is partially or wholly housed within the hand device. (In a 'bare-bones' embodiment, none of the pressure-activated outputting arrangement and/or the distance outputting arrangement is housed within the hand device). Note, having feature(s) of the pressure-activated outputting arrangement (and/or the distance outputting arrangement) housed within the pressure-activated outputting arrangement (and/or the distance outputting arrangement), for the sake of the present application, does not count as any of the pressure-activated outputting arrangement and/or the distance outputting arrangement being 'housed within the hand device'; for example, features may be 'housed' within the circular body of the pressure-activated outputting arrangement in FIG. 31 (and others), for example. However, if this is the case in a 'bare-bones' embodiment, then this would not be within a scope of the pressure-activated outputting arrangement being partially or wholly housed within the hand device. (So the same is the case for the distance outputting arrangement). The pressure-activated outputting arrangement and/or the distance outputting arrangement being partially or wholly housed within the hand device refers to when the pressure-activated outputting arrangement and/or the distance outputting arrangement are partially or wholly housed within a covering and/or casing of some sort. Various examples of this are shown in the drawings; for example, the pressure-activated outputting arrangement (and/or the distance outputting arrangement) is partially or wholly housed within the hand device in FIG. 15, for example. Also, the pressure-activated outputting arrangement and/or the distance outputting arrangement is partially or wholly housed within the hand device in FIG. 24, for example. (In all the examples shown in the drawings, the pressure-activated outputting arrangement and/or the distance outputting arrangement is partially or wholly housed within the hand device). The covering/casing may be soft; for example, in the embodiment of FIG. 15, the hand device (and covering) is clearly deformable. Thus a portion or a whole of the covering/casing may be deformable and/or soft. The housing may be hard, or substantially hard; for example, the example of FIG. 23, 32 (and many others shown) may be hard, or substantially hard. Furthermore, in such an example, the covering/casing may be covered in and/or (the hand device may) comprise a soft (and/or fabric) surface (and/or material(s)). (This may be the case for any embodiment, not limited to 'hard' embodiments; any embodiment may comprise a soft and/or fabric surface. Such material(s) may be beneficial to facilitate cleaning of what is to be cleaned. (Any embodiment of the hand device may be hard and/or comprise a hard part(s). Any embodiment of the hand device may be soft and/or comprise a soft part(s). Any embodiment of the hand device may be deformable (in any way and/or at any part(s)).

Thus the pressure-activated outputting arrangement and/or the distance outputting arrangement is preferably partially or wholly housed within (ie inside) the hand device, (ie not simply in the open, as in a 'bare-bones' embodiment of the hand device). Thus preferably the device comprises a covering and/or casing. (The broad term 'housing' may be used for this part/feature of the hand device, which both the term 'covering' and 'casing' (and others) fall within the scope of). Thus, for the sake of the present application, when the term 'housed' is used, with reference to the pressure-activated outputting arrangement and/or the distance outputting arrangement (and/or any internal element(s)) preferably being partially or wholly housed within the hand device, the device comprising any sort of housing (ie covering, casing, or any other similar term/feature), is included within its scope. Thus the terms 'housing' and 'housed' are extremely broad terms. (Note again that a 'bare-bones' embodiment would be an example of wherein none of the pressure-activated outputting arrangement and/or the distance outputting arrangement is housed within the hand device).

In Use (Pet Cleaning Example)

An example(s) will now be described in use, described by way of example only, referring to a particularly preferred embodiment, and in no way limiting a scope of the invention. (The example will be described particularly with reference to use of a preferred embodiment of the fluid outputting hand device, and described, by way of example, when used in combination with a preferred embodiment of a station, as previously described).

Thus, referring in use (by way of example) to a particularly preferred example, in preparation, the apparatus may be portably moved by a user to an area (which may be fit for cleaning a pet). This may be within a house. This may be outside a house.

Water (preferably warm water) is inputted, preferably, into the station. Preferably this goes into the fluid containment chamber. Preferably a pressurizing mechanism is then used, preferably comprising a pump, which preferably is configured to be used by hand. Preferably this pressurizes the chamber/area the water is held in. Thus water/fluid can be outputted in a pressurized manner. The station is preferably placed on the floor during this (and preferably the whole) process.

A mix addition (preferably held in a container) is added and/or inputted to the station (if not already done previously). The mix addition may be a fluid, a gel, a powder, or any other material. If the mix addition is a non-contained fluid or powder (or any matter), the/a mix addition holding chamber/area may be fully closable. If the mix addition is inputted in a container, it is preferably held in/at/to the station as a cartridge, which is preferably removable and changeable.

At some point, the user picks up and/or puts on the fluid outputting hand device. Preferably the device can be attached to and/or held on the hand of the user. The pet (which is preferably a dog), may then be brought close to the user, (or vice versa) (if this has not been done already). It is feasible that the pet/dog is placed in a self-expandable pet cleaning bathing pool so that fluid is held in the pool during cleaning. It may well be possible that the pet can be held with both hands by a user, the user thus able to focus simultaneously on cleaning and preventing an escape.

The pet can also be petted (eg stroked) by the user, possibly even with the hand device (which may, or may not, be outputting fluid at this point). This may calm the pet. Pressure is then placed (by the user's hand wearing/using the hand device) onto the coat of the pet. This preferably facilitates outputting of fluid from the device, and onto the pet, via pressure-activation. This may be achieved in many ways, as has been made clear. Preferably, fluid is outputted slowly, with little sound, so that there is little loss of fluid. This may make it less likely that the pet shakes its coat, to get the fluid off. It may also make it less likely that the pet gets 'spooked' and tries to make an escape attempt. It is even possible, due to the clever pressure-activated functionality, that the pet may not even initially notice it is being washed and/or that any fluid is being outputted. This could be extremely beneficial. At any point, the user may stop applying pressure to the (coat of the) pet, and may decide to spray and/or output fluid from a distance. This may be done in various ways. Preferably this is done via a thumb selecting arrangement, so that the user, with their hand (and thus the fluid outputting hand device) being held at a slight (or any) distance from the pet, may use and/or move their thumb, to initiate distance outputting of fluid. (This may be done via spraying).

Once the coat of the pet is wetted, preferably the user selects a 'mix' option. This is preferably provided by a selecting element/arrangement, which allows the user to select between different mix (or not mixed) option(s). The selecting element is preferably provided on the station. For example, a 'shampoo' option (which may be denoted by an 'S') may be chosen by the user. It may well be that the user can select this option with the other hand than the one that is being used to clean the pet with the fluid outputting hand device. This could be useful. (Note: it is feasible, rather than starting by outputting a non-mixed fluid (eg just water) onto the pet, the user may start, from the beginning, by outputting a shampoo mix fluid onto the pet). Again, at any point the user chooses, they may decide to initiate distance outputting of fluid. Whether it be to get shampoo onto the pet (or to rinse the pet), this may be particularly useful for places of the pet that are hard to reach and/or may not be particularly pleasant to touch and/or apply pressure to. (eg back-side of the pet, and/or more private areas). This may also be useful for cleaning areas like paws (or any other areas), as many dogs do not like their paws being touched.

After lathering and/or shampooing the pet, the user may be able to choose and/or revert to a 'rinse' option (which may be denoted by an 'R'). This may simply be water, and may, for example, be the same (option) as the/an unmixed fluid the user had started with. Preferably this can be chosen via the same selecting element/arrangement. Thus the pet (and preferably the coat of the pet) can be shampooed and rinsed (and possible wetted before being shampooed).

Now, another addition may be selected (eg a conditioner, or a treating agent, eg for lice—eg a coat and/or skin treating agent). This may similarly be selected, preferably via the same selecting element/arrangement. (The conditioner option may be denoted by a 'C'. The/a treating agent option may be denoted by a 'T'). Selecting a mix addition on the manual selecting element, which preferably is or comprises a dial, may open one or more apertures. These may release and/or induce mixing of the/a mixing agent/addition with the, preferably water, fluid. Pressurized flow of water/fluid through the system may further induce a mix addition into the fluid. These may be carried out with the help of (and/or occur within) a valve. (This is just one example of how mixing may occur and/or be facilitated).

With rinsing, the option to output fluid from a distance (especially if it can be done at greater pressure) may be particularly useful.

It should also be said the hand device may be used for scrubbing and/or massaging the pet. Thus the hand device may comprise a scrubbing and/or massaging surface. This may be located anywhere on the surface of the device. Any surface/part of the device may be configured for scrubbing and/or massaging—eg the whole of an outer palm-side of the device, and/or, for example, a finger-tip area of the hand device. (A finger-tip area may be particularly useful, as it may allow the user to avoid, if they choose/desire, activating the pressure-activated outputting of fluid whilst this is done. (That said, it should also be stated embodiments may be provided wherein even pressure from finger(s) and/or finger tip(s) of a user may activating pressure-activated outputting of fluid). This (scrubbing and/or massaging and/or a surface as/for such) may be used to help lathering. Thus, once a shampoo mix has been applied, scrubbing and/or massaging (especially if the device comprises a surface configured for such) may be used to create extra lather on the coat of the pet. Similarly a treating agent mix addition may be added and applied to a pet, may be scrubbed, for example, and may be rinsed, possibly without any halting of the cleaning process.

After cleaning, the pet may be placed on a mat, for example, (or may be outside, in which case, a mat may not be needed) and may be dried with a towel. Nourishment may be given to the pet which may also function as training. The nourishment may be placed in a bowl, which may be included as part of a wider pet cleaning apparatus and set. The towel may also be included/provided.

In Use (Car/Vehicle Cleaning Example)

With reference to car/vehicle cleaning, the hand device may be used. The/a station may also be sued. However, people who are cleaning their car might, for example, want a more simplistic solution. Therefore, it is possible a simple bucket-type container may be used. The container may contain and/or be filled up with water (preferably hot/warm water) by a user. The container therefore preferably contains a fluid containment chamber(s). Rather than having a complex mixing system (although it may feasibly draw upon/comprise any of the feature(s) disclosed in the present application, (including and not limited to the station embodiments), the user may simply be able to add in detergent to the water. It is feasible the container may comprise a holding chamber for fluid/water (unmixed) and a further holding chamber for fluid/water (mixed, eg with detergent, for example). (Although it is also feasible that, similar to previous examples, there may be a mixing system, and that only one holding chamber (for fluid/water) is needed). A detergent as simple as washing up liquid may be used (or any other mix and/or detergent suitable for cleaning a car with). Preferably the apparatus comprises a pressurizing mechanism, as this may be important to the user being able to output water/fluid from the hand device.

Thus, in use, to clean a car, the user preferably places the/a container on the ground. Preferably a pressurizing mechanism is then used, preferably comprising a pump, which preferably is configured to be used by hand. Preferably this pressurizes the chamber(s)/area(s) of the container(s) the water is held in, (or any relevant area(s)/part(s) of the apparatus)). Thus water/fluid can be outputted in a pressurized manner.

The user then preferably holds the hand device (and/or attaches it/puts it on to their hand). To start cleaning the car, the user may start by using distance outputting of fluid (preferably spraying). This may be used, simply to get the car wet. However, it may not be necessary to do this as a first step, and the user, instead, may start by applying pressure to a surface of the car, with the hand device, thus outputting fluid via pressure-activation. Furthermore, rather than simply outputting unmixed water/fluid (eg via pressure-activation), the user, even from the start, may output a mixed fluid (eg with detergent). Thus the user may, for example, start by outputting a mixed fluid (eg with detergent, for example) directly onto the car, via pressure-activation. (The user may be able to select a mixed output option (eg via a (manual) selecting element, or via any other means/method), which may, for example, be provided on the station and/or container the fluid/water and/or mix addition(s) and/or mixed fluid is contained in). This may produce a lather. The user may thus go all around the car, outputting a mixed output fluid (which may create bubbles and/or a lather), via pressure-activated outputting and may thus clean the outside of the car and/or its window(s) etc. Once this is done, the user may switch to a non-mixed output (ie just water/fluid), and may use distance outputting (preferably via use of a thumb selecting arrangement). This may then wash off any of the lather/bubbles left on the car. The car is thus left, potentially, very clean. (Again, the user may be able to switch to/select a non-mixed option via a manual selecting element/arrangement, etc. The/a selecting element(s) is preferably provided on the station, but may be provided by any means/method).

Furthermore, once the car has been rinsed in this way, it may be possible to use a surface/attachment (which may be removably attachable) of the hand device, to absorb the water/fluid left on the car. In this way, the water/fluid can be absorbed, and/or the car can be polished/shined with the hand device. Thus, for example, having rinsed the car, the user may attach a pad/attachment/surface to the hand device. This may be removably attachable. In one embodiment, such a pad/attachment/surface may comprise sponge (or the like), (or any absorbent material(s)). This may absorb the water left on the car. It may be possible to wring out the water/fluid from the absorbent material(s), by squeezing one's first together, whilst wearing/holding/using the hand device, thus squeezing the absorbent material(s). This may be useful/necessary, so water/fluid can be wrung out of the absorbent surface/material(s), so that it can continue to be used, to absorb more water, eg on the car, or, for example on another car/vehicle. The absorbent surface/material(s) (and/or any pad/attachment/surface) may be part of the hand device, as standard. However, preferably, it is removably attachable. Preferably it comes as a removably attachable part/attachment. Thus it may not be part of the hand device, whilst fluid outputting is taking place, and may then be attached (and removed) as and when needed. (This may also be the case with any pad(s)/attachment(s)/surface(s) for pet cleaning, or for any other use of the device.

(Wringing out of water/fluid may be done in any way, not limited to squeezing one's fist).

Similarly, there may be provided a pad/attachment/surface (or any attachment/surface), (preferably removably attachable), for polishing/shining the car. It is feasible this may be done by a surface/attachment that is absorbent (eg comprising sponge, foam, or the like), in which case, the job of absorbing fluid/water, and shining the car, may be done by the same pad/attachment/surface. However, there may also (or alternatively) be provided a pad/attachment/surface which is for shining. (It may not be for absorbing, and may be more specifically for shining). This, and any other, pad(s)/attachment(s)/surface(s) may be provided. There may, therefore, be provided a plurality of pad(s)/attachment(s)/surface(s). Preferably they are removably attachable.

It will be apparent that the device/apparatus is not limited for use on pets/animals, and cars/vehicles. It may, for example, be useful in cleaning other (and any) surface(s).

Thus a preferred embodiment has been described, in use, by way of example, and in no way limiting a scope of the invention.

The embodiments described above are provided by way of example only, and various other modifications will be apparent to persons skilled in the art without departing from the scope of the invention as defined in the appended claims.

BROADER AND/OR DIFFERENT INVENTION(S) MAY BE CLAIMED (AND ARE SUPPORTED)

The appended claims define limited inventions. However, it should be recognized and understood that the disclosure of the present application includes a vast array of inventions, not limited to inventions set out in the appended claims and/or any statement(s) of invention.

For example, if the present disclosure of the present application (inclusive of drawing(s) and/or description) discloses features a to z, it should be recognized and understood that any invention may be claimed, comprising any feature(s) out of features a to z. Thus if the appended claim 1 defines the invention claimed as comprising essential features a, b, and c, it should be understood that an invention may be claimed comprising solely feature a, or solely feature b, or solely feature c, or any combination of features a, b, and c. Furthermore, it should be understood that an invention may be claimed comprising any of feature(s) d to z, whether or not also comprising any of features a, b, or c.

A fluid outputting hand device (or just a fluid outputting device, (of any sort)) may be claimed, comprising a fluid output point. All other feature(s) disclosed in the present application are preferable and/or optional to this statement of invention.

Furthermore, no feature disclosed is limited to only being set forth in a claim when used in conjunction with other particular feature(s) it is disclosed with in the specification, but may be claimed with any other feature or combination of features disclosed in the present application. Thus if a feature is disclosed 'clustered' with several other feature(s) (and/or in a particular embodiment) when disclosed in the specification, the applicant(s) nevertheless reserves the right to 'extract' that feature(s) from the several other feature(s) (and/or embodiment) it is disclosed with, and set it forth in a claim, combined with any other feature(s) (and/or as part of any other embodiment) disclosed in the present application, which other feature(s) may, or may not, also be 'extracted' from any other feature(s) they are clustered with in the disclosure of the present application. Thus any permutation/combination of features may be claimed for patent in a future claim and/or patent application. (It should also be noted that feature(s) disclosed in an embodiment are not limited to being used/provided only with the disclosed embodiment).

A final claim may be appended, defining/claiming: 'Any novel subject matter or combination including novel subject matter disclosed herein, whether or not within the scope of or relating to the same invention as claimed in any of the preceding claims.', which serves to signify that the applicant(s) reserves the right to claim any invention (ie 'thing'), comprising any feature, or combination of features, disclosed in the present application (inclusive of drawing(s) and/or description). (The applicant(s) reserves this right, whether or not such a claim is appended). This statement (and/or final appended claim), if so desired, should be seen as a statement of invention, stating any invention (ie 'thing'), comprising any feature, or combination of features disclosed in the present application (in any permutation/combination). The applicant(s) reserves the right to claim any (such) invention (ie 'thing'), and considers an objection by a patent office/examiner (stating that such an invention is not supported by/disclosed in the present application) to be in direct conflict with this statement of invention. Thank you to the relevant patent office/examiner for taking note of this. It is intended (or plausible) that such invention(s) may be claimed in a future application(s) which claims benefit of priority of the present application, or, for example, in future filed claims of the present application. The present disclosure of the present application supports such invention(s)/claim(s).

ADJECTIVAL AND ADVERBIAL USE, IN THE PRESENT APPLICATION, IS INNATELY OPTIONAL

In the present application, adjectival definition of a noun in no way limits the ability to claim the noun, without the adjective. Thus if a 'curved edge' is disclosed, it should be understood that it is disclosed simply by way of example, as an embodiment of 'an edge', and that an invention may be claimed, comprising an 'edge', and not limited to comprising a 'curved edge', even if the only disclosure in the specification is of a 'curved edge'. This goes for every single adjective example in the present application, and also applies to adverbs in the same way, with reference to how they limit a broader verb/action, which verb/action/characterizing feature may be included in a claim (and is supported), not limited by the adverb that further defines it. This also applies to 'usage for' definitions. Thus if an instrument/apparatus, for example, is described, with reference to use for a particular thing (eg a 'pet cleaning apparatus', (which is therefore a cleaning apparatus, for use on pets)), then a 'cleaning apparatus' may be claimed, not limited to being a 'pet' cleaning apparatus and/or not limited to being for use on pets, even if all disclosure in the patent application relates to a 'pet cleaning apparatus'.

THE TITLE OF THE PRESENT APPLICATION DOES NOT LIMIT WHAT MAY BE CLAIMED

The title of the present application (and the claims presented) do not limit what may be claimed futurely, based upon (and supported by) the present application. For example, if the title is 'Pet Cleaning Apparatus', even if all disclosure in the patent application relates to a pet cleaning apparatus (as do the claims), nevertheless, a 'cleaning apparatus' may be claimed (not limited to being for pets), as it is clear a 'pet cleaning apparatus' is an embodiment of a 'cleaning apparatus'. As stated previously, in the present application, adjectival definition of a noun in no way limits the ability to claim the noun, without the adjective. This also applies to the title. Furthermore, an invention may be claimed comprising any feature, or combination of features, disclosed in the present application.

Thus, in line with the above statement(s), a broad statement of invention is herein included, of a fluid outputting device (which may, or may not, be a fluid outputting hand device), comprising a fluid outputting point/arrangement. All other feature(s) and/or combination of feature(s) disclosed in the present application are optional with regards to this broad statement of invention. Furthermore, any feature (not limited to being provided with/clustered with any other feature(s) disclosed in the present application (even when disclosed together 'essentially' with regard to any other (statement of) invention in the present application) may be claimed in dependent fashion with regard to this broad statement of invention, and are deemed preferable and/or optional feature(s). This broad statement of invention should in no way affect searching and examining of any more narrow appended claims, and in no way affects the scope of such appended claims, which are likely to be far narrower in scope than the broad statement of invention provided in this paragraph. Such a device, with reference to this broad statement of invention in this paragraph, may, for example comprise an arrangement for pressure-activated outputting of fluid and/or an arrangement for selectable distance outputting of fluid, but is not limited to comprising both, and may comprise neither (and/or not be defined as comprising such).

(Furthermore, a fluid outputting device may be claimed (comprising any or all of the disclosed feature(s) in the present application), not limited to being a fluid outputting hand device. For example, a device may be claimed, comprising a fluid outputting arrangement/point. All other feature(s) and/or combination of feature(s) disclosed in the present application are optional with regards to this broad statement of invention).

FEATURE(S) SHOWN IN THE DRAWINGS MAY BE COMBINED TO FORM AN INVENTION

Any feature(s) or combination of feature(s) shown in any drawing(s) may be combined with any other feature(s) or combination of feature(s) shown in any other drawing(s), to form an invention, which may be claimed. This may be the case for any embodiment shown in any drawing(s), and applicant(s) reserves the right to claim any such invention(s). Furthermore, such feature(s) may, of course, be combined with any other feature(s) and/or disclosure of the present application, to form an invention(s), which may be claimed. Such an invention(s) may be claimed in a future application(s) which claims benefit of priority of the present application, or, for example, in future filed claims of the present application. The present disclosure of the present application supports such invention(s)/claim(s).

The invention claimed is:

1. A fluid outputting hand device, comprising:
a front portion, for going in front of a user's hand; and
a fluid output point, for outputting fluid;
wherein the hand device is configured for:
pressure-activated outputting, so that fluid can be outputted onto a target, by applying pressure to the target; and
selectable distance outputting of fluid, so that fluid can be outputted at a target, from a distance.

2. A fluid outputting hand device as claimed in claim 1, wherein pressure-activated outputting of fluid and distance outputting of fluid are outputted from the same fluid output point.

3. A fluid outputting hand device as claimed in claim 1, wherein the device comprises a further fluid output point, and pressure-activated outputting of fluid and distance outputting of fluid are outputted from different output points.

4. A fluid outputting hand device as claimed in claim 1, wherein the fluid outputting hand device comprises a thumb selecting arrangement, so that distance outputting can be selected by a thumb of the user.

5. A fluid outputting hand device as claimed in claim 4, wherein the thumb selecting arrangement comprises a movable element, movable by the thumb of the user.

6. A fluid outputting hand device as claimed in claim 4, wherein the thumb selecting arrangement comprises a feature wherein a portion or a whole of the feature is depressible, depressible by the thumb of the user.

7. A fluid outputting hand device as claimed in claim 4, wherein the thumb selecting arrangement comprises a depressible button.

8. A fluid outputting hand device as claimed in claim 4, wherein the thumb selecting arrangement requires continuing action from the user, for distance outputting of fluid to continue.

9. A fluid outputting hand device as claimed in claim 4, wherein the thumb selecting arrangement is spring-loaded.

10. A fluid outputting hand device as claimed in claim 4, wherein the thumb selecting arrangement comprises a curved surface, shaped to fit to the user's thumb.

11. A fluid outputting hand device as claimed in claim 4, wherein the thumb selecting arrangement comprises a protruding element, the protruding element comprising a curved surface, shaped to fit to the user's thumb.

12. A fluid outputting hand device as claimed in claim 4, wherein the fluid outputting hand device comprises a back securing arrangement.

13. A fluid outputting hand device as claimed in claim 12, wherein the back securing arrangement surrounds most or all of a back of the hand of the user.

14. A fluid outputting hand device as claimed in claim 12, wherein the fluid outputting hand device has a partially or wholly open back.

15. A fluid outputting hand device as claimed in claim 1, wherein the fluid outputting hand device comprises a depressible portion, depressible to initiate distance outputting of fluid.

16. A fluid outputting hand device as claimed in claim 15, wherein the depressible portion is at a top of the front portion.

17. A fluid outputting hand device as claimed in claim 1, wherein the fluid outputting hand device comprises a back securing arrangement, the back securing arrangement comprising a strap element to secure the hand of the user.

18. A fluid outputting hand device as claimed in claim 1, wherein the fluid outputting hand device comprises a back securing arrangement, the back securing arrangement comprising a finger holder arrangement, wherein the finger holder arrangement comprises more than one finger holder that comprises an aperture to fit at least one non-thumb digit of the user through, and out of.

19. A fluid outputting hand device as claimed in claim 18, wherein the finger holders are elastic.

20. A fluid outputting hand device as claimed in claim 1, wherein the fluid outputting hand device comprises a stopping arrangement, to stop at least one of:
pressure activated outputting of fluid when pressure is applied to a target;
distance outputting of fluid.

21. A fluid outputting hand device as claimed in claim 1, wherein continuing action is required from the user, for distance outputting of fluid to continue.

22. A fluid outputting hand device as claimed in claim 1, wherein the fluid outputting hand device is a pet cleaning device.

23. A cleaning apparatus, comprising:
a fluid outputting hand device as defined in claim 1;
a portable station, the portable station itself comprising:
a fluid containment chamber, for containing fluid; and
a connecting member, so that fluid from the fluid containment chamber can be outputted from the fluid outputting hand device;
wherein the portable station further comprises a pressurizing mechanism, to facilitate pressurized outputting of fluid from the fluid outputting hand device.

24. A cleaning apparatus, comprising:
a fluid outputting hand device as defined in claim 1; and
a pressurizing mechanism, to facilitate pressurized outputting of fluid from the fluid outputting hand device.

* * * * *